United States Patent
Fan et al.

(10) Patent No.: US 10,923,727 B2
(45) Date of Patent: Feb. 16, 2021

(54) ANTI-CORROSION FOR BATTERY CURRENT COLLECTOR

(71) Applicant: American Lithium Energy Corporation, Carlsbad, CA (US)

(72) Inventors: Jiang Fan, San Diego, CA (US); Christopher Kompella, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 164 days.

(21) Appl. No.: 16/048,071

(22) Filed: Jul. 27, 2018

(65) Prior Publication Data

US 2019/0058198 A1 Feb. 21, 2019

Related U.S. Application Data

(60) Provisional application No. 62/538,620, filed on Jul. 28, 2017.

(51) Int. Cl.
*H01M 4/66* (2006.01)
*H01M 2/34* (2006.01)
(Continued)

(52) U.S. Cl.
CPC ........... *H01M 4/667* (2013.01); *H01M 2/348* (2013.01); *H01M 4/625* (2013.01); *H01M 4/64* (2013.01);
(Continued)

(58) Field of Classification Search
CPC ............ H01M 4/66; H01M 4/34; H01M 2/20; H01M 2/34; H01M 4/62; H01M 10/0568
See application file for complete search history.

(56) References Cited

U.S. PATENT DOCUMENTS

| 4,075,400 A | 2/1978 | Fritts |
| 4,456,631 A * | 6/1984 | Crosbie ............ H01M 10/3909 252/518.1 |

(Continued)

FOREIGN PATENT DOCUMENTS

| EP | 0450549 A1 | 10/1991 |
| EP | 0776058 A2 | 5/1997 |

(Continued)

OTHER PUBLICATIONS

Eichstadt, Amy E., et al. "Structure☐Property Relationships for a Series of Amorphous Partially Aliphatic Polyimides." *Journal of Polymer Science Part B: Polymer Physics* 40.14 (2002): 1503-1512.

(Continued)

*Primary Examiner* — Kenneth J Douyette
(74) *Attorney, Agent, or Firm* — Mintz Levin Cohn Ferris Glovsky and Popeo, P.C.

(57) ABSTRACT

A battery with anti-corrosion protection is provided. The battery can include an electrolyte and a current collector. The electrolyte may be formed from one or more reactive salts capable of corroding the current collector. As such, the current collector may be interposed between a first anti-corrosion layer and a second anti-corrosion layer. The first anti-corrosion layer and/or the second anti-corrosion layer can be configured to prevent the current collector from being corroded by the reactive salts included in the electrolyte by preventing contact between the current collector and the electrolyte. Related methods for corrosion prevention are also provided.

19 Claims, 29 Drawing Sheets

(51) Int. Cl.
  *H01M 10/0567* (2010.01)
  *H01M 10/0568* (2010.01)
  *H01M 10/42* (2006.01)
  *H01M 4/64* (2006.01)
  *H01M 4/62* (2006.01)

(52) U.S. Cl.
  CPC .......... *H01M 4/661* (2013.01); *H01M 4/662* (2013.01); *H01M 10/0567* (2013.01); *H01M 10/0568* (2013.01); *H01M 10/4235* (2013.01); *H01M 2200/10* (2013.01); *H01M 2200/106* (2013.01)

(56) References Cited

U.S. PATENT DOCUMENTS

| | | | |
|---|---|---|---|
| 4,541,735 A | 9/1985 | Abu-Isa | |
| 4,975,341 A | 12/1990 | Tucholski et al. | |
| 5,504,128 A | 4/1996 | Mizutani et al. | |
| 5,507,842 A | 4/1996 | Fiorino | |
| 5,776,627 A | 7/1998 | Mao et al. | |
| 6,181,545 B1 | 1/2001 | Amatucci et al. | |
| 6,387,570 B1 | 5/2002 | Nakamura et al. | |
| 6,576,373 B1 | 6/2003 | Iwamoto et al. | |
| 6,780,544 B2 | 8/2004 | Noh | |
| 7,203,049 B2 | 4/2007 | Chu et al. | |
| 7,390,589 B2 | 6/2008 | Shin et al. | |
| 8,021,788 B2 | 9/2011 | Kim et al. | |
| 8,841,011 B2 | 9/2014 | Jang | |
| 9,627,722 B1 | 4/2017 | Fan et al. | |
| 9,806,382 B1 | 10/2017 | Fan et al. | |
| 2005/0079422 A1 | 4/2005 | Ko et al. | |
| 2006/0099506 A1 | 5/2006 | Krause et al. | |
| 2007/0166609 A1 | 7/2007 | Lee et al. | |
| 2007/0210893 A1 | 9/2007 | Hasunuma et al. | |
| 2007/0269718 A1 | 11/2007 | Krause et al. | |
| 2008/0116423 A1 | 5/2008 | Fan et al. | |
| 2008/0241684 A1 | 10/2008 | Muraoka et al. | |
| 2008/0254343 A1 | 10/2008 | Kaplin et al. | |
| 2008/0292939 A1 | 11/2008 | Xie | |
| 2009/0027158 A1 | 1/2009 | Kajino et al. | |
| 2010/0047674 A1 | 2/2010 | Ryu et al. | |
| 2010/0099022 A1 | 4/2010 | Nishida et al. | |
| 2010/0167107 A1 | 7/2010 | Byun et al. | |
| 2010/0247987 A1 | 9/2010 | Holung et al. | |
| 2011/0045321 A1 | 2/2011 | Park et al. | |
| 2011/0052950 A1 | 3/2011 | Yoo | |
| 2011/0117403 A1 | 5/2011 | Hermann et al. | |
| 2011/0151293 A1 | 6/2011 | Kim et al. | |
| 2011/0157755 A1 | 6/2011 | Honkura | |
| 2011/0256443 A1 | 10/2011 | Park et al. | |
| 2011/0273807 A1 | 11/2011 | Kim et al. | |
| 2011/0273809 A1 | 11/2011 | Falsett et al. | |
| 2012/0056709 A1 | 3/2012 | Kajino et al. | |
| 2012/0068127 A1 | 3/2012 | Kawase et al. | |
| 2012/0121974 A1 | 5/2012 | Tikhonov et al. | |
| 2012/0189881 A1 | 7/2012 | Geoffroy et al. | |
| 2013/0004811 A1 | 1/2013 | Banerjee et al. | |
| 2013/0101869 A1 | 4/2013 | Farmer | |
| 2013/0130075 A1 | 5/2013 | Kim et al. | |
| 2013/0171502 A1 | 7/2013 | Chen et al. | |
| 2013/0216867 A1 | 8/2013 | Schaefer et al. | |
| 2014/0072851 A1 | 3/2014 | Oh et al. | |
| 2014/0168845 A1 | 6/2014 | Charles | |
| 2014/0178753 A1 | 6/2014 | Chu et al. | |
| 2014/0377629 A1 | 12/2014 | Miyazaki et al. | |
| 2015/0104681 A1 | 4/2015 | Wang et al. | |
| 2015/0280241 A1 | 10/2015 | Hara et al. | |
| 2015/0303484 A1 | 10/2015 | Iida et al. | |
| 2015/0311001 A1 | 10/2015 | Kato et al. | |
| 2016/0059732 A1 | 3/2016 | Loftus | |
| 2016/0149196 A1 | 5/2016 | Fan et al. | |
| 2016/0149199 A1 | 5/2016 | Fan | |
| 2016/0149268 A1 | 5/2016 | Fan et al. | |
| 2016/0149269 A1 | 5/2016 | Fan et al. | |
| 2016/0164065 A1 | 6/2016 | Liu et al. | |
| 2016/0172657 A1 | 6/2016 | Matsui et al. | |
| 2016/0181590 A1 | 6/2016 | Fan et al. | |
| 2016/0240836 A1 | 8/2016 | Aotani et al. | |
| 2016/0254545 A1 | 9/2016 | Sugita et al. | |
| 2016/0268646 A1 | 9/2016 | Wang et al. | |
| 2016/0322641 A1 | 11/2016 | Saito et al. | |
| 2016/0365613 A1 | 12/2016 | Fan | |
| 2016/0380307 A1 | 12/2016 | Akita et al. | |
| 2017/0069904 A1 | 3/2017 | Ishihara et al. | |
| 2017/0207440 A1 | 7/2017 | Hama et al. | |
| 2017/0244093 A1 | 8/2017 | Fan | |
| 2017/0365840 A1 | 12/2017 | Fan et al. | |
| 2018/0019505 A1 | 1/2018 | Fan et al. | |
| 2018/0053928 A1 | 2/2018 | Xie et al. | |
| 2018/0190967 A1 | 7/2018 | Fan et al. | |
| 2018/0294472 A1 | 10/2018 | Fan | |
| 2018/0315988 A1 | 11/2018 | Fan | |
| 2019/0013553 A1 | 1/2019 | Fan et al. | |
| 2019/0058198 A1 | 2/2019 | Fan et al. | |
| 2019/0081315 A1 | 3/2019 | Morin et al. | |

FOREIGN PATENT DOCUMENTS

| | | | |
|---|---|---|---|
| EP | 1246280 A2 | 10/2002 | |
| JP | 7220755 A2 | 8/1995 | |
| JP | H07-220755 A | 8/1995 | |
| JP | H09 320568 A | 12/1997 | |
| JP | 2000-077061 A | 3/2000 | |
| JP | 2005-011540 A | 1/2005 | |
| JP | 2007-280803 A | 10/2007 | |
| JP | 2010-146726 A | 7/2010 | |
| KR | 20130123492 A | 11/2013 | |
| WO | WO-2004/049494 A1 | 6/2004 | |
| WO | WO-2015/046469 A1 | 4/2015 | |
| WO | WO-2015/060175 A1 | 4/2015 | |
| WO | WO-2016/086184 A1 | 6/2016 | |

OTHER PUBLICATIONS

Fang, Xingzhong, et al. "Synthesis and properties of polyimides derived from cis-and trans-1, 2, 3, 4-cyclohexanetetracarboxylic dianhydrides." *Polymer* 45.8 (2004): 2539-2549.

International Search Report and Written Opinion issued in International Application No. PCT/2015/062767, dated Feb. 12, 2016. 14 pages.

Jeon, Jong-Young, and Tae-Moon Tak. "Synthesis of Aliphatic-Aromatic Polyimides by Two☐Step Polymerization of Aliphatic Dianhydride and Aromatic Diamine." *Journal of Applied Polymer Science* 60.11 (1996): 1921-1926.

Loncrini, D. F., and J. M. Witzel. "Polyaryleneimides of meso☐and dl☐1, 2, 3, 4☐Butanetetracarboxylic Acid Dianhydrides." *Journal of Polymer Science Part A☐1: Polymer Chemistry* 7.8 (1969): 2185-2193.

Matsumoto, Toshihiko. "Aliphatic polyimides derived from polyalicyclic monomers." *High Performance Polymers* 13.2 (2001): S85-S92.

Schab-Balcerzak, E., et al. "Synthesis and characterization of organosoluble aliphatic-aromatic copolyimides based on cycloaliphatic dianhydride." *European Polymer Journal* 38.3 (2002): 423-430.

Seino, Hiroshi, Amane Mochizuki, and Mitsuru Ueda. "Synthesis of Aliphatic Polyimides Containing Adamantyl Units." *Journal of Polymer Science Part A Polymer Chemistry* 37.18 (1999): 3584-3590.

Seino, Hiroshi, et al. "Synthesis of fully aliphatic polyimides." *High Performance Polymers* 11.3 (1999): 255-262.

Spotnitz, R., and J. Franklin. "Abuse behavior of high-power, lithium-ion cells." *Journal of Power Sources* 113.1 (2003): 81-100.

Fisher, D.J. (2018). "Negative Thermal Expansion Materials." Jan. 15, 2018, Materials Research Forum LLC, p. 7, p. 86. 11 pages.

* cited by examiner

ANTI-CORROSION FOR BATTERY CURRENT COLLECTOR

This application claims priority to U.S. Provisional Patent Application No. 62/538,620 filed on Jul. 28, 2017 and entitled "ANTI-CORROSION FOR BATTERY CURRENT COLLECTOR," the disclosure of which is incorporated herein by reference in its entirety.

TECHNICAL FIELD

The subject matter described herein relates generally to batteries and more specifically to anti-corrosion protection for battery current collectors.

BACKGROUND

The active material forming the electrodes in a battery cell is typically a porous particulate paste that lacks both electrical conductivity and structural integrity. As such, the electrodes in the battery cell may be coupled with metal current collectors. The metal current collectors can provide a conductive path through the active material, thereby minimizing internal resistance within the battery cell. Furthermore, the metal current collectors may serve as physical support for the active material. However, the metal current collectors may be susceptible to corrosion, which may be triggered by an oxidation of electrolytes included in the battery cell.

For example, an aluminum (Al) current collector may generally be stable in the presence of a lithium hexafluorophosphate (e.g., $LiPF_6$) based carbonate electrolyte. Nevertheless, the oxidation of the lithium hexafluorophosphate, which may occur when the lithium hexafluorophosphate is exposed to air, may promote the corrosion of the aluminum current collector. As such, lithium (Li) ion batteries and/or lithium metal batteries that include aluminum current collectors are typically manufactured within the confines of an inert environment (e.g., a dry room and/or the like), in order to prevent subsequent corrosion of the aluminum current collectors. These manufacturing constraints contribute to the high production cost of lithium ion batteries and/or lithium metal batteries.

SUMMARY

Systems, methods, and articles of manufacture, including batteries and battery components, are provided. In some implementations of the current subject matter, there is provided a battery. The battery can include an electrolyte and a current collector. The current collector can be interposed between a first anti-corrosion layer and a second anti-corrosion layer. The first anti-corrosion layer and/or the second anti-corrosion layer can be configured to prevent a corrosion of the current collector by at least preventing contact between the current collector and the electrolyte.

In some variations, one or more features disclosed herein including the following features can optionally be included in any feasible combination. The current collector can be a metal current collector. The metal current collector can be formed from aluminum (Al), chromium (Cr), titanium (Ti), and/or stainless steel.

In some variations, the current collector can further interposed between a first safe layer and a second safe layer. The first safe layer and/or the second safe layer can be configured to respond to a temperature trigger, a voltage trigger, and/or a current trigger.

In some variations, the first safe layer and/or the second safe layer can be configured to respond to the temperature trigger, the voltage trigger, and/or the current trigger by at least forming a nonconductive gap that electrically decouples the current collector from an electrode of the battery. The first safe layer and/or the second safe layer can expand and/or contract in response to an increase in temperature. The nonconductive gap can be formed at least by the expansion and/or contraction of the first safe layer and/or the second safe layer. The first safe layer and/or the second safe layer can generate a gas and/or a liquid that vaporizes to form the gas. The nonconductive gap can be formed by the gas separating the current collector from the electrode. The nonconductive gap can be formed by a decomposition and/or a delamination of the first safe layer and/or the second safe layer.

In some variations, the first safe layer and/or the second safe layer can be configured to respond to the temperature trigger, the voltage trigger, and/or the current trigger by at least forming a high resistance gap that decreases a current flow between the current collector and an electrode of the battery. The first safe layer and/or the second safe layer can be formed from a material associated with a positive thermal coefficient (PTC) such that an electrical resistivity of the first safe layer and/or the second safe layer increases in response to an increase in temperature. The increase in the electrical resistivity of the first safe layer and/or the second safe layer can form the high resistance gap between the current collector and the electrode of the battery.

In some variations, the first safe layer and/or the second safe layer can be further configured to prevent the corrosion of the current collector by participating in a sacrificial reaction. The sacrificial reaction can include the first safe layer and/or the second safe layer reacting with a hydrofluoric acid (HF) produced by a non-air stable salt forming the electrolyte. The non-air stable salt can include lithium hexafluorophosphate ($LiFP_6$).

In some variations, the electrolyte can further include an additive such as, for example, vinylene carbonate (VC), lithium bis(oxalato)borate (LiBOB), lithium difluoro(oxalato)borate (LiDFOB), lithium bis(fluorosulfonyl)imide (LiFSI), lithium trifluoromethanesulfonate (LiTf), lithium difluorophosphate (LiDFP), lithium tetrafluoroborate ($LiBF_4$), tetraethyl-ammonium tetrafluoroborate ($TEABF_4$), lithium perchlorate ($LiClO_4$), methylene ethylene carbonate (MEC), fluoroethylene carbonate (FEC), succinonitrile, 1,3-propanesultone (PS), 1-propene 1,3-sultone, and/or methylene methanedisulfonate (MMDS).

In some variations, the first anti-corrosion layer and/or the second anti-corrosion layer can be a hybrid anti-corrosion layer configured to respond to a temperature trigger, a voltage trigger, and/or a current trigger by at least forming a nonconductive gap and/or a high resistance gap between the current collector and an electrode of the battery.

In some variations, the electrolyte can include one or more air stable salts. The one or more air stable salts can include lithium trifluoromethanesulfonate ($CF_3SO_3Li$) and/or lithium bis(trifluoromethane sulfone)imide ($LiC_2F_6NO_4S_2$) (LiTFSI).

In some variations, the first safe layer and/or the second safe layer can include a conductive material. The conductive material can include carbon black, nano carbon tubes, graphene, a conductive ceramic, and/or a conductive polymer.

In some variations, the battery can further include an electrode coupled with the current collector. The first safe layer and/or the second safe layer can be interposed between the current collector and the electrode.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
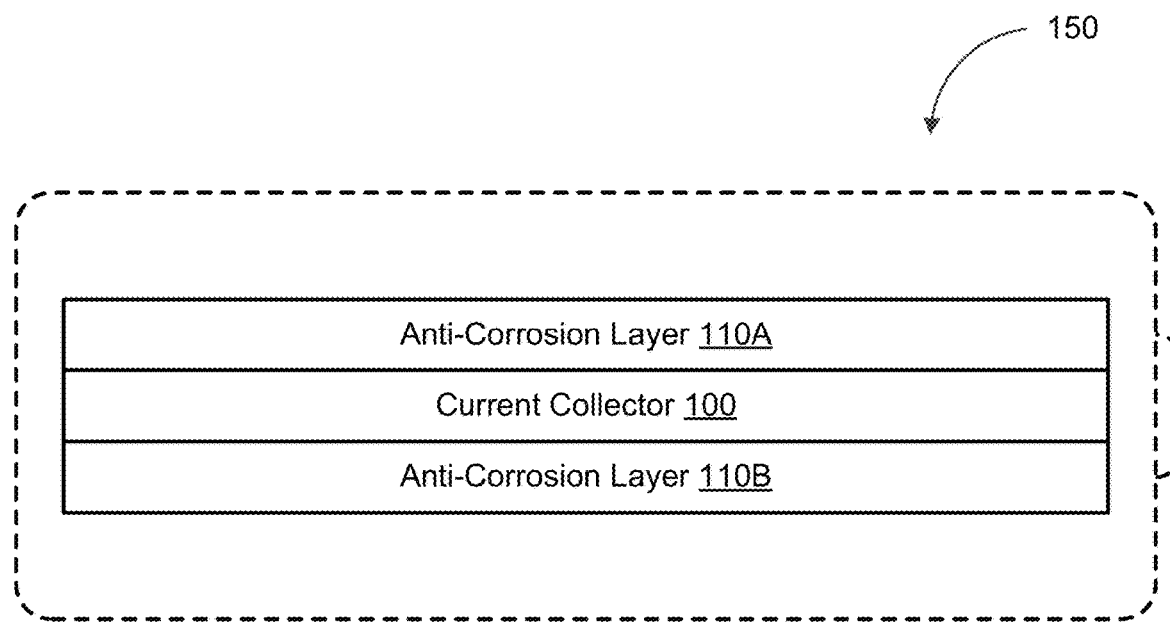
FIG. 1 depicts a schematic diagram illustrating a current collector interposed between a pair of anti-corrosion layers consistent with implementations of the current subject matter.

To provide electrical conductivity and structural integrity, metal may be used to form the current collector for one or more electrodes in a battery cell. For example, lithium (Li) metal batteries and/or lithium ion batteries may often include an aluminum (Al) current collector. Because an aluminum current collector will corrode when exposed to some air stable lithium salts (e.g., lithium trifluoromethanesulfonate ($CF_3SO_3Li$), lithium bis(fluorosulfonyl)imide (LiFSI), lithium bis(trifluoromethane sulfone)imide ($LiC_2F_6NO_4S_2$) (LiTFSI), and/or the like), lithium metal batteries and/or lithium ion batteries may typically include a lithium hexafluorophosphate ($LiPF_6$) based carbonate electrolyte. However, despite being stable in the presence of lithium hexafluorophosphate ($LiPF_6$), the aluminum current collector may nevertheless corrode in the acidic environment engendered by the oxidation of the lithium hexafluorophosphate, which may be triggered by the non-air stable lithium hexafluorophosphate being exposed to air and/or moisture. Consequently, to avoid the oxidation of the lithium hexafluorophosphate and the subsequent corrosion of the aluminum current collector, lithium metal batteries and/or lithium ion batteries are typically produced within the confines of an inert environment (e.g., a dry room), which increases the manufacturing cost for lithium metal batteries and/or lithium ion batteries.

For metal batteries (e.g., lithium (Li) batteries and/or the like) implemented using ionic liquid based electrolytes with and/or without other components such as ethylene carbonate (($CH_2O)_2CO$), solid state electrolyte, polymer electrolyte, and/or gel electrolyte, the corrosion of the metal current collector (e.g., aluminum (Al) current collector) within the battery poses a serious issue. Furthermore, the corrosion of the metal current collector tends to limit the lifespan of water-based batteries (e.g., sodium (Na) ion batteries) implemented using saltwater aqueous solution based electrolytes, lithium (Li) batteries implemented using multiple electrolytes separated by an solid state electrolyte film, zinc oxide water based batteries (Zn/ZnO), and/or iron (Fe) oxide water based batteries.

In some implementations of the current subject matter, a metal current collector in a battery cell may be coupled with at least one anti-corrosion layer for protecting the metal current collector against corrosion caused by exposure to reactive salts including, for example, air stable salts, non-air stable salts, and/or the like. For instance, different types of lithium (Li) salts may be corrosive and/or non-corrosive while being air stable and/or non-air stable. Corrosion of the metal current collector may result from the metal current collector being exposed to a hostile environment that is excessively acidic (e.g., pH<4) and/or basic (e.g., pH>9). For example, exposure to an air stable lithium salt (e.g., lithium trifluoromethanesulfonate ($CF_3SO_3Li$), lithium bis(trifluoromethane sulfone)imide ($LiN(SO_2CF_3)_2$) (LiTFSI), and/or the like) may corrode the metal current collector. Equations (1)-(3) below may express the corrosion of aluminum (Al) in the presence of lithium bis(trifluoromethanesulfonyl)imide (LiTFSI). Alternatively and/or additionally, a non-air stable lithium salt (e.g., lithium hexafluorophosphate ($LiPF_6$)) may oxidize to form hydrofluoric acid (HF), which can also be highly corrosive against the metal current collector. Accordingly, covering at least one surface of the metal current collector with an anti-corrosion layer may protect the metal current collector against corrosion by at least minimizing exposure to an acidic environment and/or a basic environment.

$$LiTFSI = Li^+ + TFSI^- \quad (1)$$

$$3TFSI^- + Al = Al(TFSI)_3 + 3e^- \quad (2)$$

$$Al(TFSI)_3 = 3TFSI^- + Al^{3+} \quad (3)$$

In some implementations of the current subject matter, a metal current collector in a battery cell can be formed from a metal foil, a metal mesh, a metal foam, a conductive graphene foil, and/or the like. The metal current collector can be further coupled with one or more electrically conductive anti-corrosion layers configured to protect the metal current collector against corrosion. For example, at least one surface of the metal current collector may be covered by an anti-corrosion layer. Alternatively and/or additionally, the metal current collector may be interposed between a pair of anti-corrosion layers.

In some implementations of the current subject matter, one or more anti-corrosion layers may protect a metal current collector from corrosion by preventing the metal current collector from coming in contact with the electrolyte in the battery cell, which may include one or more air stable lithium salts and/or non-air stable lithium salts. Alternatively and/or additionally, the anti-corrosion layers may protect the metal current collector against corrosion by participating in sacrificial reactions in which the anti-corrosion layers react with the byproduct (e.g., hydrofluoric acid (HF) and/or the like) from the oxidation of a non-air stable lithium salt in the electrolyte of the battery before the byproduct can react with the metal current collector. The anti-corrosion layers can further prevent the corrosion of the metal current collector by modifying a film of metal oxide (e.g., aluminum oxide ($Al_2O_3$)) on the surface of the metal current collector to create a film containing different elements that are less reactive in a hostile environment that is excessively acidic (e.g., pH<4) and/or basic (e.g., pH>9).

In some implementations of the current subject matter, at least one of the anti-corrosion layers may be a hybrid anti-corrosion layer. For instance, a hybrid anti-corrosion layer may also include one or more compounds configured to decompose in response to a temperature, voltage, and/or current in excess of a threshold value. Alternatively and/or additionally, the hybrid anti-corrosion layer can include a material (e.g., barium titanate ($BaTiO_2$) and/or the like) that is capable of undergoing a solid-to-solid phase transition while changing from a conductive phase to a nonconductive phase. The hybrid anti-corrosion layer can further include a material having positive thermal expansion properties and/or negative thermal expansion properties such that the material may expand and/or contract in response to an increase in temperature.

In some implementations of the current subject matter, in addition to the anti-corrosion layers, the current collector can be further interposed between a pair of safe layers formed from, for example, one or more of calcium carbonate ($CaCO_3$), carbon black, and binders. Alternatively and/or additionally, the current collector can be interposed between a pair of positive thermal coefficient (PTC) layers formed, for example, from a polymer (e.g., polyethylene and/or the like) and carbon black.

In some implementations of the current subject matter, the anti-corrosion layers may be formed atop of and/or disposed on the metal current collector by one or more processing methods including, for example, extrusion or slot die coating with and/or without solvent, ink-jet printing, gravure coating, plasma, reverse roll coating with slurry, casting, thermal spray, vapor deposition, curing, hot lamination of metal foil with conductive polymer film, vapor deposition of metal onto conductive polymer film, and/or the like. It should be appreciated that the processing method used to form and/or dispose anti-corrosion layers may depend on the materials forming the anti-corrosion layers.

FIG. 1 depicts a schematic diagram illustrating a current collector 100 interposed between a pair of anti-corrosion layers consistent with implementations of the current subject matter. As shown in FIG. 1, in some implementations of the current subject matter, the current collector 100 may be interposed between a pair of anti-corrosion layers including, for example, a first anti-corrosion layer 110A and a second anti-corrosion layer 110B. As shown in FIG. 1, the current collector 100, the first anti-corrosion layer 110A, and the second anti-corrosion layer 110B may be part of a battery cell 150. It should be appreciated that the battery cell 150 may be any type of battery including, for example, a metal battery (e.g., a lithium (Li) battery and/or the like), an ionic liquid battery (e.g., a sodium (Na) ion battery and/or the like), a water-based battery, and/or the like.

In some implementations of the current subject matter, the first anti-corrosion layer 110A and/or the second anti-corrosion layer 110B may be configured to protect the current collector 100 from corrosion caused, for example, by exposure to a hostile environment that is excessively acidic (e.g., pH<4) and/or basic (e.g., pH>9). The hostile environment may arise due to the presence of an air stable lithium salt (e.g., lithium trifluoromethanesulfonate ($CF_3SO_3Li$), lithium bis(trifluoromethane sulfone)imide ($LiN(SO_2CF_3)_2$) (LiTFSI), and/or the like) in an electrolyte of the battery cell 150. Alternatively and/or additionally, the hostile environment may arise due to the oxidization of a non-air stable lithium salt (e.g., lithium hexafluorophosphate ($LiFP_6$)), which may be part of a carbonate electrolyte in the battery cell 150.

Figure 5A:
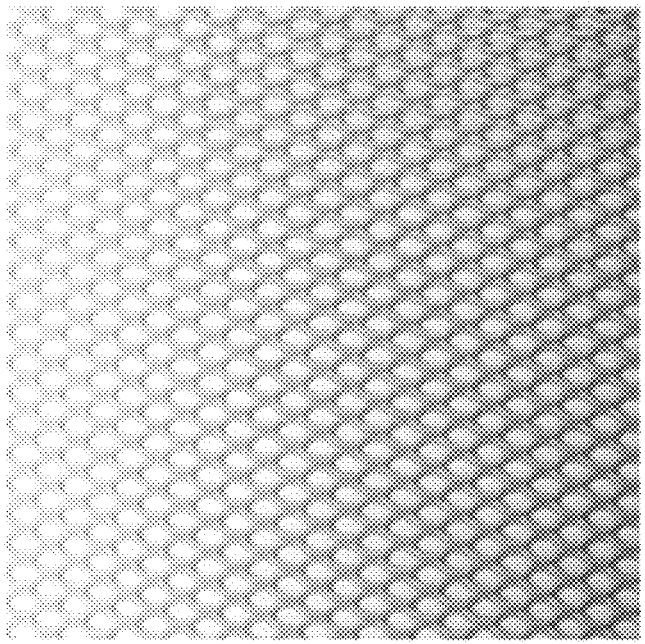
FIG. 5A depicts examples of an expanded metal consistent with implementations of the current subject matter.
Figure 5A:
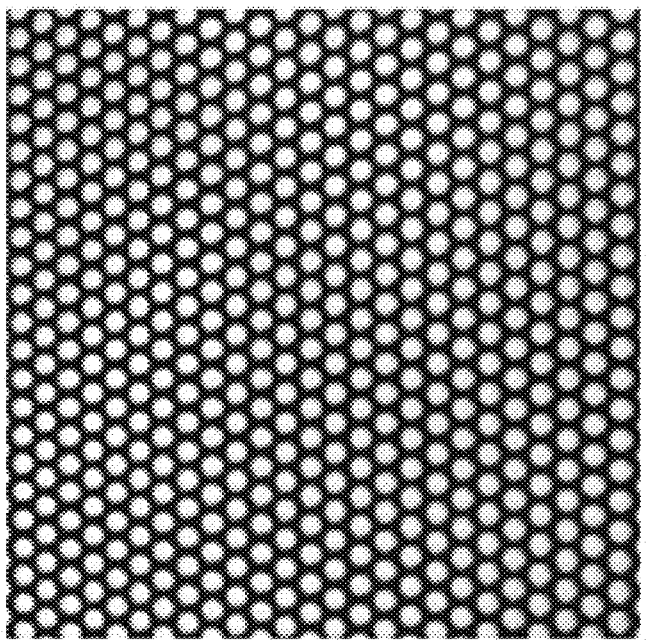
Figure 5B:
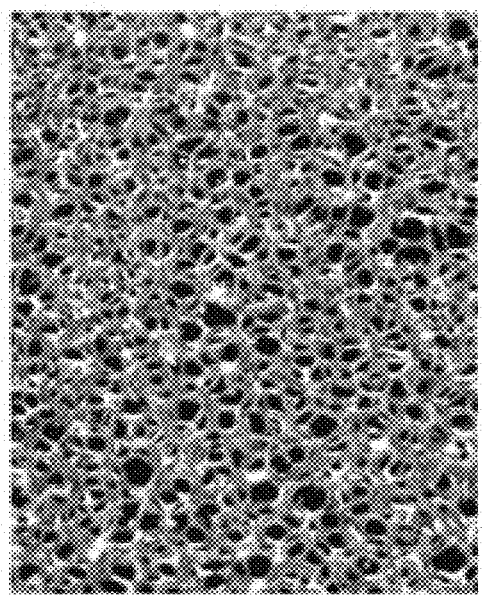
FIG. 5B depicts an example of a metal foam consistent with implementations of the current subject matter.

In some implementations of the current subject matter, the current collector 100 may be a metal collector formed from any metal including, for example, aluminum (Al), chromium (Cr), titanium (Ti), stainless steel, and/or the like. The current collector 100 may be formed from an expanded metal, a metal foil, a metal mesh, a conductive graphene foil, a metal foam, and/or the like. To further illustrate, FIG. 5A depicts examples of an expanded metal such as, for example, an expanded aluminum (Al) metal. Meanwhile, FIG. 5B depicts an example of a metal foam such as, for example, an aluminum (Al) foam.

In some implementations of the current subject matter, the first anti-corrosion layer 110A and/or the second anti-corrosion layer 110B may be formed from an oxide including, for example, zirconium oxide ($ZrO_2$), chromium oxide ($Cr_2O_3$), titanium oxide ($TiO_2$), aluminum oxide ($Al_2O_3$), and/or the like, and nitrides like aluminum nitride (AlN), boron nitride (BN), silicon nitride (SiN), titanium nitride (TiN), tantalum nitride (TaN), gallium nitride (GaN), and/or the like. The first anti-corrosion layer 110A and/or the second anti-corrosion layer 110B may also be formed from a conductive polymer such as, for example, polyacetylene, polyphenylene vinylene, polypyrrole (X=S), polythiphene (X=S), polyaniline (X=NH/N), polyphenylene sulfide (X=S), and/or the like. Alternatively and/or additionally, the first anti-corrosion layer 110A and/or the second anti-corrosion layer 110B may be formed from a carbonate such as, for example, lithium carbonate ($Li_2CO_3$), sodium carbonate ($Na_2CO_3$), potassium carbonate ($K_2CO_3$), calcium carbonate ($CaCO_3$), and/or the like. It should be appreciated that the first anti-corrosion layer 110A and/or the second anti-corrosion layer 110B may also be formed from a combination of oxides, carbonates, polymers (e.g., polyacetylene, polyethylene (PE), polypropylene (PP) and/or the like), and/or any other suitable material.

In some implementations of the current subject matter, the first anti-corrosion layer 110A and/or the second anti-corrosion layer 110B may include a thermoset resin such as, for example, polysiloxanes, polyurethanes, polytetrafluoroethylene (PTFE), polyether sulfone (PES), polyphenylene sulfide (PPS), and/or the like. For example, thermoset resin forming the first anti-corrosion layer 110A and/or the second anti-corrosion layer 110 may be disposed on the current collector 100 in a prepolymer state in which the thermoset resin may take the form of a soft solid and/or a viscous liquid. The thermoset resin may subsequently be cured to form an infusible, insoluble polymer network. For instance, the thermoset resin may be cured by being subject to heat, radiation, and/or pressure. Alternatively and/or additionally, the thermoset resin may be cured by being combined with a catalyst and/or a crosslinking agent under atmospheric conditions and/or ambient temperature. It should be appreciated that the resulting first anti-corrosion layer 110A and/or the second anti-corrosion layer 110, due to the inclusion of the thermoset resin, may exhibit high thermal, oxidative, and/or hydrolytic stability. Furthermore, the first anti-corrosion layer 110A and/or the second anti-corrosion layer 110 may exhibit resistance to aqueous mineral acids, alkalis, salt solutions, oils, and/or greases.

According to some implementations of the current subject matter, the first anti-corrosion layer 110A and/or the second anti-corrosion layer 110B may further include one or more conductive materials such as, for example, carbon black, nano carbon tubes, graphene, and/or the like. It should be appreciated that the addition of the conductive materials may render the first anti-corrosion layer 110A and/or the second anti-corrosion layer 110B electrically conductive.

In some implementations of the current subject matter, when the first anti-corrosion layer 110A and/or the second anti-corrosion layer 110B is formed from an oxide, the first anti-corrosion layer 110A and/or the second anti-corrosion layer 110B may be disposed on the current collector 100 by thermal spray. Alternatively and/or additionally, when the first anti-corrosion layer 110A and/or the second anti-corrosion layer 110B is formed from a conductive polymer, the first anti-corrosion layer 110A and/or the second anti-corrosion layer 110B may be disposed on the current collector 100 by casting.

In some implementations of the current subject matter, the first anti-corrosion layer 110A and/or the second anti-corrosion layer 110B may be disposed onto the current collector 100 by die coating at high temperature without any solvent, when the first anti-corrosion layer 110A and/or the second anti-corrosion layer 110B are formed from a combination of oxides, carbonates, and polymers. It should be appreciated that the first anti-corrosion layer 110A and/or the second anti-corrosion layer 110B may be disposed using this technique whether or not the polymers included in the first anti-corrosion layer 110A and/or the second anti-corrosion layer 110B may be disposed onto the current collector 100 are mixed into a solvent such as, for example, cyclohexene ($C_6H_{10}$), octane ($C_8H_{18}$), and/or the like.

Figure 2:
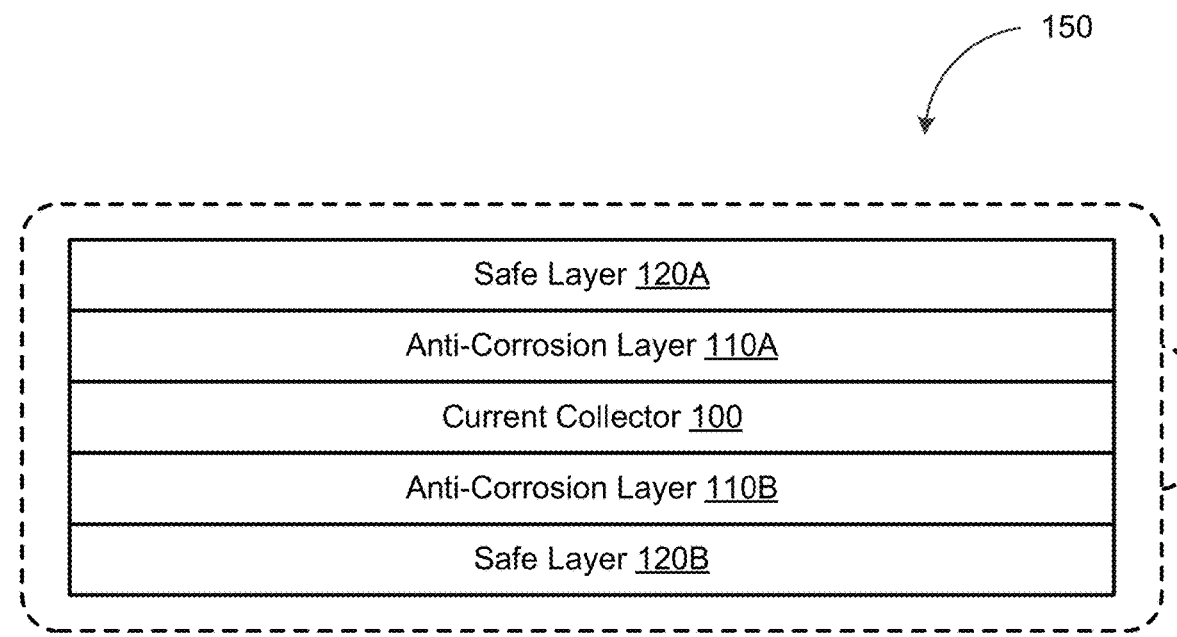
FIG. 2 depicts a schematic diagram illustrating a current collector interposed between a pair of anti-corrosion layers and a pair of safe layers consistent with implementations of the current subject matter.

FIG. 2 depicts a schematic diagram illustrating the current collector 100 interposed between a pair of anti-corrosion layers and a pair of safe layers consistent with implementations of the current subject matter. Referring to FIGS. 1-2, in addition to being interposed between the first anti-corrosion layer 110A and the second anti-corrosion layer 110B, the current collector 100 can be further interposed between a pair of safe layers including, for example, a first safe layer 120A and a second safe layer 120B. As shown in FIG. 2, the battery cell 150 may include the current collector 100, the first anti-corrosion layer 110A, the second anti-corrosion layer 110B, the first safe layer 120A, and the second safe layer 120B. It should be appreciated that the first anti-corrosion layer 110A, the second anti-corrosion layer 110B, the first safe layer 120A, and/or the second safe layer 120B may be disposed in any order to form the battery cell 150. For instance, the first anti-corrosion layer 110A and/or the second anti-corrosion layer 110B may be disposed on top of the first safe layer 120A and/or the second safe layer 120B instead of and/or in addition to being disposed underneath the first safe layer 120A and/or the second safe layer 120B.

In some implementations of the current subject matter, the first safe layer 120A and/or the second safe layer 120B may be configured to respond to a temperature, voltage, and/or current trigger, for example, by forming a nonconductive gap that electrically decouples the current collector 100 from a corresponding electrode. For example, the first safe layer 120A and/or the second safe layer 120B can exhibit positive thermal expansion properties and/or negative thermal expansion properties such that the first safe layer 120A and/or the second safe layer 120B can expand and/or contract when the battery cell 150 is exposed to an increase in temperature. Alternatively and/or additionally, the first safe layer 120A and/or the second safe layer 120B may be configured to respond to the temperature, voltage, and/or current trigger by undergoing an increase in electrical resistivity that creates a high resistance gap between the current collector 100 and the corresponding electrode. As used herein, the temperature, voltage, and/or current trigger may refer to a condition in which the battery cell 150 is exposed to a temperature, voltage, and/or current exceeding a threshold value. The nonconductive gap and/or the high resistance gap may serve to interrupt and/or minimize a current flow within the battery cell 150, thereby mitigating the hazards that arise when the battery cell 150 is overcharged, overheated, and/or develops an internal short circuit.

According to some implementations of the current subject matter, to form a nonconductive gap between the current collector 100 and a corresponding electrode, the first safe layer 120A and/or the second safe layer 120B may generate a gas and/or a liquid that vaporizes to form the gas. The nonconductive gap between the current collector 100 and the corresponding electrode may be formed when the gas separates the current collector 100 from the corresponding electrode. Alternatively and/or additionally, the first safe layer 120A and/or the second safe layer 120B may decompose and/or delaminate in order to form the nonconductive gap between the current collector 100 and the corresponding electrode. For example, a lithium salt in the electrolyte of the battery cell 150 may decompose, when exposed to a high temperature and/or a high voltage, to form one or more reactants that trigger a decomposition and/or delamination of the first safe layer 120A and/or a second safe layer 120B. For instance, lithium hexafluorophosphate ($LiPF_6$) in the electrolyte of the battery cell 150 may decompose to form hydrofluoric acid, which may further react with a carbonate (e.g., calcium carbonate ($CaCO_3$)) in the first safe layer 120A and/or a second safe layer 120B to form a fluoride (e.g., calcium fluoride ($CaF_2$)) and carbon dioxide ($CO_2$) gas. As another example, lithium tetrafluoroborate ($LiBF_4$) in the electrolyte of the battery cell 150 may decompose to form lithium fluoride (LiF) and boron trifluoride ($BF_3$) gas. The terphenyl (e.g., ortho-terphenyl) included in the electrolyte may further polymerize with polymers and/or terphenyl analogs (e.g., para-terphenyl) included in the first safe layer 120A and/or a second safe layer 120B.

In some implementations of the current subject matter, the first safe layer 120A and/or the second safe layer 120B may be formed from a positive thermal coefficient (PTC) material including, for example, polyethylene (PE) and carbon black, polyvinylidene fluoride (PVDF) and carbon black, an inorganic conductive ceramic (e.g., barium titanium oxide ($BaTiO_2$) and/or the like) and polyethylene (PE). Alternatively and/or additionally, the first safe layer 120A and/or the second safe layer 120B may be formed from a binder and a compound that is configured to decompose in response to the temperature, voltage, and/or current trigger. The decomposition of the compound may result in the formation of the nonconductive and/or high resistance gap between the current collector 100 and the corresponding electrode.

In some implementations of the current subject matter, the first safe layer 120A and/or the second safe layer 120B may be formed from a material that undergoes a solid-to-solid phase transition when subject to heat such as, for example, an inorganic conductive ceramic (e.g., barium titanium oxide ($BaTiO_2$) and/or the like), metal-like carbides (e.g., zirconium carbide (ZrC), titanium carbide (TiC), and/or the like), nitrides (e.g., titanium nitride (TiN), tantalum nitride (TaN), aluminum nitride (AlN), boron nitride (BN), and/or the like), and/or the like. It should be appreciated that the solid-to-solid phase transition, which may be triggered by exposure to heat, may be accompanied by a decrease in electrical conductivity. For example, when the first safe layer 120A and/or the second safe layer 120B is formed from a doped and/or an undoped inorganic conductive ceramic (e.g., barium titanium oxide ($BaTiO_2$) and/or the like), which may be optionally combined with one or more oxides (e.g., titanium oxide ($TiO_2$) and/or the like) and/or carbonates (e.g., sodium carbonate ($Na_2CO_3$), potassium carbonate ($K_2CO_3$), calcium carbonate ($CaCO_3$), and/or the like), the first safe layer 120A and/or the second safe layer 120B may become an insulator at temperatures above 130° C. Alternatively and/or additionally, when the first safe layer 120A and/or the second safe layer 120B is formed from a metal-like carbide (e.g., zirconium carbide (ZrC), titanium carbide (TiC), and/or the like), the electrical conductivity of the first safe layer 120A and/or the second safe layer 120B may initially be high (e.g., up to 10.5 siemens per centimeter (S/cm)) but may decrease as the first safe layer 120A and/or the second safe layer 120B is subject to rising temperatures.

According to some implementations of the current subject matter, one or more conductive materials may be added to the first safe layer 120A and/or the second safe layer 120B, thereby rendering the first safe layer 120A and/or the second safe layer 120B electrically conductive. For instance, the one or more conductive materials may include, for example, carbon black, nano carbon tubes, graphene, and/or the like.

Figure 3:
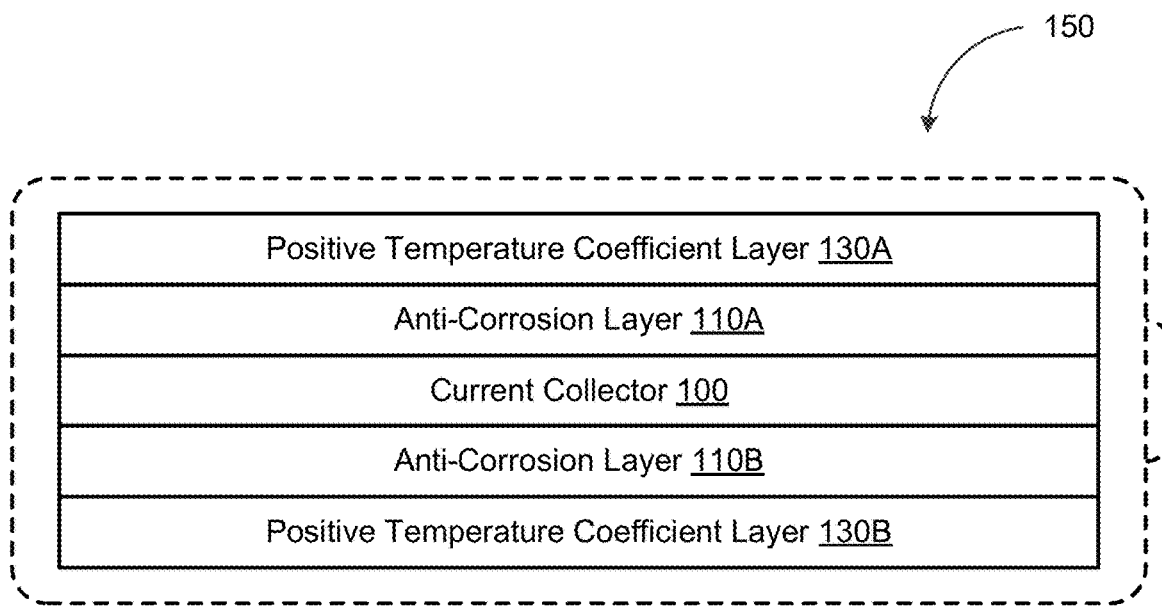
FIG. 3 depicts a schematic diagram illustrating a current collector interposed between a pair of anti-corrosion layers and a pair of positive thermal coefficient (PTC) layers consistent with implementations of the current subject matter.

FIG. 3 depicts a schematic diagram illustrating the current collector interposed between a pair of anti-corrosion layers and a pair of positive thermal coefficient (PTC) layers consistent with implementations of the current subject matter. Referring to FIGS. 1 and 3, in addition to being interposed between the first anti-corrosion layer 110A and the second anti-corrosion layer 110B, the current collector 100 can be further interposed between a pair of positive thermal coefficient (PTC) layers including, for example, a first positive thermal coefficient layer 130A and a second positive thermal coefficient layer 130B. As shown in FIG. 3, the current collector 100, the first anti-corrosion layer 110A, the second anti-corrosion layer 110B, the first positive thermal coefficient layer 130A, and the second positive thermal coefficient layer 130B may be part of the battery cell 150. Moreover, it should be appreciated that the first anti-corrosion layer 110A, the second anti-corrosion layer 110B, the first positive thermal coefficient layer 130A, and/or the second positive thermal coefficient layer 130B may be disposed in any order to form the battery cell 150. For example, the first anti-corrosion layer 110A and/or the second anti-corrosion layer 110B may be disposed on top of the first positive temperature coefficient layer 130A and/or the second positive temperature coefficient layer 130B instead of and/or in addition to being disposed underneath the first positive temperature coefficient layer 130A and/or the second positive temperature coefficient layer 130B.

In some implementations of the current subject matter, the first positive thermal coefficient layer 130A and/or the second positive thermal coefficient layer 130B may be formed from a positive thermal coefficient (PTC) material including, for example, polyethylene (PE) and carbon black, polyvinylidene fluoride (PVDF) and carbon black, an inorganic conductive ceramic (e.g., barium titanium oxide (BaTiO$_2$) and/or the like) and polyethylene (PE). Accordingly, the first positive thermal coefficient layer 130A and/or the second positive thermal coefficient layer 130B may respond to an increase in surrounding temperatures by undergoing a corresponding increase in electrical resistivity. This increase in the electrical resistivity across the first positive thermal coefficient layer 130A and/or the second positive thermal coefficient layer 130B may form, between the current collector 100 and the corresponding electrode, a high-resistance gap that minimizes a current flow within the battery cell 150. As noted, minimizing the current flow within the battery cell 150 may mitigate the hazards that arise when the battery cell 150 is overcharged, overheated, and/or develops an internal short circuit.

Figure 4:
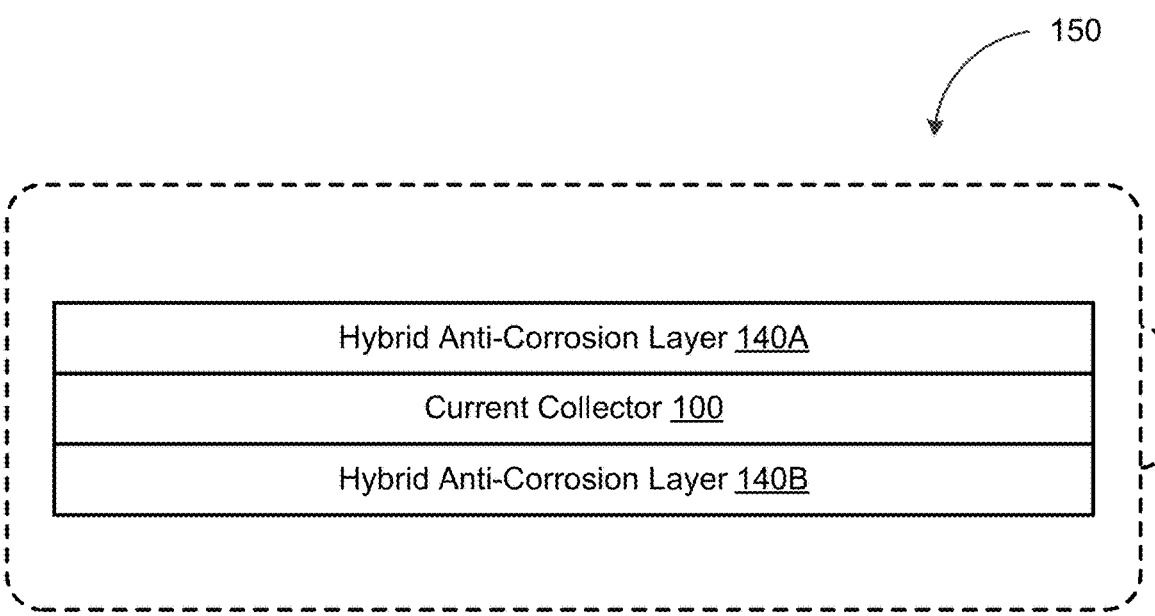
FIG. 4 depicts a schematic diagram illustrating a current collector interposed between a pair of hybrid anti-corrosion layers consistent with implementations of the current subject matter.

FIG. 4 depicts a schematic diagram illustrating the current collector 100 interposed between a pair of hybrid anti-corrosion layers consistent with implementations of the current subject matter. For instance, as shown in FIG. 4, the current collector 100 may be interposed between a pair of hybrid anti-corrosion layers including, for example, a first hybrid anti-corrosion layer 140A and a second hybrid anti-corrosion layer 140B. The current collector 100, the first hybrid anti-corrosion layer 140A, and the second hybrid anti-corrosion layer 140B may be part of the battery cell 150.

In some implementations of the current subject matter, the first hybrid anti-corrosion layer 140A and/or the second hybrid anti-corrosion layer 140B may be configured to protect the current collector 100 from corrosion caused, for example, by exposure to a hostile environment that is excessively acidic (e.g., pH<4) and/or basic (e.g., pH>9). Furthermore, the first hybrid anti-corrosion layer 140A and/or the second hybrid anti-corrosion layer 140B may respond to a temperature, voltage, and/or current trigger by forming a nonconductive and/or high resistance gap between the current collector 100 and a corresponding electrode. The nonconductive gap and/or the high resistance gap may serve to interrupt and/or minimize a current flow within the battery cell 150. As noted, interrupting and/or minimizing the current flow within the battery cell 150 may mitigate the hazards that arise when the battery cell 150 is overcharged, overheated, and/or develops an internal short circuit.

Figure 6:
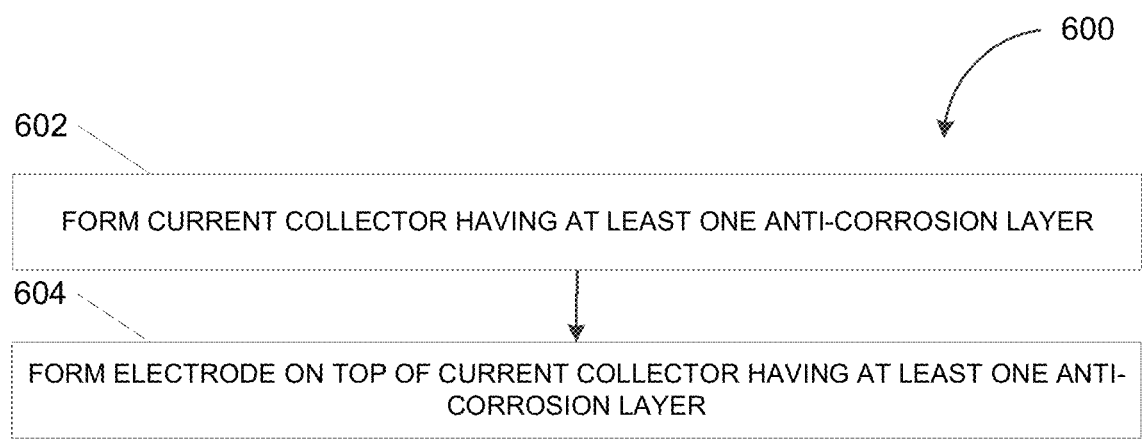
FIG. 6 depicts a flowchart illustrating a process for preparing an electrode coupled with a protected current collector consistent with implementations of the current subject matter.

FIG. 6 depicts a flowchart illustrating a process 600 for preparing an electrode coupled with a protected current collector consistent with implementations of the current subject matter. Referring to FIGS. 1-4 and 6, the process 600 can be performed to form the current collector 100, which may be interposed between a pair of anti-corrosion layers (e.g., the first anti-corrosion layer 110A and the second anti-corrosion layer 110B, the first hybrid anti-corrosion layer 140A and the second hybrid anti-corrosion layer 140B, and/or the like). As shown in FIG. 2-3, in addition to being interposed between a pair of anti-corrosion layers, the current collector 100 may be further interposed between a pair of safe layers (e.g., the first safe layer 120A and the second safe layer 120B, the first positive thermal coefficient layer 130A and the second temperature coefficient layer 130B, and/or the like).

A current collector having at least one anti-corrosion layer can be formed (602). In some implementations of the current subject matter, the first anti-corrosion layer 110A and/or the second anti-corrosion layer 110B may be formed atop of and/or disposed on the current collector 100 using one or more processing methods including, for example, extrusion or slot die coating with and/or without solvent, reverse roll coating with slurry, casting, thermal spray, vapor deposition, curing, hot lamination of metal foil with conductive polymer film, vapor deposition of metal onto conductive polymer film, and/or the like. The processing method used to form and/or dispose anti-corrosion layers may depend on the materials forming the anti-corrosion layers.

For example, when the first anti-corrosion layer 110A and/or the second anti-corrosion layer 110B is formed from an oxide, the first anti-corrosion layer 110A and/or the second anti-corrosion layer 110B may be disposed on the current collector 100 by thermal spray. Alternatively and/or additionally, when the first anti-corrosion layer 110A and/or the second anti-corrosion layer 110B is formed from a conductive polymer, the first anti-corrosion layer 110A and/or the second anti-corrosion layer 110B may be disposed on the current collector 100 by casting. When the first anti-corrosion layer 110A and/or the second anti-corrosion layer 110B are formed from a combination of oxides, carbonates, and polymers, the first anti-corrosion layer 110A and/or the second anti-corrosion layer 110B may be disposed onto the current collector 100 by die coating at high temperature without any solvent.

An electrode can be formed on top of the current collector having at least one anti-corrosion layer (604). For example, an electrode can be formed by dissolving a binder into a solvent. A conductive additive can be added to the binder solution to form a slurry. Furthermore, active electrode material can be added to the slurry before the slurry is coated onto the current collector 100, which may be interposed between at least the first anti-corrosion layer 110A and the second anti-corrosion layer 110B. The resulting assembly may subsequently be compressed into a desired thickness.

Figure 7:
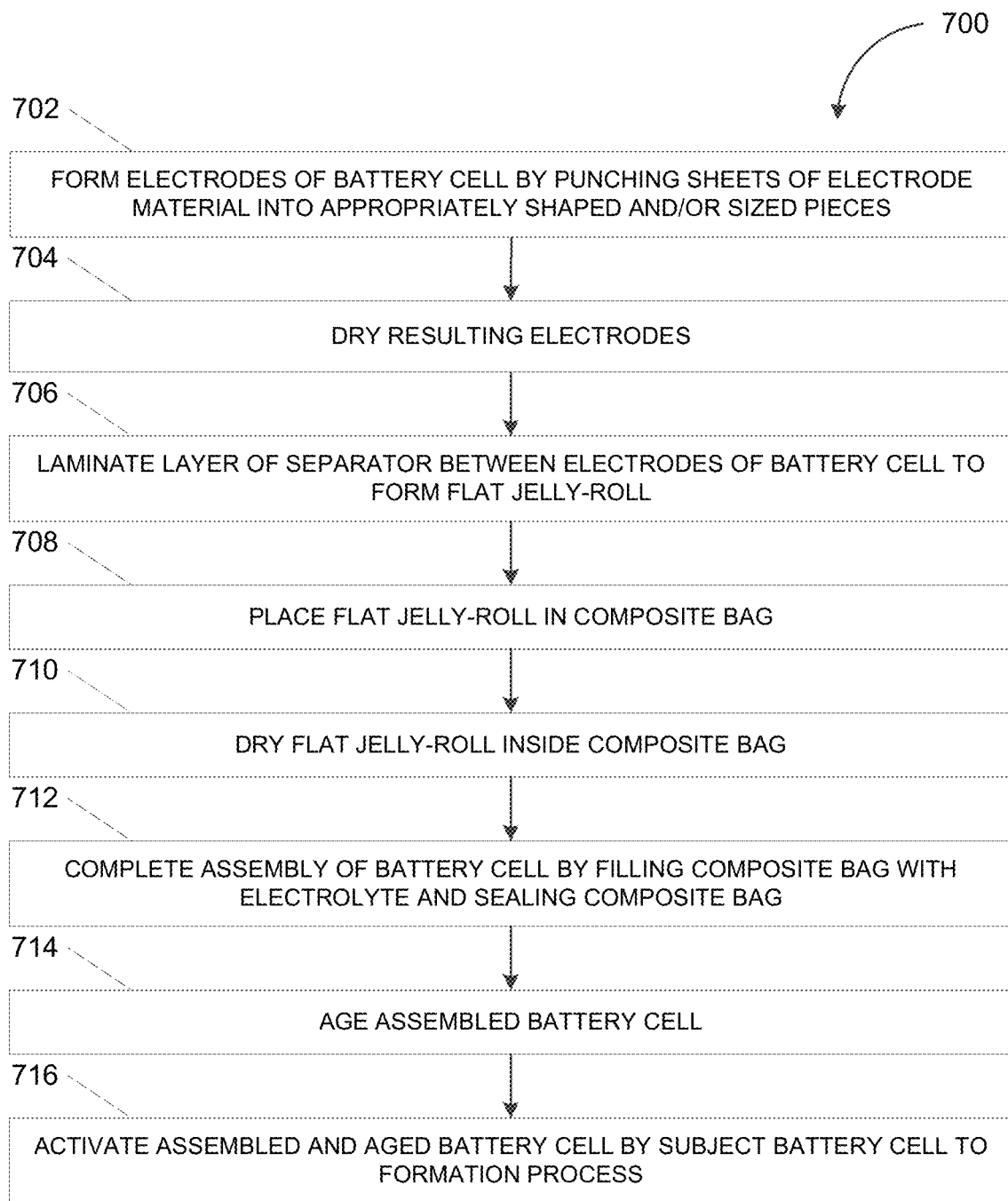
FIG. 7 depicts a flowchart illustrating a process for assembling a battery cell consistent with implementations of the current subject matter.

FIG. 7 depicts a flowchart illustrating a process 700 for assembling a battery cell consistent with implementations of the current subject matter. Referring to FIGS. 1-4 and 6-7, the process 600 can be performed to form the battery cell 150, which may include at least one protected current collector. For instance, as shown in FIGS. 1-4, the battery cell 150 may include the current collector 100, which may be interposed between a pair of anti-corrosion layers (e.g., the first anti-corrosion layer 110A and the second anti-corrosion layer 110B, the first hybrid anti-corrosion layer 140A and the second hybrid anti-corrosion layer 140B, and/or the like) and/or a pair of safe layers (e.g., the first safe layer 120A and the second safe layer 120B, the first positive thermal coefficient layer 130A and the second temperature coefficient layer 130B, and/or the like).

The electrodes of the battery cell can be formed by punching sheets of electrode material into appropriately shaped and/or sized pieces (702). For instance, sheets of positive electrode material and/or negative electrode material can be punched into appropriately shaped and/or sized pieces using an electrode tab. The resulting electrodes can be dried (704). For example, the positive electrode of the battery cell can be dried at 125° C. for 10 hours while the negative electrode of the battery cell can be dried at 140° C. for 10 hours.

A layer of separator can be laminated between the electrodes of the battery cell to form a flat jelly-roll (706). The flat jelly-roll can be placed in a composite bag (708). For instance, the flat jelly-roll formed in operation 706 can be placed inside an aluminum (Al) composite bag. The flat jelly-roll can be dried inside the composite bag (710). For example, the flat jelly-roll inside the aluminum (Al) composite bag can be dried at 70° C. for 10 hours. The composite bag can be filled with electrolyte and sealed to complete the assembly of the battery cell (712).

The assembled battery cell can be aged (714). For instance, the battery cell formed in operation 712 can be aged for 36 hours. The assembled and aged battery cell can be activated by subjecting the battery cell to a formation process (716). For example, the battery cell can undergo a formation process, which refers to a controlled charge and discharge cycle configured to activate the chemical components of the battery cell. This formation process can require the battery cell to be charged by being exposed to a gradually increasing current instead of a constant current such that the buildup of voltage within the battery cell is gradual. It should be appreciated that the battery cell can be ready for grading and/or use subsequent to the completion of the formation process.

Figure 8:
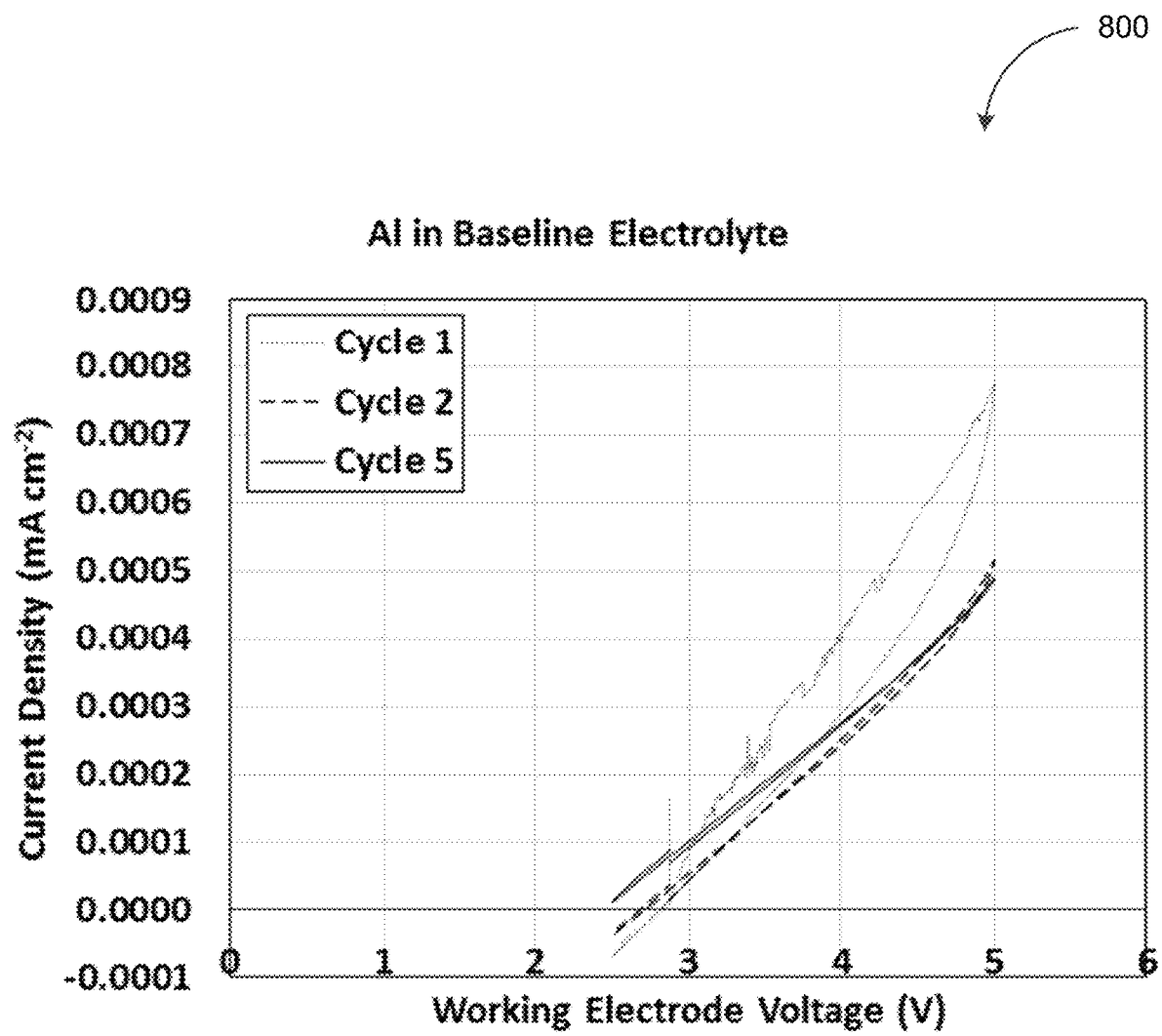
FIG. 8 depicts a graph illustrating a cyclic voltammetry of a battery cell without anti-corrosion protection consistent with implementations of the current subject matter.

Example Baseline Battery Cell with Non-Air Stable Lithium Hexafluorophosphate (LiPF) Based Carbonate Electrolyte for Cyclic Voltammetry Analysis In some implementations of the current subject matter, a baseline battery cell with a non-air stable lithium salt based electrolyte may be prepared to serve as a reference point in analyzing the effects of anti-corrosion protection. The baseline battery cell can include a working electrode formed from aluminum (Al) foil, a counter electrode formed from lithium (Li) foil, and a reference electrode formed from lithium (Li) foil. Furthermore, the baseline battery cell can include an electrolyte formed by dissolving 1.52 grams of lithium hexafluorophosphate ($LiPF_6$), a non-air stable lithium salt, in 10 milliliters of a solvent solution that includes one or more organic carbonates. To form the baseline battery cell, the electrodes (e.g., the working electrode, the counter electrode, and/or the reference electrode) can be cut into strips, which may be attached to alligators clips before being submerged in a sealed jar filled with the lithium hexafluorophosphate ($LiPF_6$) based carbonate electrolyte. While the voltage at the working electrode voltage is swept from 2.5 volts to 5 volts with respect to the reference electrode at a rate of 1 millivolt per second for 5 cycles, the resulting current through the baseline battery cell may be measured. The results are shown in FIG. 8, which depicts a graph 800 illustrating a cyclic voltammetry of the baseline battery cell. FIG. 8 shows a higher current density during the first sweep cycle than in subsequent sweep cycles which may indicate a passivating reaction and stabilized interface. Furthermore, FIG. 8 shows the baseline battery cell as exhibiting minimal hysteresis, which may indicate a stable, reversible, and minimally corrosive reaction between the lithium hexafluorophosphate ($LiPF_6$) based carbonate electrolyte and the working electrode.

Example Baseline Battery Cell with Air Stable Lithium Bis(trifluoromethanesulfonyl)imide ($LiC_2F_6NO_4S_2$) (LiTFSI) Based Electrolyte for Cyclic Voltammetry Analysis In some implementations of the current subject matter, a different baseline battery cell with an air stable lithium salt based electrolyte may be prepared to serve as an alternative and/or additional reference point in analyzing the effects of anti-corrosion protection. This baseline battery cell can also include a working electrode formed from aluminum (Al) foil, a counter electrode formed from lithium (Li) foil, and a reference electrode formed from lithium (Li) foil. But instead of a lithium hexafluorophosphate ($LiPF_6$) based carbonate electrolyte, this baseline battery cell can include an electrolyte that includes the air stable lithium salt lithium bis(trifluoromethanesulfonyl)imide ($LiC_2F_6NO_4S_2$) (LiTFSI). The lithium bis(trifluoromethanesulfonyl)imide ($LiC_2F_6NO_4S_2$) (LiTFSI) based electrolyte may be formed by first preparing 10 grams of a solvent solution that includes a mixture of 3.92 grams of ethylene carbonate (($CH_2O)_2CO$), 2.91 grams of diethyl carbonate (OC($OCH_2CH_3)_2$), and 3.17 grams of dimethyl carbonate (OC($OCH_3)_2$). The solvent solution can be dried with a molecular sieve for 72 hours before 2.56 grams of bis(trifluoromethane)sulfonimide lithium ($CF_3SO_2NLiSO_2CF_3$) salt and 0.1 grams of lithium tetrafluoroborate ($LiBF_4$) are added to the solvent solution.

Figure 9:
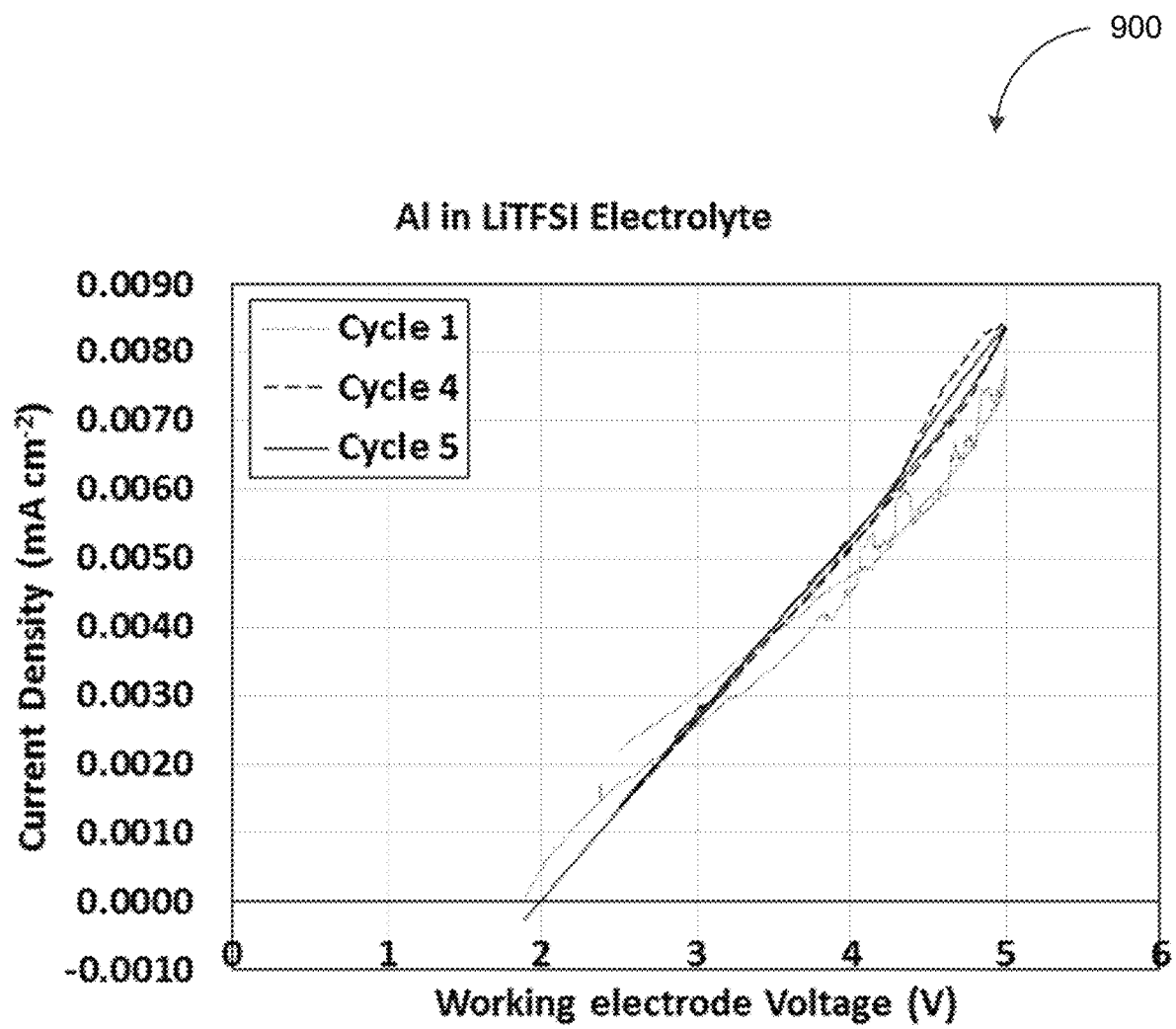
FIG. 9 depicts a graph illustrating a cyclic voltammetry of a battery cell without anti-corrosion protection consistent with implementations of the current subject matter.

To form the baseline battery cell, the electrodes (e.g., the working electrode, the counter electrode, and/or the reference electrode) can be cut into strips, which may be attached to alligators clips before being submerged in a sealed jar filled with the lithium bis(trifluoromethanesulfonyl)imide ($LiC_2F_6NO_4S_2$) (LiTFSI) based electrolyte. While the voltage at the working electrode voltage is swept from 2.5 volts to 5 volts with respect to the reference electrode at a rate of 1 millivolt per second for 5 cycles, the resulting current through the baseline battery cell may be measured. The results are shown in FIG. 9, which depicts a graph 900 illustrating a cyclic voltammetry of the baseline battery cell. FIG. 9 shows an increase in current density with each successive sweep cycle, which may indicate a spontaneous reaction. This spontaneous reaction may be attributed to the corrosion of the aluminum (Al) forming the working electrode by the lithium-imide salts in the lithium bis(trifluoromethanesulfonyl)imide ($LiC_2F_6NO_4S_2$) (LiTFSI) based electrolyte.

Example Battery Cell with Anti-Corrosion Electrodes and Air Stable Lithium Bis(trifluoromethanesulfonyl)imide ($LiC_2F_6NO_4S_2$) (LiTFSI) Based Electrolyte for Cyclic Voltammetry Analysis In some implementations of the current subject matter, a battery cell with anti-corrosion protection may include one or more anti-corrosion layers formed from aluminum oxide ($Al_2O_3$), calcium carbonate ($CaCO_3$), and/or a combination of the two. The battery cell can include a working electrode formed from aluminum (Al) foil, a counter electrode formed from lithium (Li) foil, and a reference electrode formed from lithium (Li) foil. To form the working electrode of the battery cell, which may be coupled with a current collector that is interposed between one or more anti-corrosion layers, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide ($Al_2O_3$) or calcium carbonate ($CaCO_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter ($mg/cm^2$).

The battery cell can include a lithium bis(trifluoromethanesulfonyl)imide ($LiC_2F_6NO_4S_2$) (LiTFSI) based electrolyte formed by first preparing 10 grams of a solvent solution that includes a mixture of 3.92 grams of ethylene carbonate (($CH_2O)_2CO$), 2.91 grams of diethyl carbonate ($OC(OCH_2CH_3)_2$), and 3.17 grams of dimethyl carbonate ($OC(OCH_3)_2$). The solvent solution can be dried with a molecular sieve for 72 hours before 2.56 grams of bis(trifluoromethane)sulfonimide lithium ($CF_3SO_2NLiSO_2CF_3$) salt and 0.1 grams of lithium tetrafluoroborate ($LiBF_4$) are added to the solvent solution.

Figure 10:
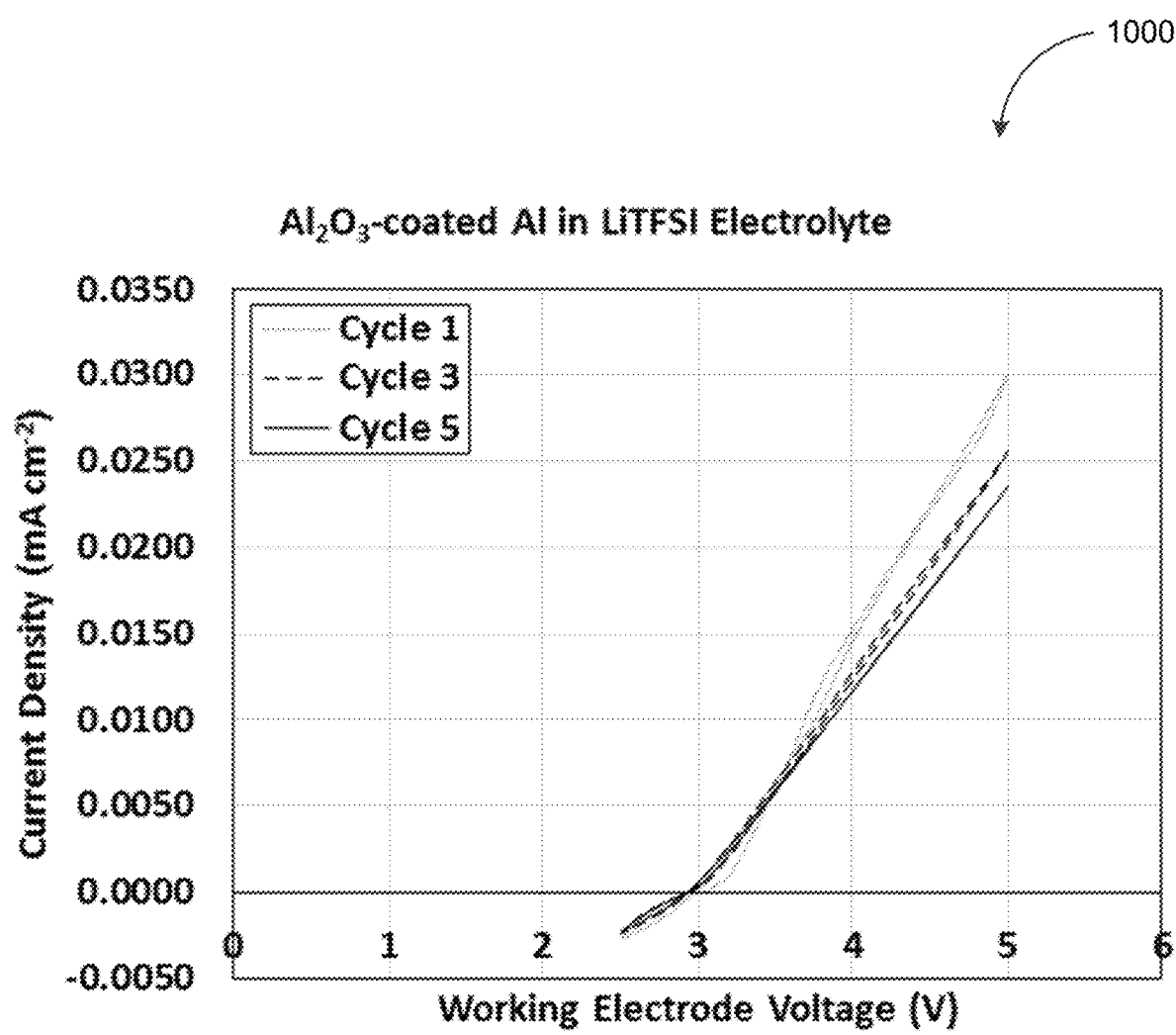
FIG. 10 depicts a graph illustrating a cyclic voltammetry of a battery cell with anti-corrosion protection consistent with implementations of the current subject matter.

To form the battery cell, the electrodes (e.g., the working electrode, the counter electrode, and/or the reference electrode) can be cut into strips, which may be attached to alligators clips before being submerged in a sealed jar filled with the lithium bis(trifluoromethanesulfonyl)imide ($LiC_2F_6NO_4S_2$) (LiTFSI) based electrolyte. While the voltage at the working electrode voltage is swept from 2.5 volts to 5 volts with respect to the reference electrode at a rate of 1 millivolt per second for 5 cycles, the resulting current through the battery cell may be measured. The results are shown in FIG. 10, which depicts a graph 1000 illustrating a cyclic voltammetry of the battery cell having anti-corrosion electrodes and a lithium bis(trifluoromethanesulfonyl)imide ($LiC_2F_6NO_4S_2$) (LiTFSI) based electrolyte. FIG. 10 shows an absence of hysteresis, which may indicate a stable, reversible, and minimally corrosive reaction between the working electrode and the lithium bis(trifluoromethanesulfonyl)imide ($LiC_2F_6NO_4S_2$) (LiTFSI) based electrolyte. Furthermore, FIG. 10 shows a decrease in current density with each successive sweep cycle, which may indicate a passivating reaction between the working electrode and the lithium-imide salts in the lithium bis(trifluoromethanesulfonyl)imide ($LiC_2F_6NO_4S_2$) (LiTFSI) based electrolyte.

Example Battery Cell with Aluminum Nitride (AlN) Anti-Corrosion Electrodes and Air Stable Lithium Bis(trifluoromethanesulfonyl)imide ($LiC_2F_6NO_4S_2$) (LiTFSI) Based Electrolyte for Cyclic Voltammetry Analysis In some implementations of the current subject matter, a battery cell with anti-corrosion protection may include one or more anti-corrosion layers formed from 73% aluminum nitride (AlN) by weight. It should be appreciated that aluminum nitride may be associated with a number of advantages including, for example, a uniform microstructure and a thermal expansion coefficient that is similar to that of silicon (Si). Anti-corrosion layers formed from aluminum nitride (AlN) may exhibit high thermal conductivity (e.g., 70-180 kelvin-meters per watt ($Wm^{-1}K^{-1}$)), high electrical resistivity, and high chemical stability (e.g., up to 980° C. in pure hydrogen ($H_2$) and/or carbon dioxide ($CO_2$), and up to 1380° C. in air). Furthermore, anti-corrosion layers formed from aluminum nitride (AlN) may exhibit resistance to corrosion, erosion, and thermal shock.

The battery cell can include a working electrode formed from aluminum (Al), a counter electrode formed from lithium (Li), and a reference electrode formed from lithium (Li). To form the working electrode of the battery cell, which may be coupled with a current collector that is interposed between one or more anti-corrosion layers formed from 73% aluminum nitride (AlN) by weight, 1 gram of poly(ethylene-co-vinyl) acetate (PEVA), 3 grams of aluminum nitride (AlN), and 0.1 grams of carbon (C) can be dissolved in 5.9 grams of toluene to form a slurry. The slurry can be coated onto one side of an aluminum (Al) current collector via doctor blading and dried under vacuum at 70° C.

The lithium bis(trifluoromethanesulfonyl)imide ($LiC_2F_6NO_4S_2$) (LiTFSI) based electrolyte may be formed by first preparing 10 grams of a solvent solution that includes a mixture of 3.92 grams of ethylene carbonate (($CH_2O)_2CO$), 2.91 grams of diethyl carbonate ($OC(OCH_2CH_3)_2$), and 3.17 grams of dimethyl carbonate ($OC(OCH_3)_2$). The solvent solution can be dried with a molecular sieve for 72 hours before 2.56 grams of bis(trifluoromethane)sulfonimide lithium ($CF_3SO_2NLiSO_2CF_3$) salt and 0.1 grams of lithium tetrafluoroborate ($LiBF_4$) are added to the solvent solution.

Figure 11:
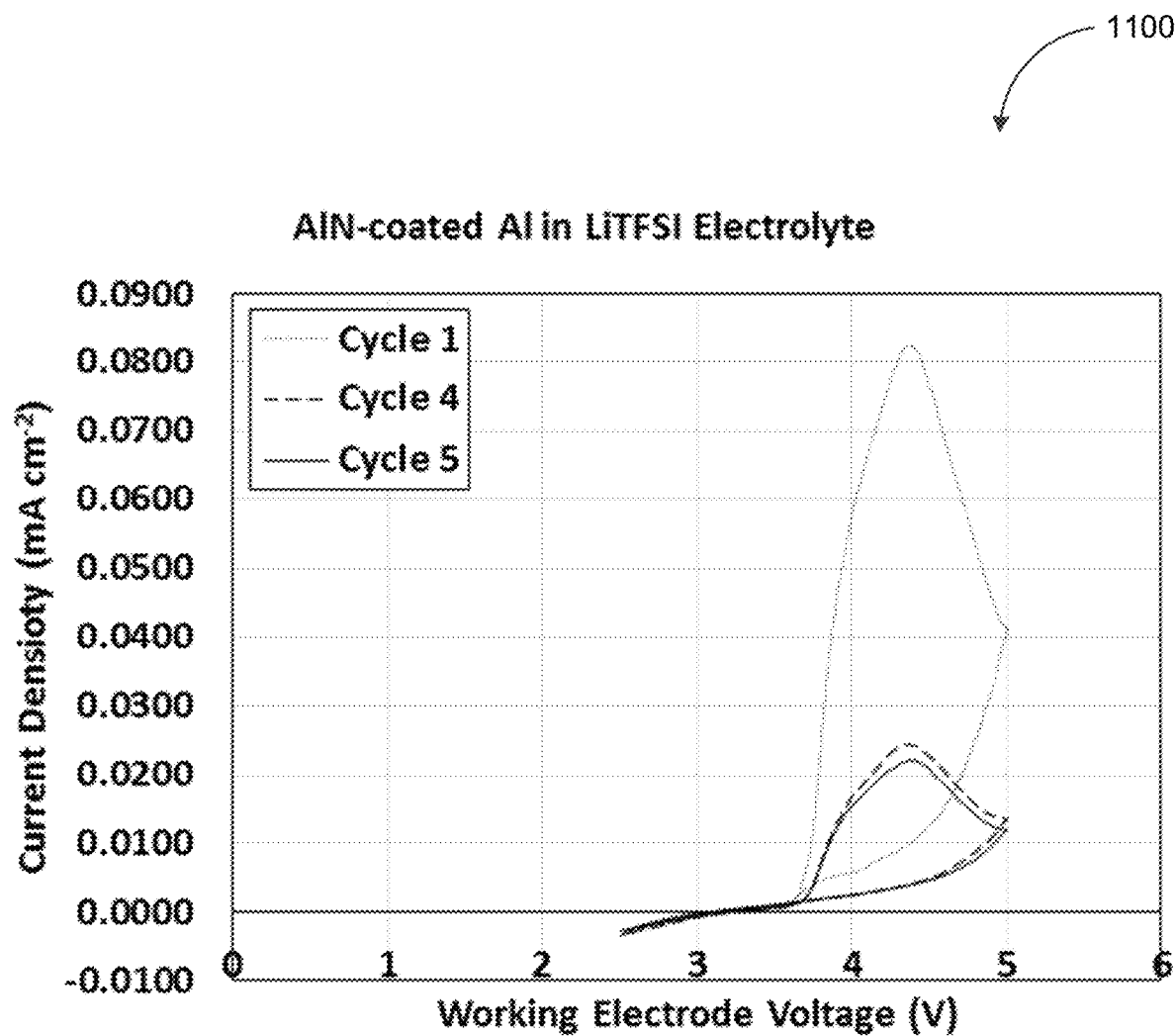
FIG. 11 depicts a graph illustrating a cyclic voltammetry of a battery cell with anti-corrosion protection consistent with implementations of the current subject matter.

To form the battery cell, the electrodes (e.g., the working electrode, the counter electrode, and/or the reference electrode) can be cut into strips, which may be attached to alligators clips before being submerged in a sealed jar filled with the lithium bis(trifluoromethanesulfonyl)imide ($LiC_2F_6NO_4S_2$) (LiTFSI) based electrolyte. While the voltage at the working electrode voltage is swept from 2.5 volts to 5 volts with respect to the reference electrode at a rate of 1 millivolt per second for 5 cycles, the resulting current through the battery cell may be measured. The results are shown in FIG. 11, which depicts a graph 1100 illustrating a cyclic voltammetry of the battery cell having aluminum nitride (AlN) anti-corrosion electrodes and a lithium bis(trifluoromethanesulfonyl)imide ($LiC_2F_6NO_4S_2$) (LiTFSI) based electrolyte. FIG. 11 shows hysteresis between 3 volts and 5 volts, which may be attributed to a reaction with the aluminum nitride (AlN) current collectors instead of the corrosion of the aluminum (Al) current collector. Meanwhile, a reduction in current density between successive sweep cycles may indicate interface stabilization.

Example Battery Cell with Aluminum Nitride (AlN) Anti-Corrosion Electrodes and Air Stable Lithium Bis(trifluoromethanesulfonyl)imide ($LiC_2F_6NO_4S_2$) (LiTFSI) Based Electrolyte for Cyclic Voltammetry Analysis In some implementations of the current subject matter, a battery cell with anti-corrosion protection may include one or more anti-corrosion layers formed from 82% aluminum nitride (AlN) by weight. The battery cell can include a working electrode formed from aluminum (Al), a counter electrode formed from lithium (Li), and a reference electrode formed from lithium (Li). To form the working electrode, which may be interposed between one or more anti-corrosion layers formed from 82% aluminum nitride (AlN) by weight, 1 gram of poly(ethylene-co-vinyl) acetate (PEVA), 5 grams of aluminum nitride (AlN), and 0.1 grams of carbon (C) can be dissolved in 3.9 grams of toluene to form a slurry. The slurry can be coated onto one side of an aluminum (Al) current collector via doctor blading and dried under vacuum at 70° C.

The lithium bis(trifluoromethanesulfonyl)imide ($LiC_2F_6NO_4S_2$) (LiTFSI) based electrolyte may be formed by first preparing 10 grams of a solvent solution that includes a mixture of 3.92 grams of ethylene carbonate (($CH_2O)_2CO$), 2.91 grams of diethyl carbonate (OC($OCH_2CH_3)_2$), and 3.17 grams of dimethyl carbonate (OC($OCH_3)_2$). The solvent solution can be dried with a molecular sieve for 72 hours before 2.56 grams of bis(trifluoromethane)sulfonimide lithium ($CF_3SO_2NLiSO_2CF_3$) salt and 0.1 grams of lithium tetrafluoroborate ($LiBF_4$) are added to the solvent solution.

Figure 12:
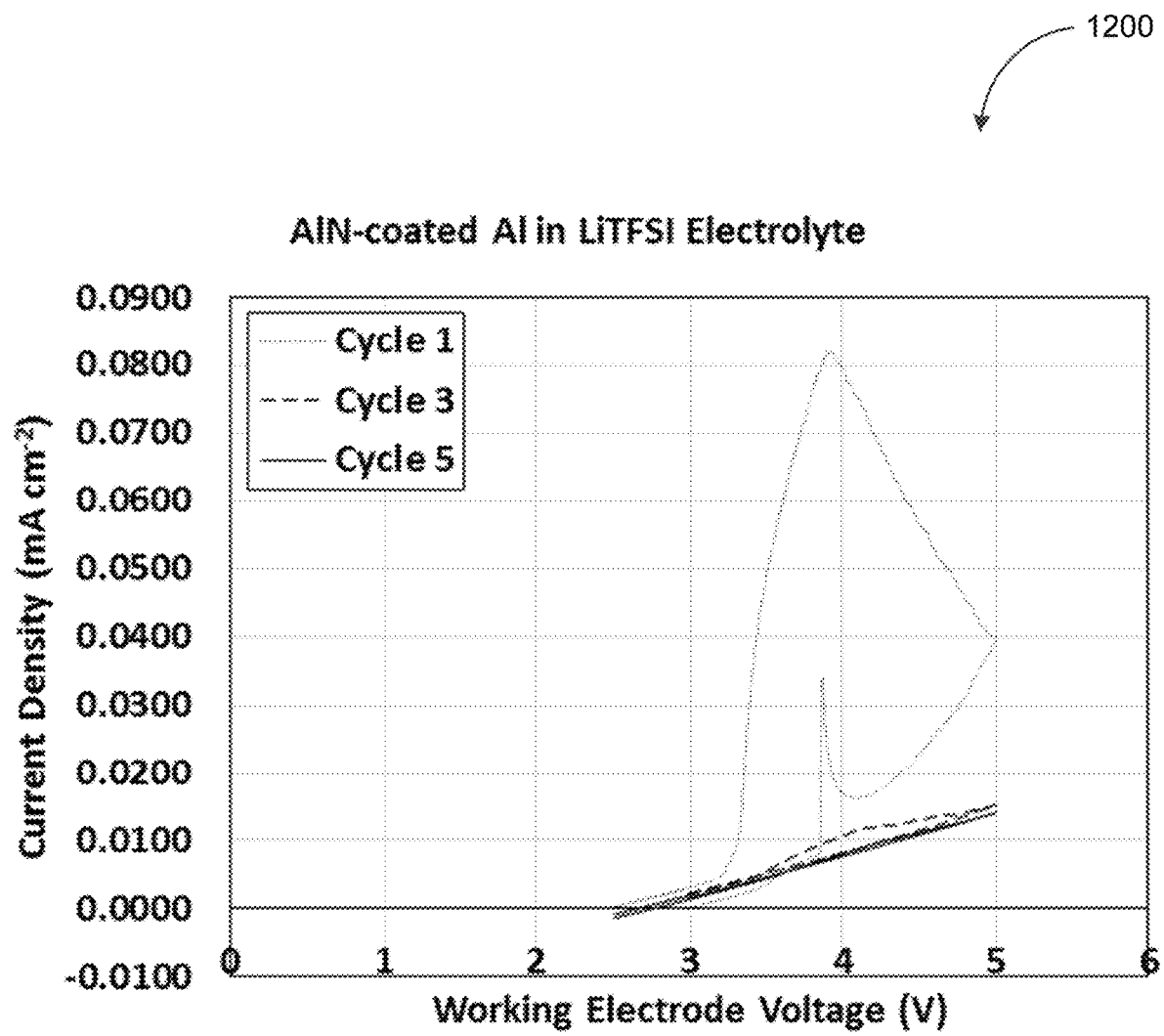
FIG. 12 depicts a graph illustrating a cyclic voltammetry of a battery cell with anti-corrosion protection consistent with implementations of the current subject matter.

To form the battery cell, the electrodes (e.g., the working electrode, the counter electrode, and/or the reference electrode) can be cut into strips, which may be attached to alligators clips before being submerged in a sealed jar filled with the lithium bis(trifluoromethanesulfonyl)imide ($LiC_2F_6NO_4S_2$) (LiTFSI) based electrolyte. While the voltage at the working electrode voltage is swept from 2.5 volts to 5 volts with respect to the reference electrode at a rate of 1 millivolt per second for 5 cycles, the resulting current through the battery cell may be measured. The results are shown in FIG. 12, which depicts a graph 1200 illustrating a cyclic voltammetry of the battery cell having aluminum nitride (AlN) anti-corrosion electrodes and a lithium bis(trifluoromethanesulfonyl)imide ($LiC_2F_6NO_4S_2$) (LiTFSI) based electrolyte. FIG. 12 shows a high current density and significant hysteresis during the first sweep cycle but current density and hysteresis dissipate during successive sweep cycles. This observation may indicate the formation of a passivating solid-electrolyte interface during the first sweep cycle, which provides protection against corrosion during subsequent sweep cycles. It should be appreciated that a higher concentration of aluminum nitride (AlN) in the anti-corrosion layers may produce a denser anti-corrosion layer that can expedite the stabilization of the interface, as indicated by the minimal hysteresis observed during subsequent sweep cycles. Moreover, the concentration of aluminum nitride (AlN) may be optimized to provide robust anti-corrosion without compromising performance due to increased cell resistance.

Example Baseline Battery Cell with Hybrid Electrolyte for Cyclic Voltammetry Analysis In some implementations of the current subject matter, a baseline battery cell with a hybrid electrolyte including an air stable lithium salt and a non-air stable lithium salt may be prepared to serve as a reference point in analyzing the effects of anti-corrosion protection. The baseline battery cell can include a working electrode formed from aluminum (Al) foil, a counter electrode formed from lithium (Li) foil, and a reference electrode formed from lithium (Li) foil. Furthermore, the baseline battery cell can include a hybrid electrolyte formed by dissolving 1.52 grams of lithium hexafluorophosphate ($LiPF_6$), a non-air stable lithium salt, and 0.5 grams of lithium bis(trifluoromethanesulfonyl)imide ($LiC_2F_6NO_4S_2$) (LiTFSI), an air stable lithium salt, in 10 milliliters of a solvent solution that includes one or more organic carbonates.

Figure 13:
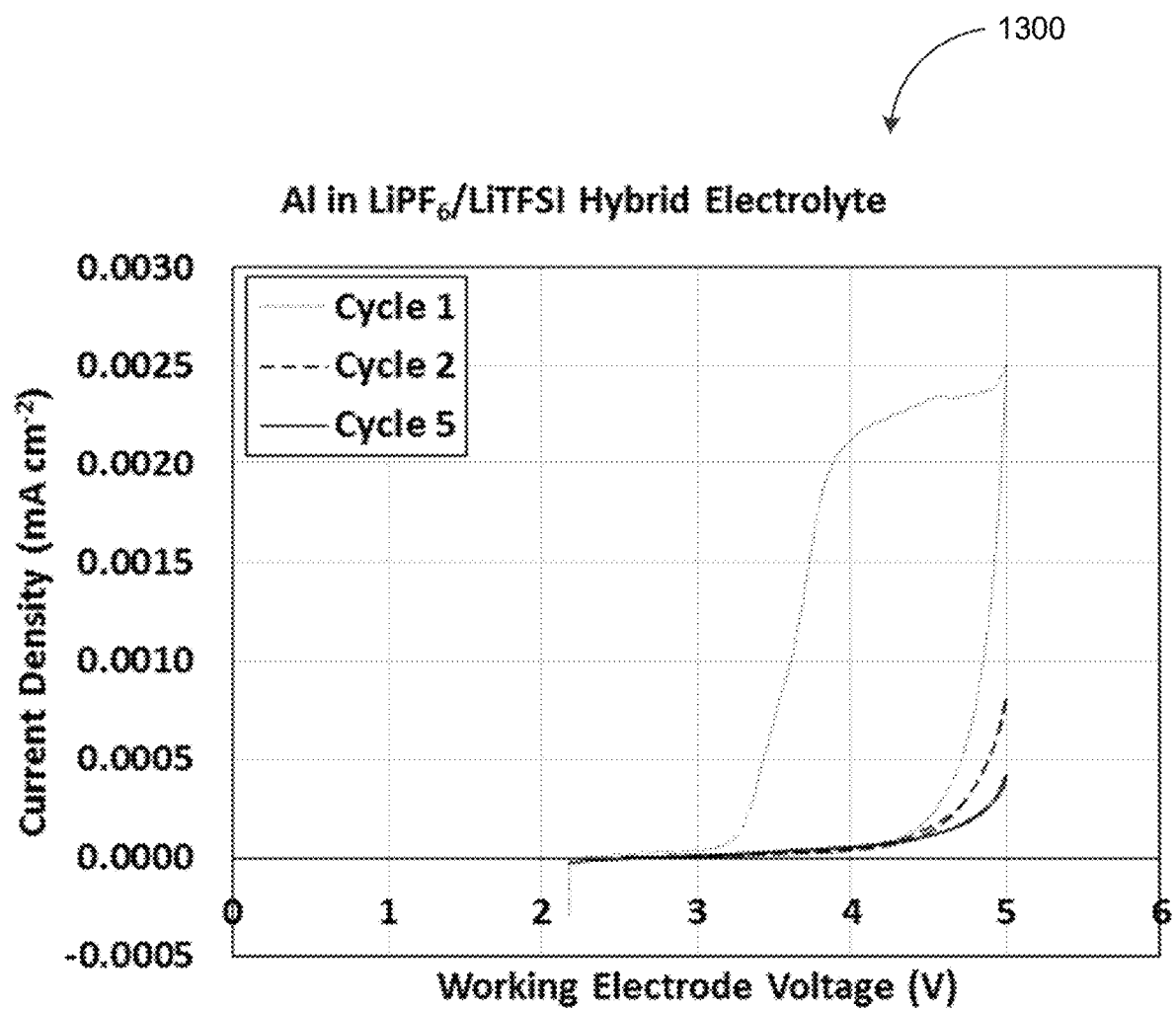
FIG. 13 depicts a graph illustrating a cyclic voltammetry of a battery cell without anti-corrosion protection consistent with implementations of the current subject matter.

To form the baseline battery cell, the electrodes (e.g., the working electrode, the counter electrode, and/or the reference electrode) can be cut into strips, which may be attached to alligator clips before being submerged in a sealed jar filled with the hybrid electrolyte. While the voltage at the working electrode voltage is swept from 2.5 volts to 5 volts with respect to the reference electrode at a rate of 1 millivolt per second for 5 cycles, the resulting current through the baseline battery cell may be measured. The results are shown in FIG. 13, which depicts a graph 1300 illustrating a cyclic voltammetry of the baseline battery cell having the hybrid electrolyte. FIG. 13 shows significant current density and hysteresis during the first sweep cycle. However, the hysteresis and the current density become minimal during subsequent sweep cycles, indicating a more stable reaction between the hybrid electrolyte and the working electrode. The stabilization of the reaction between the hybrid electrolyte and the working electrode can be attributed to the low concentration of lithium bis(trifluoromethanesulfonyl)imide ($LiC_2F_6NO_4S_2$) (LiTFSI) in the hybrid electrolyte.

Example Battery Cell with Anti-Corrosion Electrodes and Hybrid Electrolyte for Cyclic Voltammetry Analysis In some implementations of the current subject matter, a battery cell with anti-corrosion protection may include one or more anti-corrosion layers formed from aluminum oxide ($Al_2O_3$), calcium carbonate ($CaCO_3$), and/or a combination of the two. The battery cell can include a working electrode formed from aluminum (Al) foil, a counter electrode formed from lithium (Li) foil, and a reference electrode formed from lithium (Li) foil. To form the working electrode of the battery cell, which may be coupled with a current collector that is interposed between one or more anti-corrosion layers, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide ($Al_2O_3$) or calcium carbonate ($CaCO_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter (mg/cm²).

Figure 14:
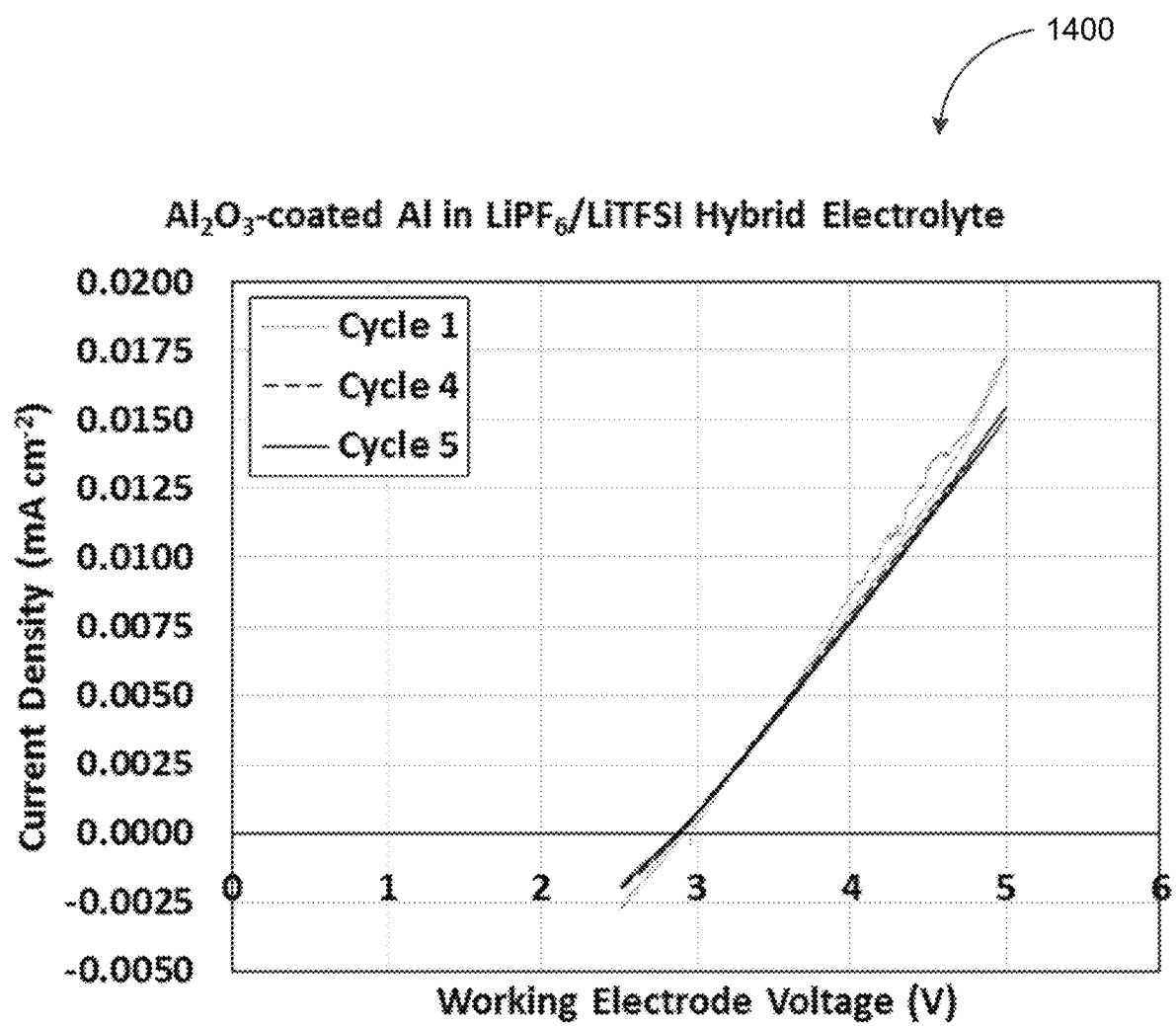
FIG. 14 depicts a graph illustrating a cyclic voltammetry of a battery cell with anti-corrosion protection consistent with implementations of the current subject matter.

The battery cell can further include a hybrid electrolyte formed by dissolving 1.52 grams of lithium hexafluorophosphate (LiPF$_6$), a non-air stable lithium salt, and 0.5 grams of lithium bis(trifluoromethanesulfonyl)imide (LiC$_2$F$_6$NO$_4$S$_2$) (LiTFSI), an air stable lithium salt, in 10 milliliters of a solvent solution that includes one or more organic carbonates. To form the battery cell, the electrodes (e.g., the working electrode, the counter electrode, and/or the reference electrode) can be cut into strips, which may be attached to alligator clips before being submerged in a sealed jar filled with the hybrid electrolyte. While the voltage at the working electrode voltage is swept from 2.5 volts to 5 volts with respect to the reference electrode at a rate of 1 millivolt per second for 5 cycles, the resulting current through the battery cell may be measured. The results are shown in FIG. 14, which depicts a graph 1400 illustrating a cyclic voltammetry of the battery cell having the hybrid electrolyte. FIG. 14 shows low current densities and negligible hysteresis through each sweep cycle, indicating a stable, reversible, and minimally corrosive reaction within the battery cell.

Example Baseline Battery Cell with Air Stable Lithium Triflate (LiCF$_3$SO$_3$) Electrolyte for Cyclic Voltammetry Analysis In some implementations of the current subject matter, a baseline battery cell with an electrolyte including an air stable lithium salt may be prepared to serve as a reference point in analyzing the effects of anti-corrosion protection. The baseline battery cell can include a working electrode formed from aluminum (Al) foil, a counter electrode formed from lithium (Li) foil, and a reference electrode formed from lithium (Li) foil. Furthermore, the baseline battery cell can include an air stable lithium salt based electrolyte formed by first preparing 10 grams of a solvent solution that includes a mixture of 3.92 grams of ethylene carbonate ((CH$_2$O)$_2$CO), 2.91 grams of diethyl carbonate (OC(OCH$_2$CH$_3$)$_2$), and 3.17 grams of dimethyl carbonate (OC(OCH$_3$)$_2$). The solvent solution can be dried with a molecular sieve for 72 hours before 1.39 grams of lithium triflate (LiCF$_3$SO$_3$) salt and 0.1 grams of lithium tetrafluoroborate (LiBF$_4$) are added to the solvent solution.

Figure 15:
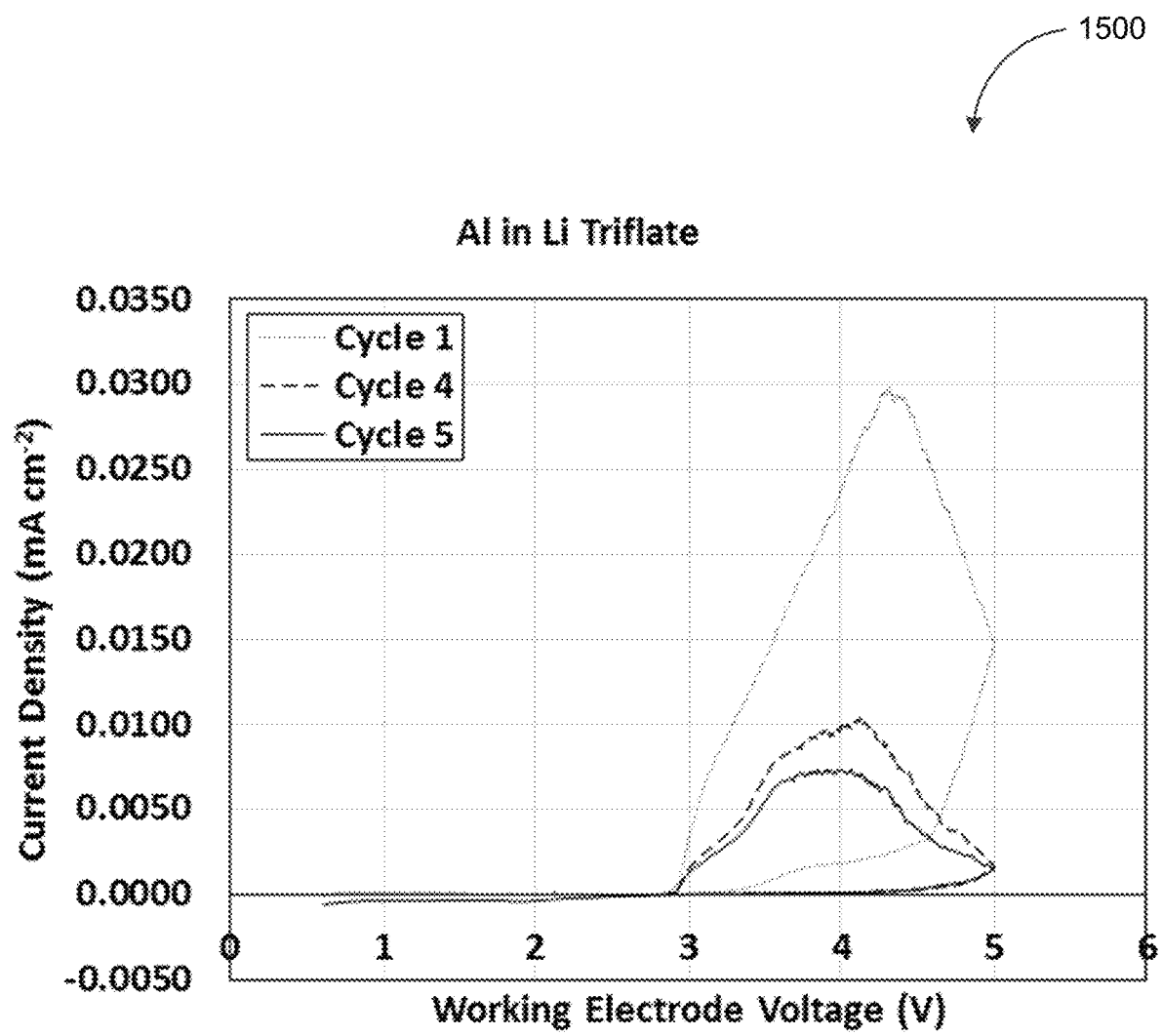
FIG. 15 depicts a graph illustrating a cyclic voltammetry of a battery cell without anti-corrosion protection consistent with implementations of the current subject matter.

To form the baseline battery cell, the electrodes (e.g., the working electrode, the counter electrode, and/or the reference electrode) can be cut into strips, which may be attached to alligators clips before being submerged in a sealed jar filled with the lithium triflate (LiCF$_3$SO$_3$) based electrolyte. While the voltage at the working electrode voltage is swept from 2.5 volts to 5 volts with respect to the reference electrode at a rate of 1 millivolt per second for 5 cycles, the resulting current through the baseline battery cell may be measured. The results are shown in FIG. 15, which depicts a graph 1500 illustrating a cyclic voltammetry of the baseline battery cell. FIG. 15 shows significant hysteresis between 3 volts and 5 volts in every cycle, despite a decrease in current density through successive sweep cycles.

Example Battery Cell with Anti-Corrosion Electrodes and Air Stable Lithium Triflate (LiCF$_3$SO$_3$) Electrolyte for Cyclic Voltammetry Analysis In some implementations of the current subject matter, a battery cell with anti-corrosion protection may include one or more anti-corrosion layers formed from aluminum oxide (Al$_2$O$_3$), calcium carbonate (CaCO$_3$), and/or a combination of the two. The battery cell can include a working electrode formed from aluminum (Al) foil, a counter electrode formed from lithium (Li) foil, and a reference electrode formed from lithium (Li) foil. To form the working electrode of the battery cell, which may be coupled with a current collector that is interposed between one or more anti-corrosion layers, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide (Al$_2$O$_3$) or calcium carbonate (CaCO$_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter (mg/cm$^2$).

The battery cell can include an air stable lithium salt based electrolyte formed by first preparing 10 grams of a solvent solution that includes a mixture of 3.92 grams of ethylene carbonate ((CH$_2$O)$_2$CO), 2.91 grams of diethyl carbonate (OC(OCH$_2$CH$_3$)$_2$), and 3.17 grams of dimethyl carbonate (OC(OCH$_3$)$_2$). The solvent solution can be dried with a molecular sieve for 72 hours before 1.39 grams of lithium triflate (LiCF$_3$SO$_3$) salt and 0.1 grams of lithium tetrafluoroborate (LiBF$_4$) are added to the solvent solution.

Figure 16:
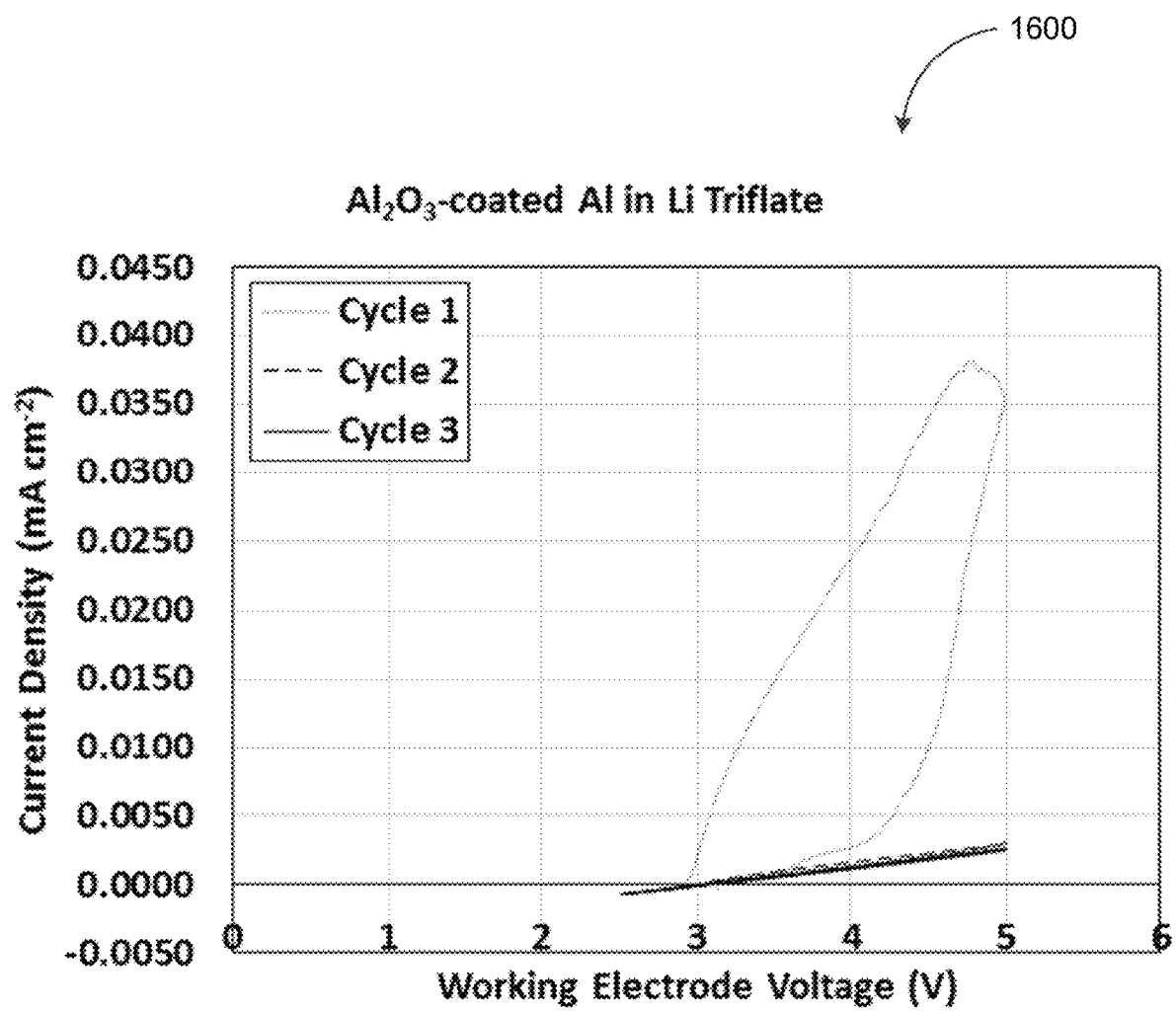
FIG. 16 depicts a graph illustrating a cyclic voltammetry of a battery cell with anti-corrosion protection consistent with implementations of the current subject matter.

To form the battery cell, the electrodes (e.g., the working electrode, the counter electrode, and/or the reference electrode) can be cut into strips, which may be attached to alligators clips before being submerged in a sealed jar filled with the lithium triflate (LiCF$_3$SO$_3$) based electrolyte. While the voltage at the working electrode voltage is swept from 2.5 volts to 5 volts with respect to the reference electrode at a rate of 1 millivolt per second for 5 cycles, the resulting current through the battery cell may be measured. The results are shown in FIG. 16, which depicts a graph 1600 illustrating a cyclic voltammetry of the battery cell having anti-corrosion electrodes and a lithium triflate (LiCF$_3$SO$_3$) based electrolyte. FIG. 16 shows minimal hysteresis and low current density, which may indicate a passivating reaction between the working electrode and the lithium triflate (LiCF$_3$SO$_3$) based electrolyte.

Example Baseline Cell with Anti-Corrosion Electrodes and Non-Air Stable Lithium Hexafluorophosphate (LiPF$_6$) Based Carbonate Electrolyte for Cycle Life Analysis In some implementations of the current subject matter, a battery cell with anti-corrosion protection in a non-air stable electrolyte may include one or more anti-corrosion layers formed from aluminum oxide (Al$_2$O$_3$), calcium carbonate (CaCO$_3$), and/or a combination of the two which may be prepared to serve as a reference point in establishing a performance baseline. To form the anti-corrosion layer, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide (Al$_2$O$_3$) or calcium carbonate (CaCO$_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter (mg/cm$^2$).

The positive electrode of the baseline battery cell can be formed by dissolving 21.6 grams of polyvinylidene fluoride (PVDF) into 250 grams of N-methylpyrrolidone (NMP). The resulting mixture can be combined with 18 grams of carbon black and mixed for a few minutes at a rate of approximately 1000 rpm followed by 15 minutes at a rate of approximately 6500 rpm. Subsequently, 560.4 grams of lithium nickel manganese cobalt oxide (LiNi$_{0.4}$Mn$_{0.3}$Co$_{0.3}$O$_2$, NMC433) can be added to the mixture and mixed for a few minutes at a rate of approximately 1000 rpm followed by 30 minutes at a rate of approximately 6500 rpm. Some additional N-methylpyrrolidone (NMP) may be added to adjust the viscosity of the mixture. The resulting slurry can be coated onto the surface of 15 microns (μm) thick aluminum (Al) foil serving as the current collector. The first heat zone of the automatic coating machine can be set to approximately 80° C. and the second heat zone of the automatic coating machine can be set to approximately 130° C. Once the N-methylpyrrolidone (NMP) has evaporated, the final dried solid can have a loading of approximately 16 milligrams per square centimeter (mg/cm$^2$). The final dried solid can further be compressed to form a layer of positive electrode material having a thickness of approximately 120 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 9 milligrams per square centimeter (mg/cm$^2$). Furthermore, the final dried solid can be compressed to form a layer of negative electrode material having a thickness of approximately 129 microns (μm).

In some implementations of the current subject matter, the non-air stable lithium salt based electrolyte of the baseline battery cell can be formed by dissolving 1.52 grams of lithium hexafluorophosphate (LiPF$_6$), a non-air stable lithium salt, in 10 milliliters of a solvent solution that includes one or more organic carbonates. To assemble the baseline battery cell, the positive electrode and the negative electrode of the baseline battery cell can be formed by punching sheets of positive electrode material and the negative electrode material into the appropriate shape and/or size using an electrode tab. The positive electrode can be dried at 125° C. for 10 hours while the negative electrode can be dried at 140° C. for 10 hours. A separator can subsequently be laminated between the positive electrode and the negative electrode to form a flat jelly-roll. The flat jelly-roll can be placed into an aluminum (Al) composite bag and dried in a 70° C. vacuum oven. Thereafter, the aluminum (Al) composite bag can be filled with the lithium hexafluorophosphate (LiPF$_6$) based carbonate electrolyte, sealed, and aged for 16 hours. The assembled and aged baseline battery cell can then be punctured under vacuum to release any gases before being resealed.

Figure 17A:
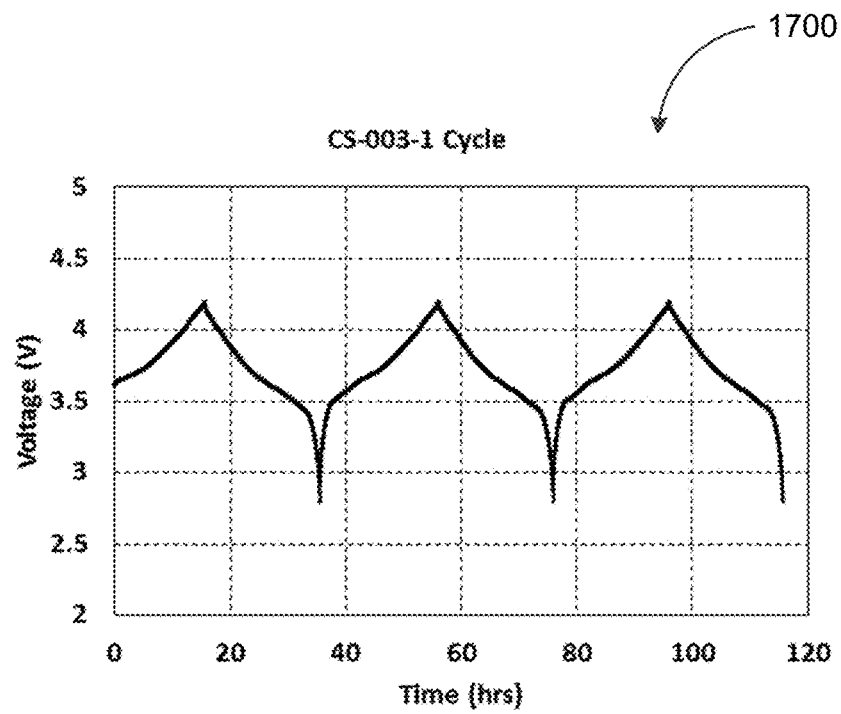
FIG. 17A depicts a graph illustrating a cycling profile of a battery cell with anti-corrosion protection consistent with implementations of the current subject matter.
Figure 17B:
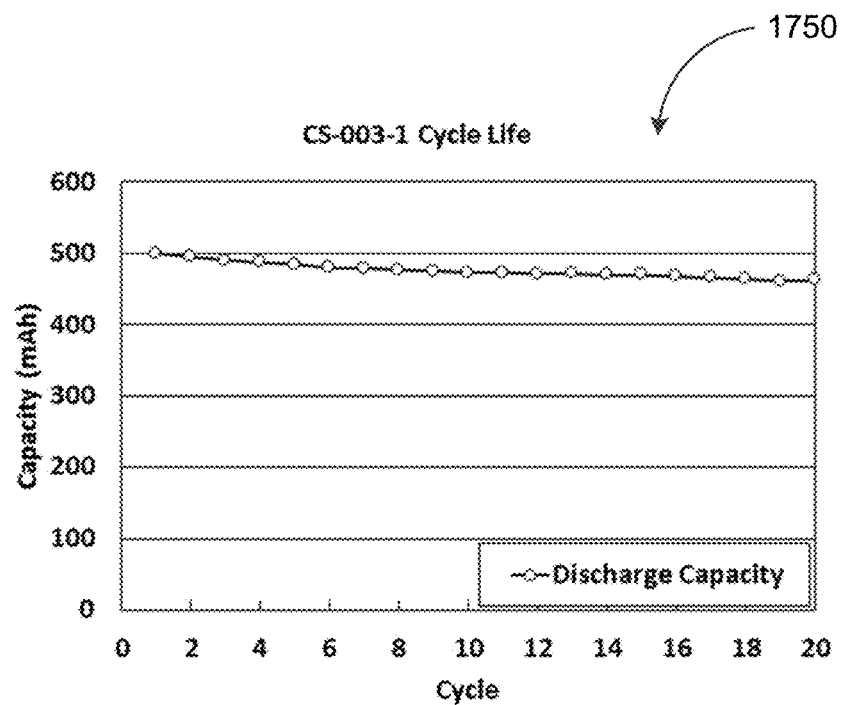
FIG. 17B depicts a graph illustrating a cycle life of a battery cell with anti-corrosion protection consistent with implementations of the current subject matter.

In some implementations of the current subject matter, the baseline battery cell can be subject to cycle testing in which the battery cell is subject to multiple charge and discharge cycles. For example, the baseline battery cell can be cycled between 2.8 volts and 4.2 volts at 25 milliamps (mA) and a C/20 rate. The results of the cycle testing are shown in FIGS. 17A-B. FIG. 17A depicts a graph 1700 illustrating charging and discharging voltage profiles of the baseline battery cell. As shown in FIG. 17A, the baseline battery cell exhibits good reversibility and stable cycle life. Meanwhile, FIG. 17B depicts a graph 1750 illustrating a cycle life of the baseline battery cell. FIG. 17B shows that the baseline battery cell may exhibit good capacity retention, losing merely 9% of its initial capacity after 20 cycles.

Example Baseline Battery Cell with Air Stable Lithium Bis(trifluoromethanesulfonyl)imide (LiC$_2$F$_6$NO$_4$S$_2$) (LiTFSI) Based Electrolyte for Cycle Life Analysis In some implementations of the current subject matter, a baseline battery cell with an air stable lithium salt based electrolyte may be prepared to serve as a reference point in analyzing the effects of anti-corrosion protection in the cycle life and rate capability of a battery cell. The positive electrode of the baseline battery cell can be formed by dissolving 21.6 grams of polyvinylidene fluoride (PVDF) into 250 grams of N-methylpyrrolidone (NMP). The resulting mixture can be combined with 18 grams of carbon black and mixed for a few minutes at a rate of approximately 1000 rpm followed by 15 minutes at a rate of approximately 6500 rpm. Subsequently, 560.4 grams of lithium nickel manganese cobalt oxide (LiNi$_{0.4}$Mn$_{0.3}$Co$_{0.3}$O$_2$, NMC433) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of 15 microns (μm) thick aluminum (Al) foil serving as the current collector. The first heat zone of the automatic coating machine can be set to approximately 80° C. and the second heat zone of the automatic coating machine can be set to approximately 130° C. Once the N-methylpyrrolidone (NMP) has evaporated, the final dried solid can have a loading of approximately 16 milligrams per square centimeter (mg/cm$^2$). The final dried solid can further be compressed to form a layer of positive electrode material having a thickness of approximately 115 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (µm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 9 milligrams per square centimeter (mg/cm$^2$). Furthermore, the final dried solid can be compressed to form a layer of negative electrode material having a thickness of approximately 129 microns (µm).

In some implementations of the current subject matter, the air stable lithium salt based electrolyte of the baseline battery cell can include air stable lithium bis(trifluoromethanesulfonyl)imide ($LiC_2F_6NO_4S_2$) (LiTFSI). The lithium bis(trifluoromethanesulfonyl)imide ($LiC_2F_6NO_4S_2$) (LiTFSI) based electrolyte can be formed by first preparing 10 grams of a solvent solution that includes a mixture of 3.92 grams of ethylene carbonate (($CH_2O)_2CO$), 2.91 grams of diethyl carbonate ($OC(OCH_2CH_3)_2$), and 3.17 grams of dimethyl carbonate ($OC(OCH_3)_2$). The solvent solution can be dried with a molecular sieve for 72 hours before 2.56 grams of bis(trifluoromethane)sulfonimide lithium ($CF_3SO_2NLiSO_2CF_3$) salt and 0.1 grams of lithium tetrafluoroborate ($LiBF_4$) are added to the solvent solution.

To assemble the baseline battery cell, the positive electrode and the negative electrode of the baseline battery cell can be formed by punching sheets of positive electrode material and the negative electrode material into the appropriate shape and/or size using an electrode tab. The positive electrode can be dried at 125° C. for 10 hours while the negative electrode can be dried at 140° C. for 10 hours. A separator can subsequently be laminated between the positive electrode and the negative electrode to form a flat jelly-roll. The flat jelly-roll can be placed into an aluminum (Al) composite bag and dried in a 70° C. vacuum oven. Thereafter, the aluminum (Al) composite bag can be filled with the lithium bis(trifluoromethanesulfonyl)imide ($LiC_2F_6NO_4S_2$) (LiTFSI) based electrolyte, sealed, and aged for 16 hours. The assembled and aged baseline battery cell can then be punctured under vacuum to release any gases before being resealed.

Figure 18:
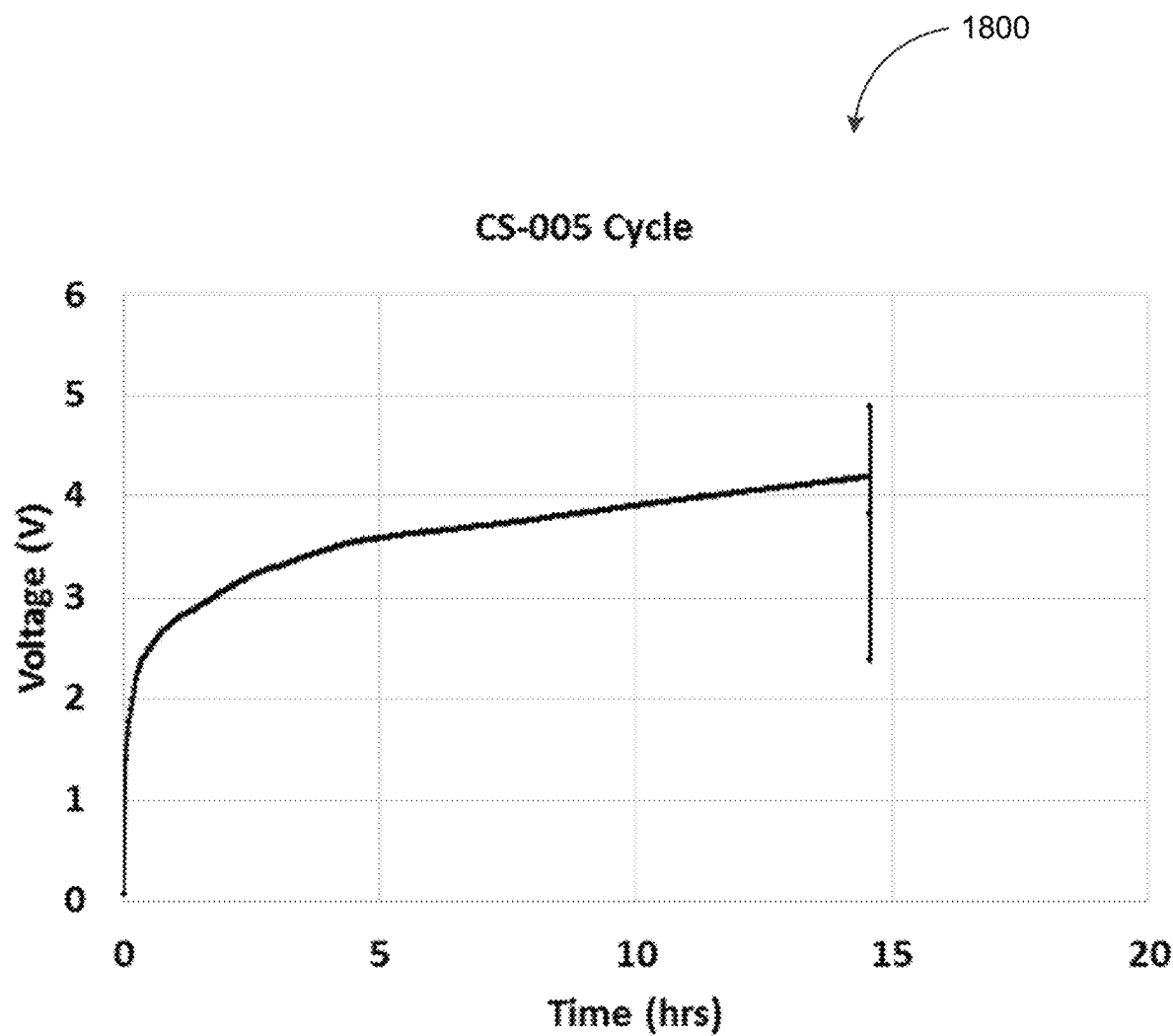
FIG. 18 depicts a graph illustrating a cycling profile of a battery cell without anti-corrosion protection consistent with implementations of the current subject matter.

In some implementations of the current subject matter, the baseline battery cell can be subject to cycle testing in which the battery cell is subject to multiple charge and discharge cycles. For example, the baseline battery cell can be cycled between 2.8 volts and 4.2 volts at 25 milliamps (mA) and a C/20 rate. The results of the cycle testing are shown in FIG. 18, which depicts a graph 1800 illustrating a charging voltage profile of the baseline battery cell. As shown in FIG. 18, the aluminum (Al) portion of the positive electrode was completely corroded by the lithium bis(trifluoromethanesulfonyl)imide ($LiC_2F_6NO_4S_2$) (LiTFSI) salt in the electrolyte of the baseline battery cell after a single charge cycle, thereby creating an open circuit that incapacitates the baseline battery cell.

Example Battery Cell with Anti-Corrosion Electrodes and Air Stable Lithium Bis(trifluoromethanesulfonyl)imide ($LiC_2F_6NO_4S_2$) (LiTFSI) Based Electrolyte for Cycle Life Analysis In some implementations of the current subject matter, a battery cell with anti-corrosion protection may include one or more anti-corrosion layers formed from aluminum oxide ($Al_2O_3$), calcium carbonate ($CaCO_3$), and/or a combination of the two. To form the anti-corrosion layer, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide ($Al_2O_3$) or calcium carbonate ($CaCO_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (µm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter (mg/cm$^2$).

The positive electrode of the battery cell can be formed by dissolving 21.6 grams of polyvinylidene fluoride (PVDF) into 250 grams of N-methylpyrrolidone (NMP). The resulting mixture can be combined with 18 grams of carbon black and mixed for a few minutes at a rate of approximately 1000 rpm followed by 15 minutes at a rate of approximately 6500 rpm. Subsequently, 560.4 grams of lithium nickel manganese cobalt oxide ($LiNi_{0.4}Mn_{0.3}Co_{0.3}O_2$, NMC433) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 16 milligrams per square centimeter (mg/cm$^2$). The final dried solid can further be compressed to form a layer of positive electrode material having a thickness of approximately 120 microns (µm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 9 milligrams per square centimeter (mg/cm$^2$). Furthermore, the final dried solid can be compressed to form a layer of negative electrode material having a thickness of approximately 129 microns (μm).

In some implementations of the current subject matter, the air stable lithium salt based electrolyte of the battery cell can include air stable lithium bis(trifluoromethanesulfonyl)imide ($LiC_2F_6NO_4S_2$) (LiTFSI). The lithium bis(trifluoromethanesulfonyl)imide ($LiC_2F_6NO_4S_2$) (LiTFSI) based electrolyte can be formed by first preparing 10 grams of a solvent solution that includes a mixture of 3.92 grams of ethylene carbonate (($CH_2O)_2CO$), 2.91 grams of diethyl carbonate ($OC(OCH_2CH_3)_2$), and 3.17 grams of dimethyl carbonate ($OC(OCH_3)_2$). The solvent solution can be dried with a molecular sieve for 72 hours before 2.56 grams of bis(trifluoromethane)sulfonimide lithium ($CF_3SO_2NLiSO_2CF_3$) salt and 0.1 grams of lithium tetrafluoroborate ($LiBF_4$) are added to the solvent solution.

To assemble the battery cell, the positive electrode and the negative electrode of the battery cell can be formed by punching sheets of positive electrode material and the negative electrode material into the appropriate shape and/or size using an electrode tab. The positive electrode can be dried at 125° C. for 10 hours while the negative electrode can be dried at 140° C. for 10 hours. A separator can subsequently be laminated between the positive electrode and the negative electrode to form a flat jelly-roll. The flat jelly-roll can be placed into an aluminum (Al) composite bag and dried in a 70° C. vacuum oven. Thereafter, the aluminum (Al) composite bag can be filled with the lithium bis(trifluoromethanesulfonyl)imide ($LiC_2F_6NO_4S_2$) (LiTFSI) based electrolyte, sealed, and aged for 16 hours. The assembled and aged battery cell can then be punctured under vacuum to release any gases before being resealed.

Figure 19A:
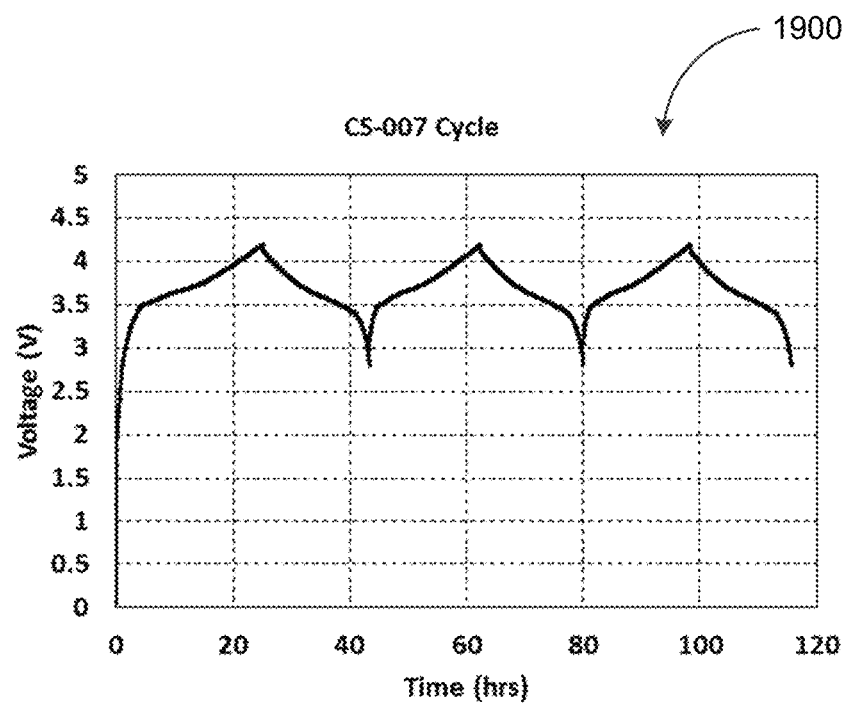
FIG. 19A depicts a graph illustrating a cycling profile of a battery cell with anti-corrosion protection consistent with implementations of the current subject matter.
Figure 19B:
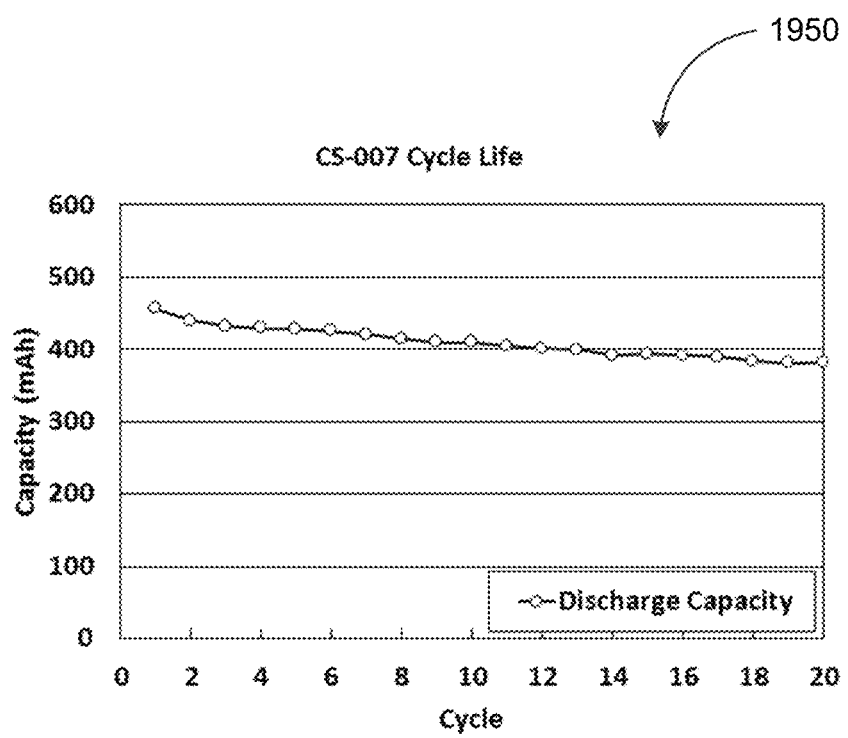
FIG. 19B depicts a graph illustrating a cycle life of a battery cell with anti-corrosion protection consistent with implementations of the current subject matter.

In some implementations of the current subject matter, the battery cell can be subject to cycle testing in which the battery cell is subject to multiple charge and discharge cycles. For example, the battery cell can be cycled between 2.8 volts and 4.2 volts at 25 milliamps (mA) and a C/20 rate. The results of the cycle testing are shown in FIGS. 19A-B. FIG. 19A depicts a graph 1900 illustrating charging and discharging voltage profiles of the battery cell with anti-corrosion electrodes and a lithium bis(trifluoromethanesulfonyl)imide ($LiC_2F_6NO_4S_2$) (LiTFSI) based electrolyte. As shown in FIG. 19A, the battery cell exhibits good reversibility and stable cycle life. Meanwhile, FIG. 19B depicts a graph 1950 illustrating a cycle life of the battery cell. FIG. 19B shows that the battery cell may exhibit good capacity retention, losing merely 13% of its initial capacity after 20 cycles.

Example Battery Cell with Anti-Corrosion Electrodes and Air Stable Lithium Bis(trifluoromethanesulfonyl)imide ($LiC_2F_6NO_4S_2$) (LiTFSI) Based Electrolyte with Vinylene Carbonate (VC) Additive for Rate Capability and Cycle Life Analysis In some implementations of the current subject matter, a battery cell with anti-corrosion protection may include one or more anti-corrosion layers formed from aluminum oxide ($Al_2O_3$), calcium carbonate ($CaCO_3$), and/or a combination of the two. To form the anti-corrosion layer, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide ($Al_2O_3$) or calcium carbonate ($CaCO_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter (mg/cm$^2$).

The positive electrode of the battery cell can be formed by dissolving 21.6 grams of polyvinylidene fluoride (PVDF) into 250 grams of N-methylpyrrolidone (NMP). The resulting mixture can be combined with 18 grams of carbon black and mixed for a few minutes at a rate of approximately 1000 rpm followed by 15 minutes at a rate of approximately 6500 rpm. Subsequently, 560.4 grams of lithium nickel manganese cobalt oxide ($LiNi_{0.4}Mn_{0.3}Co_{0.3}O_2$, NMC433) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 16 milligrams per square centimeter (mg/cm$^2$). The final dried solid can further be compressed to form a layer of positive electrode material having a thickness of approximately 120 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 9 milligrams per square centimeter (mg/cm$^2$). Furthermore, the final dried solid can be compressed to form a layer of negative electrode material having a thickness of approximately 129 microns (μm).

In some implementations of the current subject matter, the air stable lithium salt based electrolyte of the battery cell can include air stable lithium bis(trifluoromethanesulfonyl)imide ($LiC_2F_6NO_4S_2$) (LiTFSI) and a vinylene carbonate (VC) additive. The lithium bis(trifluoromethanesulfonyl)imide ($LiC_2F_6NO_4S_2$) (LiTFSI) based electrolyte can be formed by first preparing 10 grams of a solvent solution that includes a mixture of 3.92 grams of ethylene carbonate (($CH_2O)_2CO$), 2.91 grams of diethyl carbonate (OC($OCH_2CH_3)_2$), and 3.17 grams of dimethyl carbonate (OC($OCH_3)_2$). The solvent solution can be dried with a molecular sieve for 72 hours before 2.56 grams of bis(trifluoromethane)sulfonimide lithium ($CF_3SO_2NLiSO_2CF_3$) salt and 0.1 grams of lithium tetrafluoroborate ($LiBF_4$) are added to the solvent solution. Finally, 0.15 grams of vinylene carbonate (VC) can be added to the solution to form the lithium bis(trifluoromethanesulfonyl)imide ($LiC_2F_6NO_4S_2$) (LiTFSI) based electrolyte.

It should be appreciated that vinylene carbonate (VC) can facilitate the interfacial stabilization of graphite-based negative electrodes, thereby lowering the battery cell's internal resistance and improving the battery cell's cycle life. Furthermore, instead of and/or in addition to vinylene carbonate (VC), other additives may be added to form the lithium bis(trifluoromethanesulfonyl)imide ($LiC_2F_6NO_4S_2$) (LiTFSI) based electrolyte including, for example, lithium difluoro(oxalato)borate (LiDFOB), lithium bis(fluorosulfonyl)imide (LiFSI), lithium trifluoromethanesulfonate (LiIt), lithium difluorophosphate (LiDFP), lithium tetrafluoroborate ($LiBF_4$), tetraethyl-ammonium tetrafluoroborate ($TEABF_4$), lithium perchlorate ($LiClO_4$), methylene ethylene carbonate (MEC), fluoroethylene carbonate (FEC), succinonitrile, 1,3-propanesultone (PS), 1-propene 1,3-sultone, methylene methanedisulfonate (MIN/IDS) and/or the like.

To assemble the battery cell, the positive electrode and the negative electrode of the battery cell can be formed by punching sheets of positive electrode material and the negative electrode material into the appropriate shape and/or size using an electrode tab. The positive electrode can be dried at 125° C. for 10 hours while the negative electrode can be dried at 140° C. for 10 hours. A separator can subsequently be laminated between the positive electrode and the negative electrode to form a flat jelly-roll. The flat jelly-roll can be placed into an aluminum (Al) composite bag and dried in a 70° C. vacuum oven. Thereafter, the aluminum (Al) composite bag can be filled with the lithium bis(trifluoromethanesulfonyl)imide ($LiC_2F_6NO_4S_2$) (LiTFSI) based electrolyte, sealed, and aged for 16 hours. The assembled and aged battery cell can be subject to a formation process that includes one or more charge and discharge cycles. For example, the battery cell can be first charged to 3.8 volts at 300 milliamps (mA) and to 4.2 volts at 600 milliamps before resting for 20 minutes. Thereafter, the charged battery cell can be discharged to 2.8 volts at 600 milliamps before resting for another 20 minutes. The battery cell can subsequently be charged to 4.2 volts at 600 milliamps and rested for 20 minutes before being discharge to 2.8 volts again at 600 milliamps and rested for 20 minutes. Finally, the battery cell can be charged to 4.2 volts at 600 milliamps and rested for 20 minutes before being punctured under vacuum to release any gases. The punctured battery cell can be resealed before being subject to cycle testing.

Figure 20A:
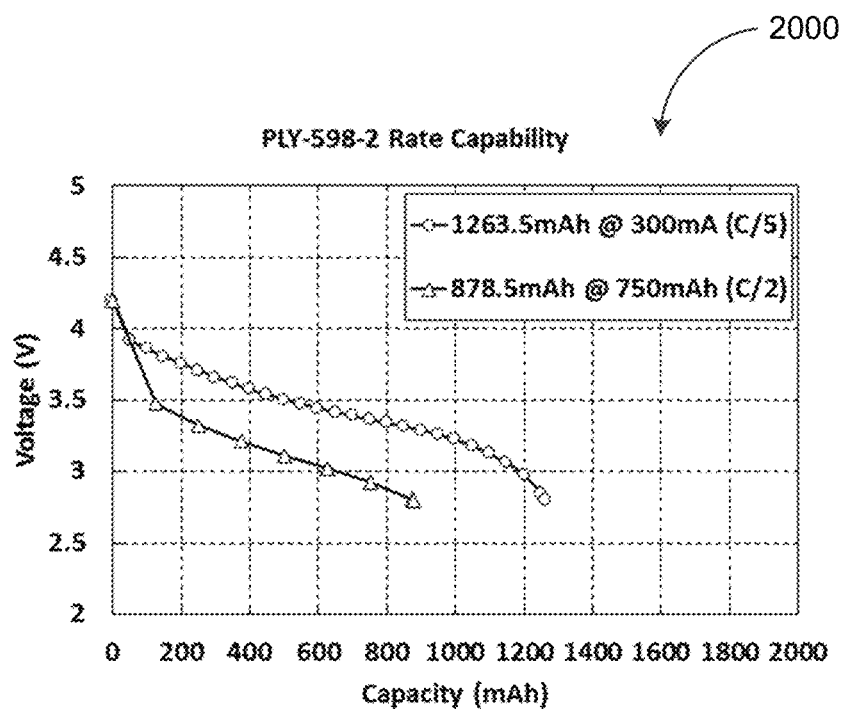
FIG. 20A depicts a graph illustrating a rate capability of a battery cell with anti-corrosion protection consistent with implementations of the current subject matter.
Figure 20B:
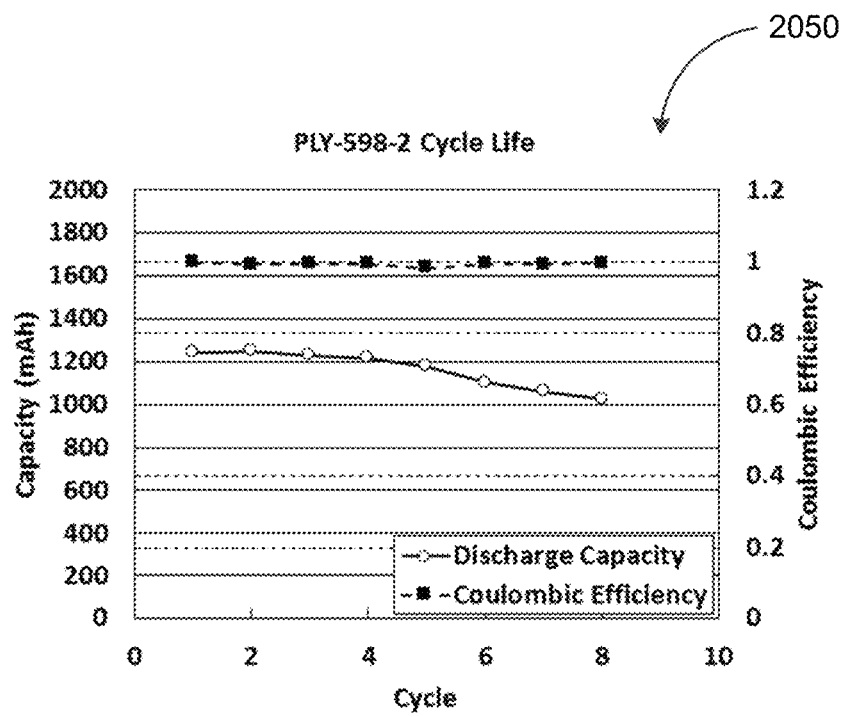
FIG. 20B depicts a graph illustrating a cycle life and coulombic efficiency of a battery cell with anti-corrosion protection consistent with implementations of the current subject matter.

In some implementations of the current subject matter, the battery cell can be subject to cycle testing in which the battery cell is subject to multiple charge and discharge cycles. Prior to cycle testing, the battery cell, which may have undergone the aforementioned formation process, may be fully charged to 4.2 volts. Cycle testing the battery cell can include cycling the battery cell between 2.8 volts and 4.2 volts at a discharge rate of C/5 and a charge rate of C/2. For instance, the fully charged battery cell may be discharged to 2.8 volts at 300 milliamps (e.g., a C/5 rate) and 750 milliamps (e.g., a C/2 rate). After discharging the battery cell, the battery cell can be recharged to 4.2 volts at 300 milliamps. The results of the cycle testing are shown in FIGS. 20A-B. FIG. 20A depicts a graph 2000 illustrating a rate capability of the battery cell with anti-corrosion electrodes and a lithium bis(trifluoromethanesulfonyl)imide ($LiC_2F_6NO_4S_2$) (LiTFSI) based electrolyte with a vinylene carbonate (VC) additive. As shown in FIG. 20A, the battery cell exhibits reasonable rate capability which can be attributed to the moderate conductivity of the electrolyte. Meanwhile, FIG. 20B depicts a graph 2050 illustrating a cycle life and coulombic efficiency of the battery cell. FIG. 20B shows that the battery cell may exhibit good capacity retention, losing minimal capacity through multiple charge and discharge cycles. The battery cell may further exhibit a coulombic efficiency approaching unity, indicating an absence of corrosion due to reaction between the aluminum (Al) electrode and the lithium bis(trifluoromethanesulfonyl)imide ($LiC_2F_6NO_4S_2$) (LiTFSI) based electrolyte.

Example Battery Cell with Anti-Corrosion Electrodes and Air Stable Lithium Bis(trifluoromethanesulfonyl)imide ($LiC_2F_6NO_4S_2$) (LiTFSI) Based Electrolyte with Lithium Bis(Oxalato)borate (LiBOB) Additive for Rate Capability and Cycle Life Analysis In some implementations of the current subject matter, a battery cell with anti-corrosion protection may include one or more anti-corrosion layers formed from aluminum oxide ($Al_2O_3$), calcium carbonate ($CaCO_3$), and/or a combination of the two. To form the anti-corrosion layer, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide ($Al_2O_3$) or calcium carbonate ($CaCO_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter (mg/cm$^2$).

The positive electrode of the battery cell can be formed by dissolving 21.6 grams of polyvinylidene fluoride (PVDF) into 250 grams of N-methylpyrrolidone (NMP). The resulting mixture can be combined with 18 grams of carbon black and mixed for a few minutes at a rate of approximately 1000 rpm followed by 15 minutes at a rate of approximately 6500 rpm. Subsequently, 560.4 grams of lithium nickel manganese cobalt oxide ($LiNi_{0.4}Mn_{0.3}Co_{0.3}O_2$, NMC433) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 16 milligrams per square centimeter ($mg/cm^2$). The final dried solid can further be compressed to form a layer of positive electrode material having a thickness of approximately 120 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 9 milligrams per square centimeter ($mg/cm^2$). Furthermore, the final dried solid can be compressed to form a layer of negative electrode material having a thickness of approximately 129 microns (μm).

In some implementations of the current subject matter, the air stable lithium salt based electrolyte of the battery cell can include air stable lithium bis(trifluoromethanesulfonyl)imide ($LiC_2F_6NO_4S_2$) (LiTFSI) and a lithium bis(oxalato)borate (LiBOB) additive. The lithium bis(trifluoromethanesulfonyl)imide ($LiC_2F_6NO_4S_2$) (LiTFSI) based electrolyte can be formed by first preparing 10 grams of a solvent solution that includes a mixture of 3.92 grams of ethylene carbonate (($CH_2O)_2CO$), 2.91 grams of diethyl carbonate ($OC(OCH_2CH_3)_2$), and 3.17 grams of dimethyl carbonate ($OC(OCH_3)_2$). The solvent solution can be dried with a molecular sieve for 72 hours before 2.56 grams of bis(trifluoromethane)sulfonimide lithium ($CF_3SO_2NLiSO_2CF_3$) salt and 0.1 grams of lithium tetrafluoroborate ($LiBF_4$) are added to the solvent solution. Finally, 0.15 grams of vinylene carbonate (VC) as well as 0.1 grams of lithium bis(oxalate)borate (LiBOB) can be added to the solution to form the lithium bis(trifluoromethanesulfonyl)imide ($LiC_2F_6NO_4S_2$) (LiTFSI) based electrolyte.

To assemble the battery cell, the positive electrode and the negative electrode of the battery cell can be formed by punching sheets of positive electrode material and the negative electrode material into the appropriate shape and/or size using an electrode tab. The positive electrode can be dried at 125° C. for 10 hours while the negative electrode can be dried at 140° C. for 10 hours. A separator can subsequently be laminated between the positive electrode and the negative electrode to form a flat jelly-roll. The flat jelly-roll can be placed into an aluminum (Al) composite bag and dried in a 70° C. vacuum oven. Thereafter, the aluminum (Al) composite bag can be filled with the lithium bis(trifluoromethanesulfonyl)imide ($LiC_2F_6NO_4S_2$) (LiTFSI) based electrolyte, sealed, and aged for 16 hours. The assembled and aged battery cell can be subject to a formation process that includes one or more charge and discharge cycles. For example, the battery cell can be first charged to 3.8 volts at 300 milliamps (mA) and to 4.2 volts at 600 milliamps before resting for 20 minutes. Thereafter, the charged battery cell can be discharged to 2.8 volts at 600 milliamps before resting for another 20 minutes. The battery cell can subsequently be charged to 4.2 volts at 600 milliamps and rested for 20 minutes before being discharge to 2.8 volts again at 600 milliamps and rested for 20 minutes. Finally, the battery cell can be charged to 4.2 volts at 600 milliamps and rested for 20 minutes before being punctured under vacuum to release any gases. The punctured battery cell can be resealed before being subject to cycle testing.

In some implementations of the current subject matter, the battery cell can be subject to cycle testing in which the battery cell is subject to multiple charge and discharge cycles. Prior to cycle testing, the battery cell, which may have undergone the aforementioned formation process, may be fully charged to 4.2 volts. Cycle testing the battery cell can include cycling the battery cell between 2.8 volts and 4.2 volts at a discharge rate of C/5 and a charge rate of C/2. For instance, the fully charged battery cell may be discharged to 2.8 volts at 300 milliamps (e.g., a C/5 rate) and 750 milliamps (e.g., a C/2 rate). After discharging the battery cell, the battery cell can be recharged to 4.2 volts at 300 milliamps.

Example Battery Cell with Anti-Corrosion Electrodes and Air Stable Lithium Bis(trifluoromethanesulfonyl)imide ($LiC_2F_6NO_4S_2$) (LiTFSI) Based Electrolyte with Vinylene Carbonate (VC) Additive for Cycle Life and Rate Capability Analysis In some implementations of the current subject matter, a battery cell with anti-corrosion protection may include one or more anti-corrosion layers formed from aluminum oxide ($Al_2O_3$), calcium carbonate ($CaCO_3$), and/or a combination of the two. To form the anti-corrosion layer, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide ($Al_2O_3$) or calcium carbonate ($CaCO_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter ($mg/cm^2$).

The positive electrode of the battery cell can be formed by dissolving 21.6 grams of polyvinylidene fluoride (PVDF) into 250 grams of N-methylpyrrolidone (NMP). The resulting mixture can be combined with 18 grams of carbon black and mixed for a few minutes at a rate of approximately 1000 rpm followed by 15 minutes at a rate of approximately 6500 rpm. Subsequently, 560.4 grams of lithium nickel manganese cobalt oxide ($LiNi_{0.4}Mn_{0.3}Co_{0.3}O_2$, NMC433) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 16 milligrams per square centimeter ($mg/cm^2$). The final dried solid can further be compressed to form a layer of positive electrode material having a thickness of approximately 120 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 9 milligrams per square centimeter ($mg/cm^2$). Furthermore, the final dried solid can be compressed to form a layer of negative electrode material having a thickness of approximately 129 microns (μm).

In some implementations of the current subject matter, the air stable lithium salt based electrolyte of the battery cell can include air stable lithium bis(trifluoromethanesulfonyl)imide ($LiC_2F_6NO_4S_2$) (LiTFSI) and a vinylene carbonate (VC) additive. The lithium bis(trifluoromethanesulfonyl)imide ($LiC_2F_6NO_4S_2$) (LiTFSI) based electrolyte can be formed by first preparing 10 grams of a solvent solution that includes a mixture of 3.92 grams of ethylene carbonate (($CH_2O)_2CO$), 2.91 grams of diethyl carbonate ($OC(OCH_2CH_3)_2$), and 3.17 grams of dimethyl carbonate ($OC(OCH_3)_2$). The solvent solution can be dried with a molecular sieve for 72 hours before 2.56 grams of bis(trifluoromethane)sulfonimide lithium ($CF_3SO_2NLiSO_2CF_3$) salt and 0.1 grams of lithium tetrafluoroborate ($LiBF_4$) are added to the solvent solution. Finally, 0.15 grams of vinylene carbonate (VC) can be added to the solution to form the lithium bis(trifluoromethanesulfonyl)imide ($LiC_2F_6NO_4S_2$) (LiTFSI) based electrolyte.

To assemble the battery cell, the positive electrode and the negative electrode of the battery cell can be formed by punching sheets of positive electrode material and the negative electrode material into the appropriate shape and/or size using an electrode tab. The positive electrode can be dried at 125° C. for 10 hours while the negative electrode can be dried at 140° C. for 10 hours. A separator can subsequently be laminated between the positive electrode and the negative electrode to form a flat jelly-roll. The positive electrode can be further sealed in epoxy to protect any exposed aluminum from corrosion by the lithium bis(trifluoromethanesulfonyl)imide ($LiC_2F_6NO_4S_2$) (LiTFSI) salt in the electrolyte. The flat jelly-roll can be placed into an aluminum (Al) composite bag. Instead of being dried in a vacuum oven, the aluminum (Al) composite bag can be filled with the lithium bis(trifluoromethanesulfonyl)imide ($LiC_2F_6NO_4S_2$) (LiTFSI) based electrolyte in a humid environment. The filled aluminum (Al) composite bag can be sealed and aged for 16 hours before undergoing a formation process that includes one or more charge and discharge cycles. For example, the battery cell can be first charged to 3.8 volts at 300 milliamps (mA) and to 4.2 volts at 600 milliamps before resting for 20 minutes. Thereafter, the charged battery cell can be discharged to 2.8 volts at 600 milliamps before resting for another 20 minutes. The battery cell can subsequently be charged to 4.2 volts at 600 milliamps and rested for 20 minutes before being discharge to 2.8 volts again at 600 milliamps and rested for 20 minutes. Finally, the battery cell can be charged to 4.2 volts at 600 milliamps and rested for 20 minutes before being punctured under vacuum to release any gases. The punctured battery cell can be resealed before being subject to cycle testing.

Figure 21A:
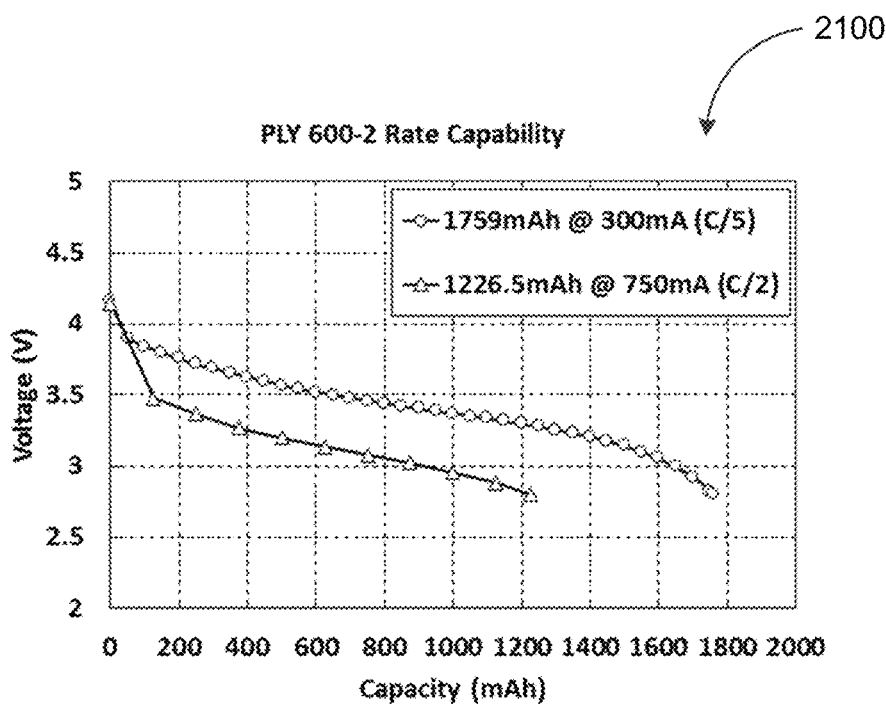
FIG. 21A depicts a graph illustrating a rate capability of a battery cell with anti-corrosion protection consistent with implementations of the current subject matter.
Figure 21B:
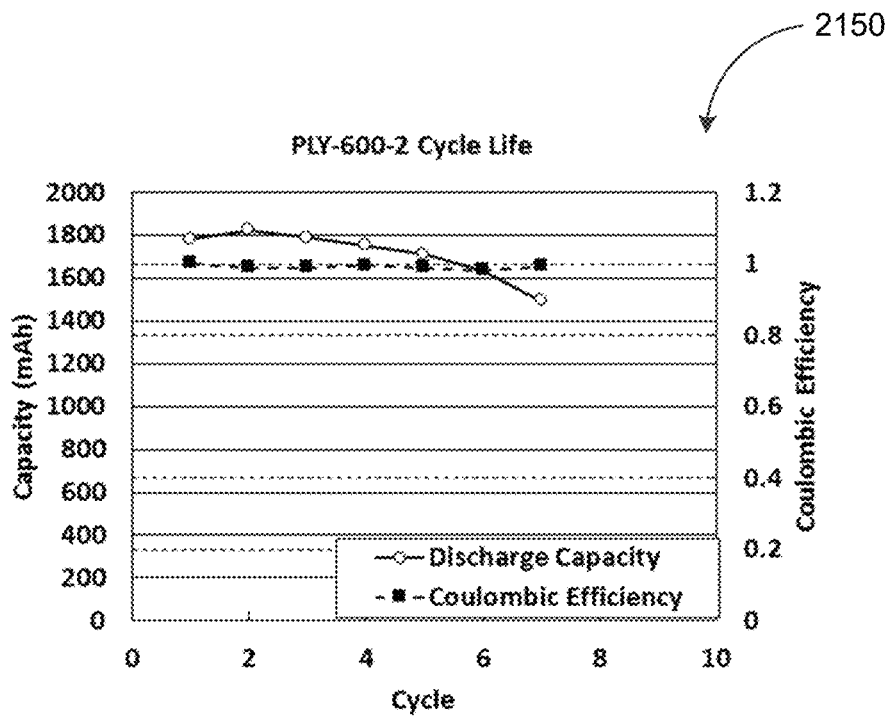
FIG. 21B depicts a graph illustrating a cycle life and coulombic efficiency of a battery cell with anti-corrosion protection consistent with implementations of the current subject matter.

In some implementations of the current subject matter, the battery cell can be subject to cycle testing in which the battery cell is subject to multiple charge and discharge cycles. Prior to cycle testing, the battery cell, which may have undergone the aforementioned formation process, may be fully charged to 4.2 volts. Cycle testing the battery cell can include cycling the battery cell between 2.8 volts and 4.2 volts at a discharge rate of C/5 and a charge rate of C/2. For instance, the fully charged battery cell may be discharged to 2.8 volts at 300 milliamps (e.g., a C/5 rate) and 750 milliamps (e.g., a C/2 rate). After discharging the battery cell, the battery cell can be recharged to 4.2 volts at 300 milliamps. The results of the cycle testing are shown in FIGS. 21A-B. FIG. 21A depicts a graph 2200 illustrating a rate capability of the battery cell with anti-corrosion electrodes and a lithium bis(trifluoromethanesulfonyl)imide ($LiC_2F_6NO_4S_2$) (LiTFSI) based electrolyte with a vinylene carbonate (VC) additive. As shown in FIG. 21A, the battery cell exhibits good rate capability, which suggests facile ionic transport through the electrolyte and good compatibility between the electrodes and the electrolyte. The moderate dependency between the capacity of the battery cell and the charge rate may be attributable to the lower conductivity of the lithium bis(trifluoromethanesulfonyl)imide ($LiC_2F_6NO_4S_2$) (LiTFSI) based electrolyte which, as noted, may include a vinylene carbonate (VC) additive. Meanwhile, FIG. 21B depicts a graph 2150 illustrating a cycle life of the battery cell. FIG. 21B shows that the battery cell may exhibit good capacity retention, losing minimal capacity through multiple charge and discharge cycles. Furthermore, the battery cell may exhibit a coulombic efficiency approaching unity, indicating an absence of corrosion due to reaction between the aluminum (Al) electrode and the lithium bis(trifluoromethanesulfonyl)imide ($LiC_2F_6NO_4S_2$) (LiTFSI) based electrolyte. It should be appreciated that filling the electrolyte in a humid environment is known to cause an extreme case of corrosion in a lithium hexafluorophosphate ($LiPF_6$) based electrolyte. Accordingly, this example battery cell demonstrates the benefits of utilizing an air stable electrolyte.

Example Battery Cell with Anti-Corrosion Electrodes and Air Stable Lithium Triflate ($LiCF_3SO_3$) Electrolyte with Vinylene Carbonate (VC) Additive for Rate Capability and Cycle Life Analysis In some implementations of the current subject matter, a battery cell with anti-corrosion protection may include one or more anti-corrosion layers formed from aluminum oxide ($Al_2O_3$), calcium carbonate ($CaCO_3$), and/or a combination of the two. To form the anti-corrosion layer, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide ($Al_2O_3$) or calcium carbonate ($CaCO_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter (mg/cm²).

The positive electrode of the battery cell can be formed by dissolving 21.6 grams of polyvinylidene fluoride (PVDF) into 250 grams of N-methylpyrrolidone (NMP). The resulting mixture can be combined with 18 grams of carbon black and mixed for a few minutes at a rate of approximately 1000 rpm followed by 15 minutes at a rate of approximately 6500 rpm. Subsequently, 560.4 grams of lithium nickel manganese cobalt oxide ($LiNi_{0.4}Mn_{0.3}Co_{0.3}O_2$, NMC433) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 16 milligrams per square centimeter (mg/cm²). The final dried solid can further be compressed to form a layer of positive electrode material having a thickness of approximately 120 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 9 milligrams per square centimeter (mg/cm²). Furthermore, the final dried solid can be compressed to form a layer of negative electrode material having a thickness of approximately 129 microns (μm).

In some implementations of the current subject matter, the air stable lithium salt based electrolyte of the battery cell can include air stable lithium triflate ($LiCF_3SO_3$) and the additive vinylene carbonate (VC). The lithium triflate ($LiCF_3SO_3$) based electrolyte can be formed by first preparing 10 grams of a solvent solution that includes a mixture of 3.92 grams of ethylene carbonate (($CH_2O)_2CO$), 2.91 grams of diethyl carbonate ($OC(OCH_2CH_3)_2$), and 3.17 grams of dimethyl carbonate ($OC(OCH_3)_2$). The solvent solution can be dried with a molecular sieve for 72 hours before 1.39 grams of lithium triflate ($LiCF_3SO_3$) salt and 0.1 grams of lithium tetrafluoroborate ($LiBF_4$) are added to the solvent solution. Finally, 0.15 grams of vinylene carbonate (VC) can be added to the solution. Instead of and/or in addition to vinylene carbonate (VC), other additives may be added to form the lithium triflate ($LiCF_3SO_3$) based electrolyte including, for example, lithium difluoro(oxalato)borate (LiDFOB), lithium bis(fluorosulfonyl)imide (LiFSI), lithium trifluoromethanesulfontate (LAT), lithium difluorophosphate (LiDFP), lithium tetrafluoroborate ($LiBF_4$), tetraethyl-ammonium tetrafluoroborate ($TEABF_4$), lithium perchlorate ($LiClO_4$), methylene ethylene carbonate (MEC), fluoroethylene carbonate (FEC), succinonitrile, 1,3-propanesultone (PS), 1-propene 1,3-sultone, methylene methanedisulfonate (MMDS), and/or the like.

To assemble the battery cell, the positive electrode and the negative electrode of the battery cell can be formed by punching sheets of positive electrode material and the negative electrode material into the appropriate shape and/or size using an electrode tab. The positive electrode can be dried at 125° C. for 10 hours while the negative electrode can be dried at 140° C. for 10 hours. A separator can subsequently be laminated between the positive electrode and the negative electrode to form a flat jelly-roll. The positive electrode can be further sealed in epoxy in order to protect any exposed aluminum (Al) on the positive electrode from corrosion by the lithium triflate ($LiCF_3SO_3$) salt in the electrolyte. The flat jelly-roll can be placed into an aluminum (Al) composite bag and dried in a 70° C. vacuum oven. Thereafter, the aluminum (Al) composite bag can be filled with the lithium bis(trifluoromethanesulfonyl)imide ($LiC_2F_6NO_4S_2$) (LiTFSI) based electrolyte, sealed, and aged for 16 hours. The assembled and aged battery cell can be subject to a formation process that includes one or more charge and discharge cycles. For example, the battery cell can be first charged to 3.8 volts at 300 milliamps (mA) and to 4.2 volts at 600 milliamps before resting for 20 minutes. Thereafter, the charged battery cell can be discharged to 2.8 volts at 600 milliamps before resting for another 20 minutes. The battery cell can subsequently be charged to 4.2 volts at 600 milliamps and rested for 20 minutes before being discharge to 2.8 volts again at 600 milliamps and rested for 20 minutes. Finally, the battery cell can be charged to 4.2 volts at 600 milliamps and rested for 20 minutes before being punctured under vacuum to release any gases. The punctured battery cell can be resealed before being subject to cycle testing.

Figure 22A:
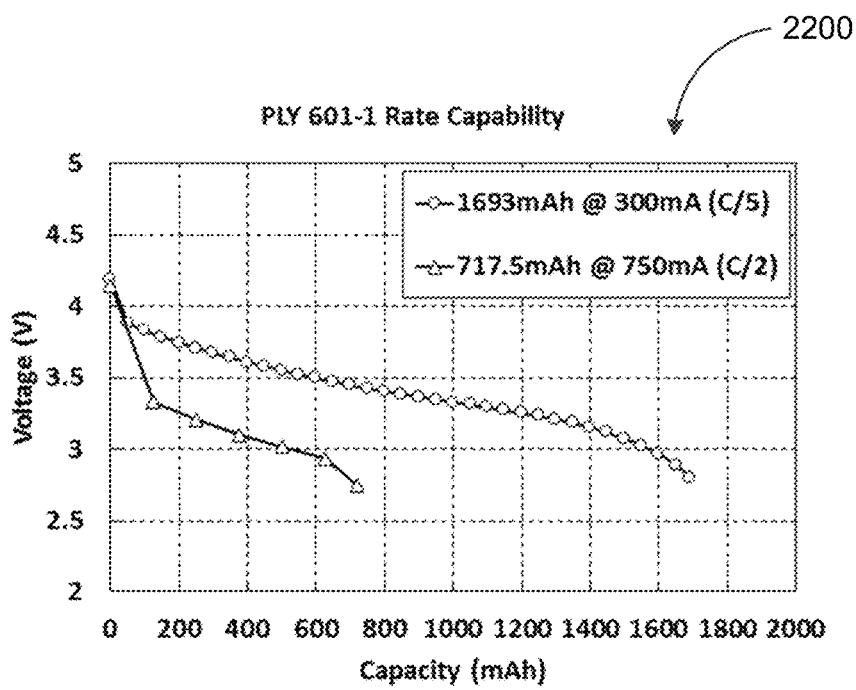
FIG. 22A depicts a graph illustrating a rate capability of a battery cell with anti-corrosion protection consistent with implementations of the current subject matter.
Figure 22B:
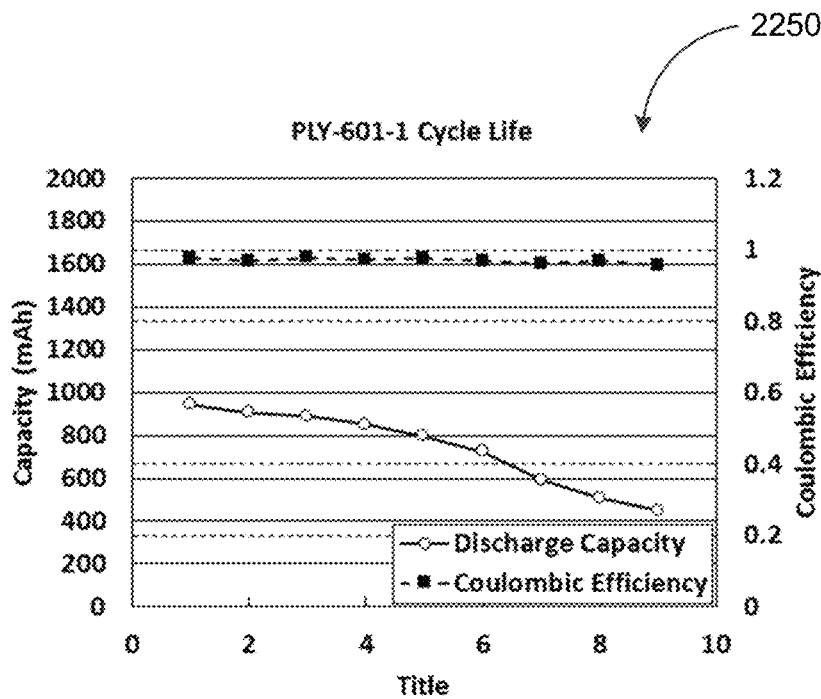
FIG. 22B depicts a graph illustrating a cycle life and coulombic efficiency of a battery cell with anti-corrosion protection consistent with implementations of the current subject matter.

In some implementations of the current subject matter, the battery cell can be subject to cycle testing in which the battery cell is subject to multiple charge and discharge cycles. Prior to cycle testing, the battery cell, which may have undergone the aforementioned formation process, may be fully charged to 4.2 volts. Cycle testing the battery cell can include cycling the battery cell between 2.8 volts and 4.2 volts at a discharge rate of C/5 and a charge rate of C/2. For instance, the fully charged battery cell may be discharged to 2.8 volts at 300 milliamps (e.g., a C/5 rate) and 750 milliamps (e.g., a C/2 rate). After discharging the battery cell, the battery cell can be recharged to 4.2 volts at 300 milliamps. The results of the cycle testing are shown in FIGS. 22A-B. FIG. 22A depicts a graph 2200 illustrating a rate capability of the battery cell with anti-corrosion electrodes and a lithium triflate ($LiCF_3SO_3$) based electrolyte with a vinylene carbonate (VC) additive. As shown in FIG. 22A, the battery cell exhibits moderate rate capability. The capacity of the battery cell can be strongly dependent of the discharge rate, which may be due to the lower conductivity of the lithium triflate ($LiCF_3SO_3$) based electrolyte. Meanwhile, FIG. 22B depicts a graph 2250 illustrating a cycle life of the battery cell. FIG. 22B shows that the battery cell may exhibit good capacity retention, losing minimal capacity through multiple charge and discharge cycles. Furthermore, the battery cell may exhibit a coulombic efficiency approaching unity, indicating an absence of corrosion due to reaction between the aluminum (Al) electrode and the lithium bis(trifluoromethanesulfonyl)imide ($LiC_2F_6NO_4S_2$) (LiTFSI) based electrolyte.

Example Battery Cell with Anti-Corrosion Electrodes and Hybrid Electrolyte for Rate Capability and Cycle Life Analysis In some implementations of the current subject matter, a battery cell with anti-corrosion protection may include one or more anti-corrosion layers formed from aluminum oxide ($Al_2O_3$), calcium carbonate ($CaCO_3$), and/or a combination of the two. To form the anti-corrosion layer, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide ($Al_2O_3$) or calcium carbonate ($CaCO_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (µm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter (mg/cm²).

The positive electrode of the battery cell can be formed by dissolving 9 grams of polyvinylidene fluoride (PVDF) into 115 grams of N-methylpyrrolidone (NMP). The resulting mixture can be combined with 9 grams of carbon black and mixed for a few minutes at a rate of approximately 1000 rpm followed by 15 minutes at a rate of approximately 6500 rpm. Subsequently, 582 grams of lithium nickel manganese cobalt oxide ($LiNi_{0.6}Mn_{0.2}Co_{0.2}O_2$, NMC622) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 18 milligrams per square centimeter (mg/cm²). The final dried solid can further be compressed to form a layer of positive electrode material having a thickness of approximately 135 microns (µm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (µm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 11 milligrams per square centimeter (mg/cm²). Furthermore, the final dried solid can be compressed to form a layer of negative electrode material having a thickness of approximately 155 microns (µm).

In some implementations of the current subject matter, the hybrid electrolyte of the battery cell can include a non-air stable lithium salt such as, for example, lithium hexafluorophosphate ($LiPF_6$) and/or the like. In addition, the hybrid electrolyte of the battery cell can include an air stable lithium salt or a combination of air stable lithium salts such as, for example, lithium bis(trifluoromethanesulfonyl)imide ($LiC_2F_6NO_4S_2$) (LiTFSI) and/or lithium bis(fluorosulfonyl)imide ($F_2LiNO_4S_2$) (LiFSI), and/or the like. To form the hybrid electrolyte, 44.00 grams of ethylene carbonate (($CH_2O)_2CO$), 32.50 grams of diethyl carbonate (OC($OCH_2CH_3)_2$), and 35.67 grams of dimethyl carbonate (OC($OCH_3)_2$) can be combined to form a solvent solution, which can subsequently be dried with a molecular sieve for 72 hours. Thereafter, 0.72 grams of lithium bis(trifluoromethanesulfonyl)imide ($LiC_2F_6NO_4S_2$) (LiTFSI) salt and 1.40 grams of lithium bis(fluorosulfonyl)imide ($F_2LiNO_4S_2$)

(LiFSI) can be dissolved in 11.22 grams the solvent solution before 0.17 grams of vinylene carbonate (VC) is also added to the solvent solution.

To assemble the battery cell as a prismatic cell, the positive electrode and the negative electrode of the battery cell can be formed by being cut into ribbons before tabs are welded on the electrodes. Subsequently, the positive electrode can be sprayed with a conformal silicone coating to protect any exposed aluminum (Al) from corrosion caused by the lithium salts in the hybrid electrolyte. The positive electrode can be dried at 125° C. for 10 hours while the negative electrode can be dried at 140° C. for 10 hours. A separator can subsequently be laminated between the positive electrode and the negative electrode. Furthermore, the positive electrode and the negative electrode can be rolled with the separator in the center to form a flat jelly-roll, which can subsequently be placed into an aluminum (Al) composite bag and dried in a 70° C. vacuum oven. Thereafter, the aluminum (Al) composite bag can be filled with the hybrid electrolyte, sealed, and aged for 16 hours. The assembled and aged battery cell can be subject to a formation process that includes one or more charge and discharge cycles. For example, the battery cell can be potentiostatically charged to 3.6 volts at 50 milliamps (mA) for 4 hours and to 4.2 volts at 100 milliamps for 8.5 hours before resting for 30 minutes. Thereafter, the charged battery cell can be thermally condition at 60° C. for 24 hours before being galvanostatically discharged to 2.8 volts at 200 milliamps and rested for 30 minutes. Again, the battery cell can subsequently be potentiostatically charged to 4.2 volts at 200 milliamps for 10 hours and rested for 30 minutes before being galvanstatically discharged to 2.8 volts again at 200 milliamps and rested for 30 minutes. Finally, the battery cell can be potentiostatically charged to 3.8 volts at 200 milliamps for 30 minutes and rested for another 30 minutes before being punctured under vacuum to release any gases. The punctured battery cell is resealed before being subject to cycle testing.

In some implementations of the current subject matter, the battery cell can be subject to cycle testing in which the battery cell is subject to multiple charge and discharge cycles. Prior to cycle testing, the battery cell, which may have undergone the aforementioned formation process, may be fully charged to 4.2 volts. Cycle testing the battery cell can include cycling the battery cell between 2.8 volts and 4.2 volts at different discharge rates (e.g., C/5, C/20, 1C, 2C, and/or the like). For instance, the fully charged battery cell may be galvanostatically discharged to 2.8 volts at 220 milliamps (e.g., a C/5 rate), 550 milliamps (e.g., a C/2 rate), 1.1 amp (e.g., a 1C rate), and 2.2 amps (e.g., a 2C rate). After discharging the battery cell, the battery cell can be potentiostatically recharged to 4.2 volts at 220 milliamps.

Figure 23A:
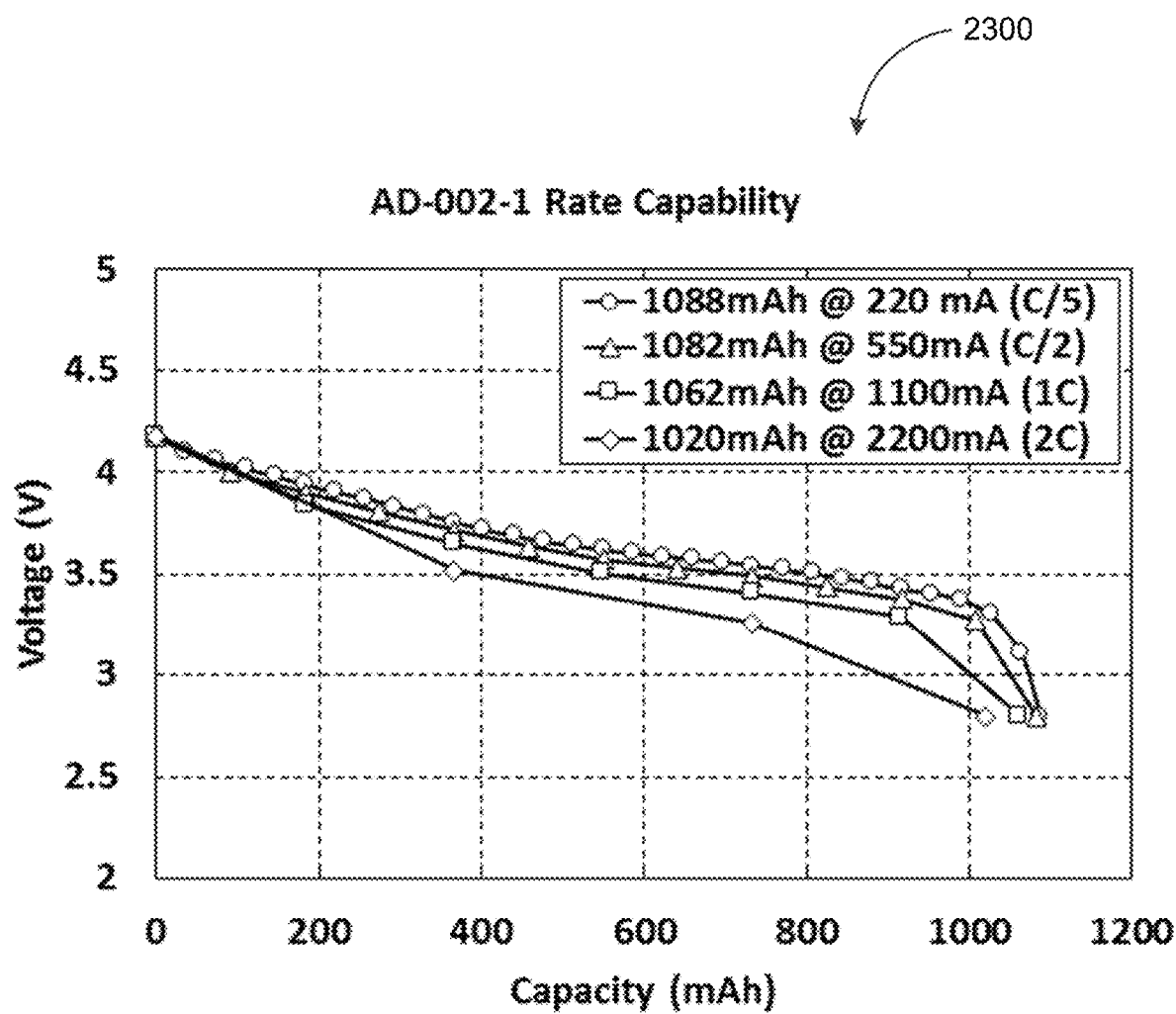
FIG. 23A depicts a graph illustrating a rate capability of a battery cell with anti-corrosion protection consistent with implementations of the current subject matter.
Figure 23B:
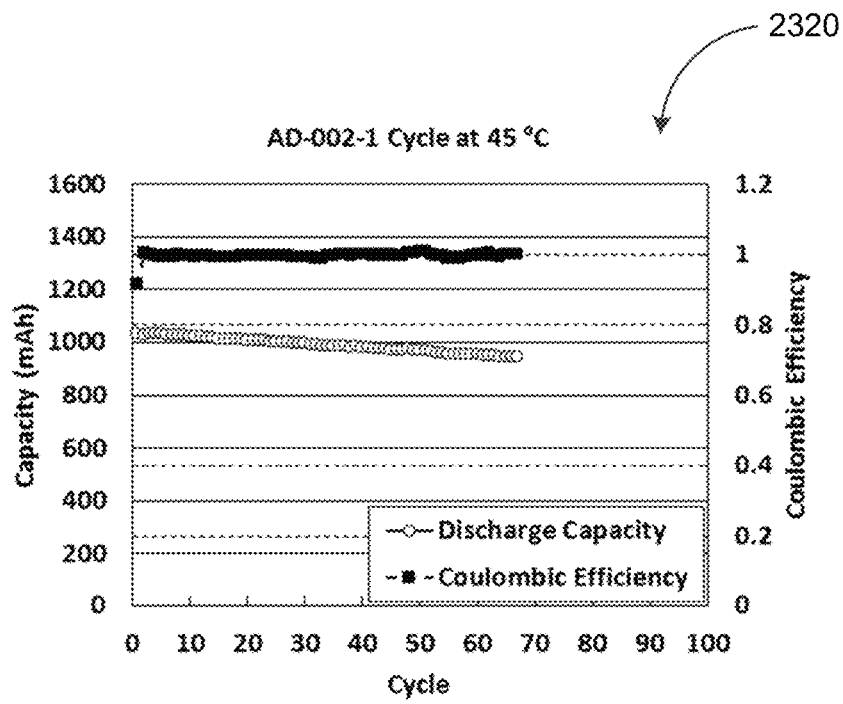
FIG. 23B depicts a graph illustrating a cycle life and coulombic efficiency of a battery cell with anti-corrosion protection consistent with implementations of the current subject matter.
Figure 23C:
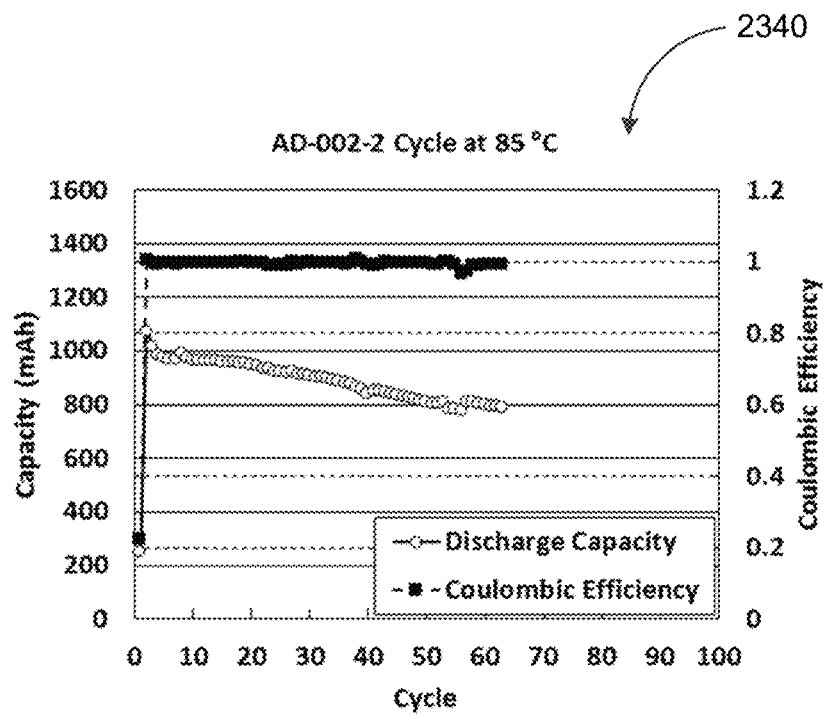
FIG. 23C depicts a graph illustrating a cycle life and coulombic efficiency of a battery cell with anti-corrosion protection consistent with implementations of the current subject matter.

The results of the cycle testing are shown in FIGS. 23A-C. FIG. 23A depicts a graph 2300 illustrating a rate capability of the battery cell with anti-corrosion electrodes and a hybrid electrolyte. As shown in FIG. 23A, the battery cell exhibits excellent rate capability, activating 93.58% of its nominal C/5 capacity at a 2C discharge rate. Meanwhile, FIG. 23B depicts a graph 2320 illustrating a cycle life of the battery cell at 45° C. and FIG. 23C depicts a graph 2340 illustrating a cycle life of the battery cell at 85° C. FIGS. 24B-C show the battery cell as exhibiting superior reversibility and coulombic efficiency (e.g., >99%) at both higher and lower temperatures, which indicates an absence of corrosion due to reaction between the aluminum (Al) electrode and the lithium salts that are present in the hybrid electrolyte. It should be appreciated the higher temperatures expedite corrosion and therefore the capacity declines more rapidly at 85° C. Moreover, it should be appreciated that lithium hexafluorophosphate (LiPF$_6$) based electrolytes begin to decompose at 65° C. As such, this example battery cell demonstrates high temperature cyclability as another potential benefit of air stable electrolytes.

Example Baseline Battery Cell with Hybrid Electrolyte for Rate Capability and Cycle Life Analysis In some implementations of the current subject matter, a baseline battery cell without anti-corrosion protection and a hybrid electrolyte may be prepared to serve as a reference point in analyzing the effects of anti-corrosion protection in the rate capability and cycle life of a battery cell. The positive electrode of the battery cell can be formed by dissolving 9 grams of polyvinylidene fluoride (PVDF) into 115 grams of N-methylpyrrolidone (NMP). The resulting mixture can be combined with 9 grams of carbon black and mixed for a few minutes at a rate of approximately 1000 rpm followed by 15 minutes at a rate of approximately 6500 rpm. Subsequently, 582 grams of lithium nickel manganese cobalt oxide (LiNi$_{0.6}$Mn$_{0.2}$Co$_{0.2}$O$_2$, NMC622) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 18 milligrams per square centimeter (mg/cm$^2$). The final dried solid can further be compressed to form a layer of positive electrode material having a thickness of approximately 130 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 11 milligrams per square centimeter (mg/cm$^2$). Furthermore, the final dried solid can be compressed to form a layer of negative electrode material having a thickness of approximately 155 microns (μm).

In some implementations of the current subject matter, the hybrid electrolyte of the battery cell can include a non-air stable lithium salt such as, for example, lithium hexafluorophosphate (LiPF$_6$) and/or the like. In addition, the hybrid electrolyte of the battery cell can include an air stable lithium salt or a combination of air stable lithium salts such as, for example, lithium bis(trifluoromethanesulfonyl)imide ($LiC_2F_6NO_4S_2$) (LiTFSI), lithium bis(fluorosulfonyl)imide ($F_2LiNO_4S_2$) (LiFSI), and/or the like. To form the hybrid electrolyte, 44.00 grams of ethylene carbonate (($CH_2O)_2CO$), 32.50 grams of diethyl carbonate (OC($OCH_2CH_3)_2$), and 35.67 grams of dimethyl carbonate (OC($OCH_3)_2$) can be combined to form a solvent solution, which can subsequently be dried with a molecular sieve for 72 hours. Thereafter, 0.72 grams of lithium bis(trifluoromethanesulfonyl)imide ($LiC_2F_6NO_4S_2$) (LiTFSI) salt and 1.40 grams of lithium bis(fluorosulfonyl)imide ($F_2LiNO_4S_2$) (LiFSI) can be dissolved in 11.22 grams the solvent solution before 0.17 grams of vinylene carbonate (VC) is also added to the solvent solution.

To assemble the battery cell as a prismatic cell, the positive electrode and the negative electrode of the baseline battery cell can be formed by being cut into ribbons before tabs are welded on the electrodes. Subsequently, the positive electrode can be sprayed with a conformal silicone coating to protect any exposed aluminum (Al) from corrosion caused by the lithium salts in the hybrid electrolyte. The positive electrode can be dried at 125° C. for 10 hours while the negative electrode can be dried at 140° C. for 10 hours. A separator can subsequently be laminated between the positive electrode and the negative electrode. Furthermore, the positive electrode and the negative electrode can be rolled with the separator in the center to form a flat jelly-roll, which can subsequently be placed into an aluminum (Al) composite bag and dried in a 70° C. vacuum oven. Thereafter, the aluminum (Al) composite bag can be filled with the hybrid electrolyte, sealed, and aged for 16 hours. The assembled and aged battery cell can be subject to a formation process that includes one or more charge and discharge cycles. For example, the battery cell can be potentiostatically charged to 3.6 volts at 50 milliamps (mA) for 4 hours and to 4.2 volts at 100 milliamps for 8.5 hours before resting for 30 minutes. Thereafter, the charged battery cell can be thermally condition at 60° C. for 24 hours before being galvanostatically discharged to 2.8 volts at 200 milliamps and rested for 30 minutes. Again, the battery cell can be potentiostatically charged to 4.2 volts at 200 milliamps for 10 hours and rested for 30 minutes before being galvanstatically discharged to 2.8 volts again at 200 milliamps and rested for 30 minutes. Finally, the battery cell can be potentiostatically charged to 3.8 volts at 200 milliamps for 30 minutes and rested for another 30 minutes before being punctured under vacuum to release any gases. The punctured battery cell is resealed before being subject to cycle testing.

In some implementations of the current subject matter, the battery cell can be subject to cycle testing in which the battery cell is subject to multiple charge and discharge cycles. Prior to cycle testing, the battery cell, which may have undergone the aforementioned formation process, may be fully charged to 4.2 volts. Cycle testing the battery cell can include cycling the battery cell between 2.8 volts and 4.2 volts at different discharge rates (e.g., C/5, C/2, 1C, 2C, and/or the like). For instance, the fully charged battery cell may be galvanostatically discharged to 2.8 volts at 220 milliamps (e.g., a C/5 rate), 550 milliamps (e.g., a C/2 rate), 1.1 amp (e.g., a 1C rate), and 2.2 amps (e.g., a 2C rate). After discharging the battery cell, the battery cell can be potentiostatically recharged to 4.2 volts at 220 milliamps.

Figure 24A:
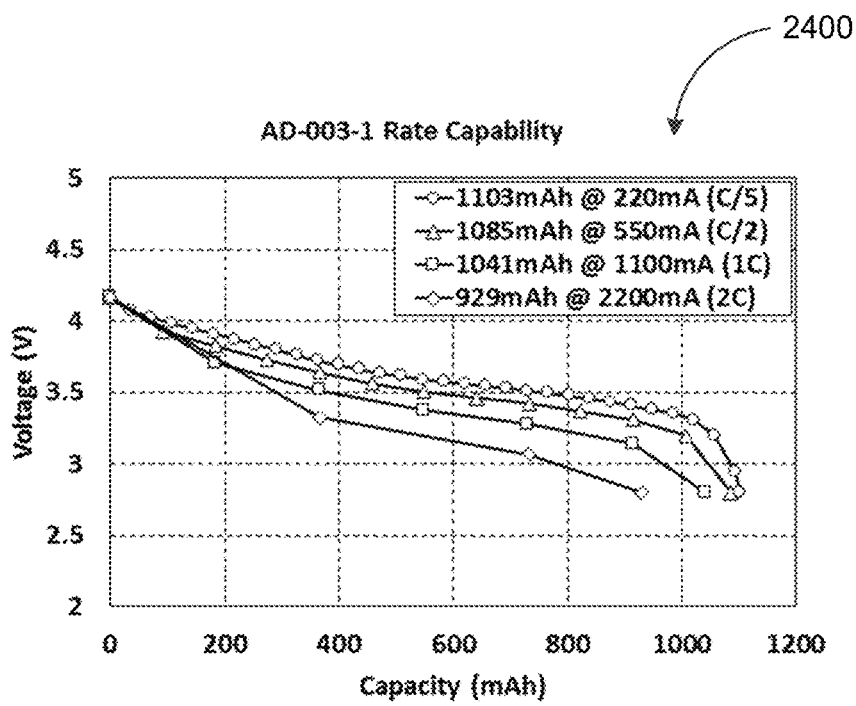
FIG. 24A depicts a graph illustrating a discharge profile of a battery cell without anti-corrosion protection consistent with implementations of the current subject matter.
Figure 24B:
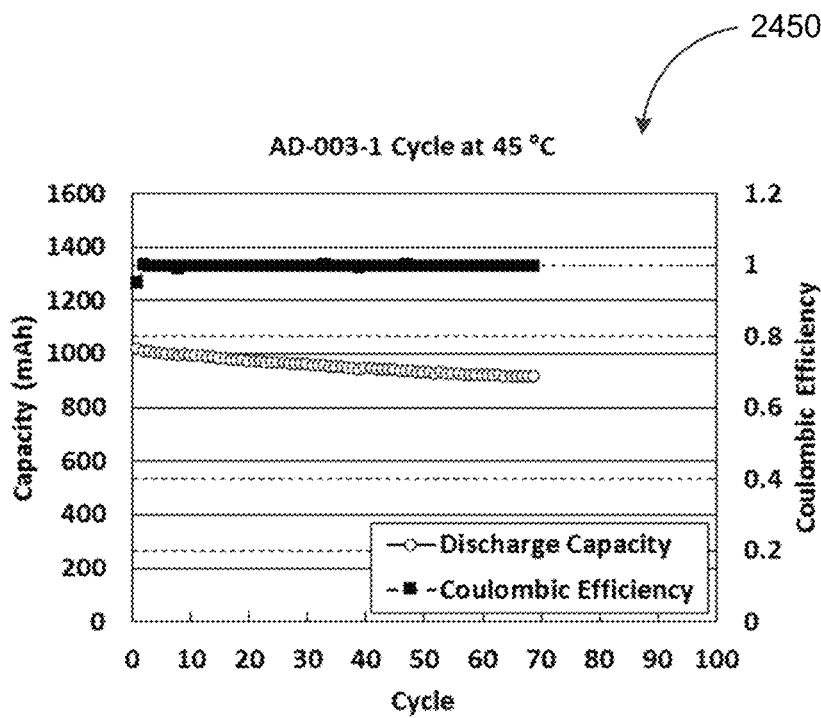
FIG. 24B depicts a graph illustrating a cycle life and coulombic efficiency of a battery cell without anti-corrosion protection consistent with implementations of the current subject matter.

The results of the cycle testing are shown in FIGS. 24A-B. FIG. 24A depicts a graph 2400 illustrating a rate capability of the battery cell with anti-corrosion electrodes and a hybrid electrolyte. As shown in FIG. 24A, the battery cell exhibits reasonable rate capability, activating 84.22% of its nominal C/5 capacity at a 2C discharge rate. The capacity of the battery cell can be moderately dependent of the discharge rate, which may be due to minimal corrosion of the current collector by the electrolyte. Meanwhile, FIG. 24B depicts a graph 2450 illustrating a cycle life of the battery cell at 45° C. FIG. 24B shows the battery cell as exhibiting reasonable reversibility and coulombic efficiency (e.g., >99%) even at 45° C., which indicates minimal corrosion due to reaction between the aluminum (Al) electrode and the lithium salts that are present in the hybrid electrolyte. It should be appreciated that the hybrid electrolyte may contain a lower concentration of air stable salts, thereby reducing the corrosiveness of the electrolyte. Nevertheless, the battery cell can be cycled at elevated temperatures to enhance the effects of the anti-corrosion protection.

Example Battery Cell with Anti-Corrosion Electrodes and Non-Air Stable Lithium Hexafluorophosphate (LiPF) Based Carbonate Electrolyte for Rate Capability and Cycle Life Analysis In some implementations of the current subject matter, a battery cell with anti-corrosion protection may include one or more anti-corrosion layers formed from aluminum oxide ($Al_2O_3$), calcium carbonate ($CaCO_3$), and/or a combination of the two. To form the anti-corrosion layer, 1 gram of Torlon® 4000TF can be dissolved into 10 grams of N-methylpyrrolidone (NMP). Meanwhile, 6 grams of polyvinylidene fluoride (PVDF) can be dissolved into another 70 grams of N-methylpyrrolidone (NMP). The Torlon® 4000TF solution and the polyvinylidene fluoride (PVDF) solution can be combined with 0.4 grams of carbon black and mixed for a few minutes at a rate of approximately 1000 rpm followed by 20 minutes at a rate of approximately 6500 rpm. This mixture can then be combined with 42 grams of nano aluminum oxide ($Al_2O_3$) or calcium carbonate ($CaCO_3$) powder or a mixture of the two and mixed for a few minutes at a rate of approximately 1000 rpm followed by 20 min at the rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.7 milligrams per square centimeter (mg/$cm^2$).

The positive electrode of the battery cell can be formed by dissolving 9 grams of polyvinylidene fluoride (PVDF) into 115 grams of N-methylpyrrolidone (NMP). The resulting mixture can be combined with 9 grams of carbon black and mixed for a few minutes at a rate of approximately 1000 rpm followed by 15 minutes at a rate of approximately 6500 rpm. Subsequently, 582 grams of lithium nickel manganese cobalt oxide ($LiNi_{0.6}Mn_{0.2}CO_{0.2}O_2$, NMC622) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 18 milligrams per square centimeter (mg/$cm^2$). The final dried solid can further be compressed to form a layer of positive electrode material having a thickness of approximately 135 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 11 milligrams per square centimeter (mg/cm$^2$). Furthermore, the final dried solid can be compressed to form a layer of negative electrode material having a thickness of approximately 155 microns (μm).

In some implementations of the current subject matter, the non-air stable lithium salt based electrolyte of the battery cell can be formed by dissolving 1.52 grams of lithium hexafluorophosphate (LiPF$_6$), a non-air stable lithium salt, in 10 milliliters of a solvent solution that includes one or more organic carbonates.

To assemble the battery cell as a prismatic cell, the positive electrode and the negative electrode of the battery cell can be formed by being cut into ribbons before tabs are welded on the electrodes. Subsequently, the positive electrode can be sprayed with a conformal silicone coating to protect any exposed aluminum (Al) from corrosion caused by the lithium salts in the hybrid electrolyte. The positive electrode can be dried at 125° C. for 10 hours while the negative electrode can be dried at 140° C. for 10 hours. A separator can subsequently be laminated between the positive electrode and the negative electrode. Furthermore, the positive electrode and the negative electrode can be rolled with the separator in the center to form a flat jelly-roll, which can subsequently be placed into an aluminum (Al) composite bag and dried in a 70° C. vacuum oven. Thereafter, the aluminum (Al) composite bag can be filled with the hybrid electrolyte, sealed, and aged for 16 hours. The assembled and aged battery cell can be subject to a formation process that includes one or more charge and discharge cycles. For example, the battery cell can be potentiostatically charged to 3.6 volts at 50 milliamps (mA) for 4 hours and to 4.2 volts at 100 milliamps for 8.5 hours before resting for 30 minutes. Thereafter, the charged battery cell can be thermally condition at 60° C. for 24 hours before being galvanostatically discharged to 2.8 volts at 200 milliamps and rested for 30 minutes. Again, the battery cell can be potentiostatically charged to 4.2 volts at 200 milliamps for 10 hours and rested for 30 minutes before being galvanstatically discharged to 2.8 volts again at 200 milliamps and rested for 30 minutes. Finally, the battery cell can be potentiostatically charged to 3.8 volts at 200 milliamps for 30 minutes and rested for another 30 minutes before being punctured under vacuum to release any gases. The punctured battery cell is resealed before being subject to cycle testing.

In some implementations of the current subject matter, the battery cell can be subject to cycle testing in which the battery cell is subject to multiple charge and discharge cycles. Prior to cycle testing, the battery cell, which may have undergone the aforementioned formation process, may be fully charged to 4.2 volts. Cycle testing the battery cell can include cycling the battery cell between 2.8 volts and 4.2 volts at different discharge rates (e.g., C/5, C/2, 1C, 2C, and/or the like). For instance, the fully charged battery cell may be galvanostatically discharged to 2.8 volts at 220 milliamps (e.g., a C/5 rate), 550 milliamps (e.g., a C/2 rate), 1.1 amp (e.g., a 1C rate), and 2.2 amps (e.g., a 2C rate). After discharging the battery cell, the battery cell can be potentiostatically recharged to 4.2 volts at 220 milliamps.

Figure 25A:
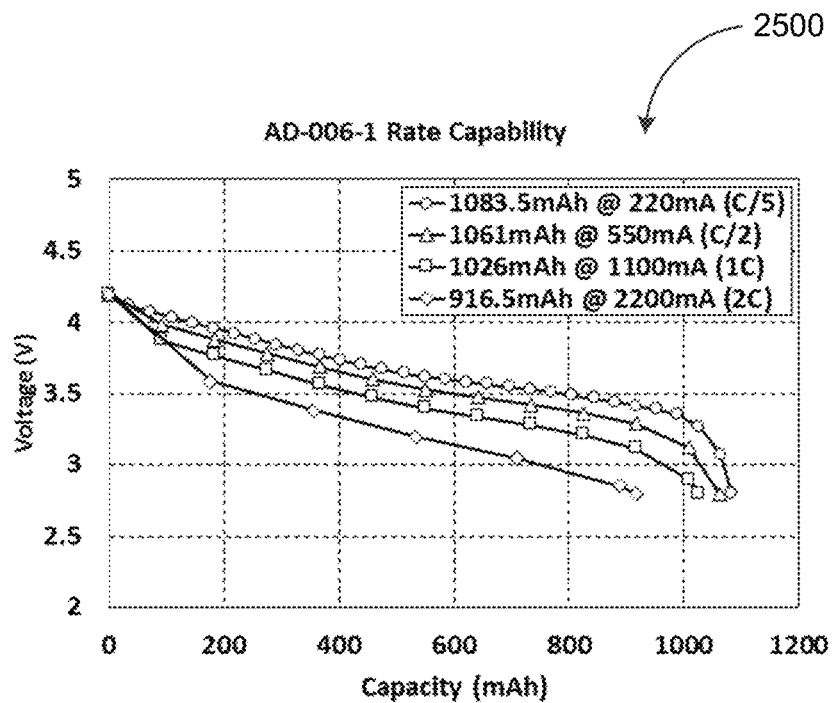
FIG. 25A depicts a graph illustrating a rate capability of a battery cell with anti-corrosion protection consistent with implementations of the current subject matter.
Figure 25B:
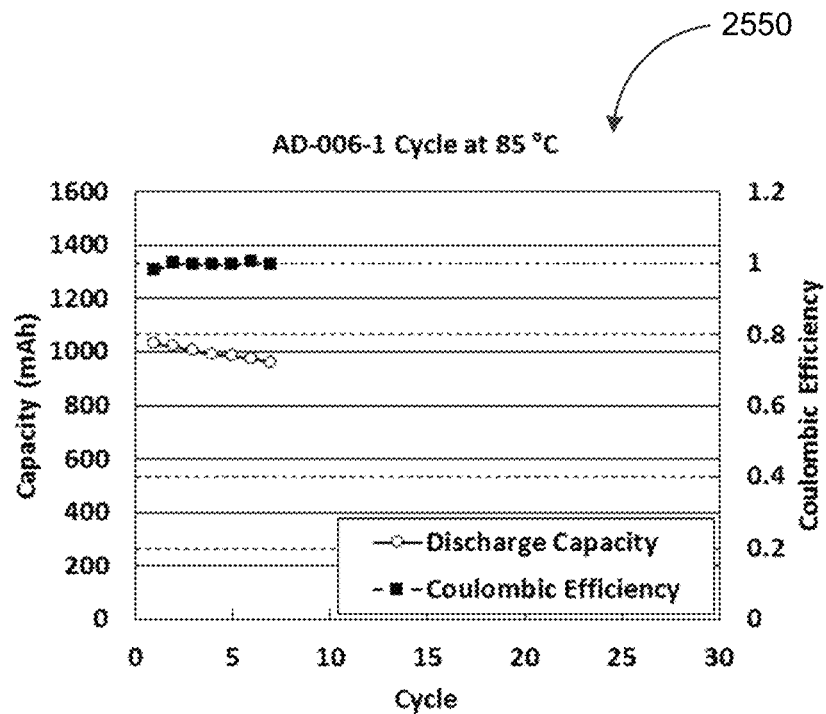
FIG. 25B depicts a graph illustrating a cycle life and coulombic efficiency of a battery cell with anti-corrosion protection consistent with implementations of the current subject matter.

The results of the cycle testing are shown in FIGS. 25A-B. FIG. 25A depicts a graph 2500 illustrating a rate capability of the battery cell with anti-corrosion electrodes and a lithium hexafluorophosphate (LiPF$_6$) based carbonate electrolyte. As shown in FIG. 25A, the battery cell exhibits reasonable rate capability, activating 84.59% of its nominal C/5 capacity at a 2C discharge rate. Meanwhile, FIG. 25B depicts a graph 2550 illustrating a cycle life of the battery cell at 85° C. FIG. 25B shows the battery cell as exhibiting reasonable reversibility and coulombic efficiency (e.g., >99%) at 85° C., which indicates an absence of corrosion due to reaction between the aluminum (Al) electrode and the lithium hexafluorophosphate (LiPF$_6$) salt that is present in the electrolyte. It should be appreciated that although the lithium hexafluorophosphate (LiPF$_6$) based electrolyte is known to decompose to produce hydrofluoric acid at 85° C., the anti-corrosion layer may have a passivating effect to slow the corrosion.

Example Baseline Battery Cell with Non-Air Stable Lithium Hexafluorophosphate (LiPF) Based Carbonate Electrolyte for Rate Capability and Cycle Life Analysis In some implementations of the current subject matter, a baseline battery cell without anti-corrosion protection and a hybrid electrolyte may be prepared to serve as a reference point in analyzing the effects of anti-corrosion protection in the rate capability and cycle life of a battery cell. The positive electrode of the battery cell can be formed by dissolving 9 grams of polyvinylidene fluoride (PVDF) into 115 grams of N-methylpyrrolidone (NMP). The resulting mixture can be combined with 9 grams of carbon black and mixed for a few minutes at a rate of approximately 1000 rpm followed by 15 minutes at a rate of approximately 6500 rpm. Subsequently, 582 grams of lithium nickel manganese cobalt oxide (LiNi$_{0.6}$Mn$_{0.2}$Co$_{0.2}$O$_2$, NMC622) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 18 milligrams per square centimeter (mg/cm$^2$). The final dried solid can further be compressed to form a layer of positive electrode material having a thickness of approximately 130 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 11 milligrams per square centimeter (mg/cm$^2$). Furthermore, the final dried solid can be compressed to form a layer of negative electrode material having a thickness of approximately 155 microns (μm).

In some implementations of the current subject matter, the non-air stable lithium salt based electrolyte of the baseline battery cell can be formed by dissolving 1.52 grams of lithium hexafluorophosphate (LiPF$_6$), a non-air stable lithium salt, in 10 milliliters of a solvent solution that includes one or more organic carbonates.

To assemble the baseline battery cell as a prismatic cell, the positive electrode and the negative electrode of the baseline battery cell can be formed by being cut into ribbons before tabs are welded on the electrodes. Subsequently, the positive electrode can be sprayed with a conformal silicone coating to protect any exposed aluminum (Al) from corrosion caused by the lithium salts in the hybrid electrolyte. The positive electrode can be dried at 125° C. for 10 hours while the negative electrode can be dried at 140° C. for 10 hours. A separator can subsequently be laminated between the positive electrode and the negative electrode. Furthermore, the positive electrode and the negative electrode can be rolled with the separator in the center to form a flat jelly-roll, which can subsequently be placed into an aluminum (Al) composite bag and dried in a 70° C. vacuum oven. Thereafter, the aluminum (Al) composite bag can be filled with the hybrid electrolyte, sealed, and aged for 16 hours. The assembled and aged baseline battery cell can be subject to a formation process that includes one or more charge and discharge cycles. For example, the baseline battery cell can be potentiostatically charged to 3.6 volts at 50 milliamps (mA) for 4 hours and to 4.2 volts at 100 milliamps for 8.5 hours before resting for 30 minutes. Thereafter, the charged baseline battery cell can be thermally condition at 60° C. for 24 hours before being galvanostatically discharged to 2.8 volts at 200 milliamps and rested for 30 minutes. Again, the baseline battery cell can be potentiostatically charged to 4.2 volts at 200 milliamps for 10 hours and rested for 30 minutes before being galvanstatically discharged to 2.8 volts again at 200 milliamps and rested for 30 minutes. Finally, the baseline battery cell can be potentiostatically charged to 3.8 volts at 200 milliamps for 30 minutes and rested for another 30 minutes before being punctured under vacuum to release any gases. The punctured baseline battery cell is resealed before being subject to cycle testing.

In some implementations of the current subject matter, the baseline battery cell can be subject to cycle testing in which the baseline battery cell is subject to multiple charge and discharge cycles. Prior to cycle testing, the baseline battery cell, which may have undergone the aforementioned formation process, may be fully charged to 4.2 volts. Cycle testing the baseline battery cell can include cycling the battery cell between 2.8 volts and 4.2 volts at different discharge rates (e.g., C/5, C/2, 1C, 2C, and/or the like). For instance, the fully charged baseline battery cell may be galvanostatically discharged to 2.8 volts at 220 milliamps (e.g., a C/5 rate), 550 milliamps (e.g., a C/2 rate), 1.1 amp (e.g., a 1C rate), and 2.2 amps (e.g., a 2C rate). After discharging the baseline battery cell, the baseline battery cell can be potentiostatically recharged to 4.2 volts at 220 milliamps.

Figure 26A:
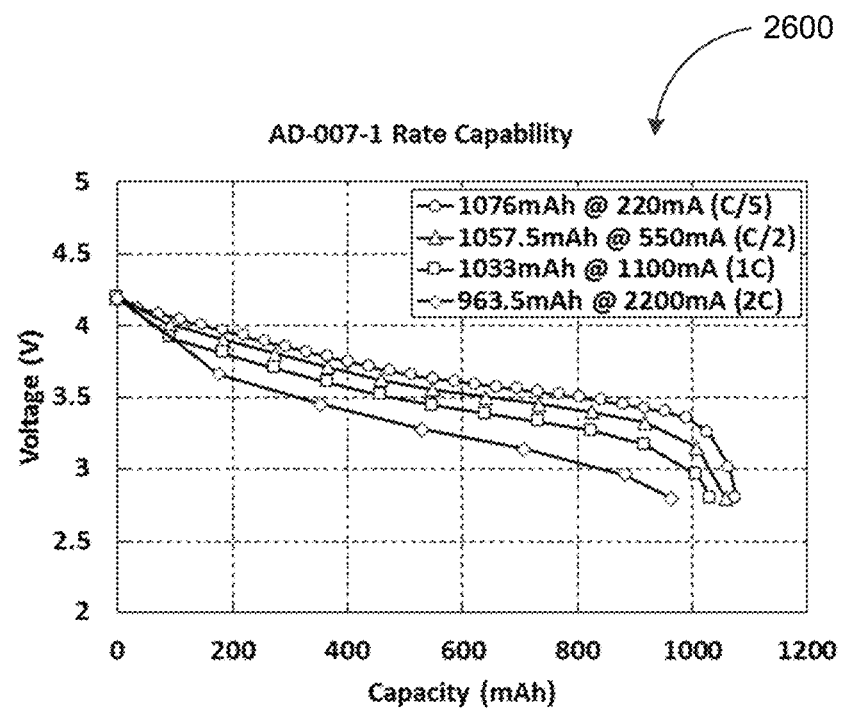
FIG. 26A depicts a graph illustrating a rate capability of a battery cell without anti-corrosion protection consistent with implementations of the current subject matter.
Figure 26B:
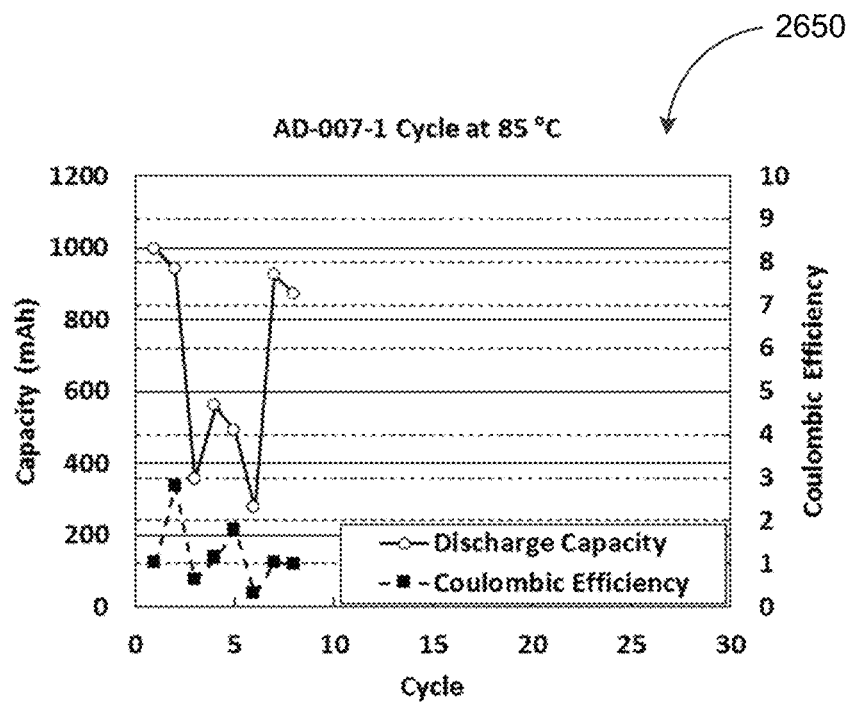
FIG. 26B depicts a graph illustrating a cycle life and coulombic efficiency of a battery cell without anti-corrosion protection consistent with implementations of the current subject matter.

The results of the cycle testing are shown in FIGS. 26A-B. FIG. 26A depicts a graph 2600 illustrating a rate capability of the baseline battery cell with a lithium hexafluorophosphate (LiPF$_6$) based carbonate electrolyte. As shown in FIG. 26A, the baseline battery cell exhibits superior rate capability, activating 93.58% of its nominal C/5 capacity at a 2C discharge rate. Meanwhile, FIG. 26B depicts a graph 2650 illustrating a cycle life of the battery cell at 85° C. FIG. 26B shows the battery cell as exhibiting erratic discharge capacities and coulombic efficiencies due to corrosion of the aluminum (Al) electrode caused by the decomposition of the lithium hexafluorophosphate (LiPF$_6$) based electrolyte at 85° C.

Figure 27A:
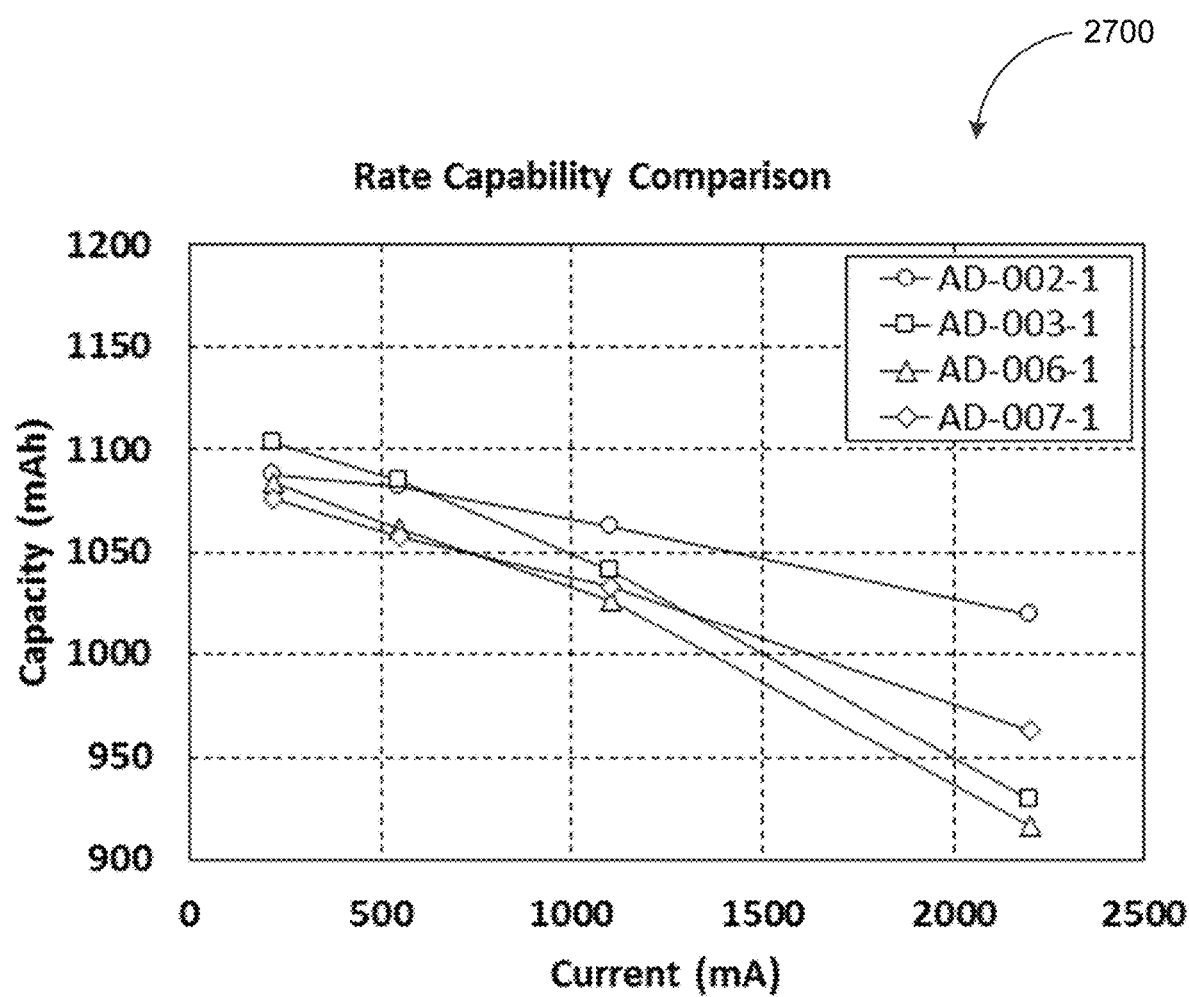
FIG. 27A depicts a graph illustrating a comparison in the rate capabilities of different battery cells consistent with implementations of the current subject matter.
Figure 27B:
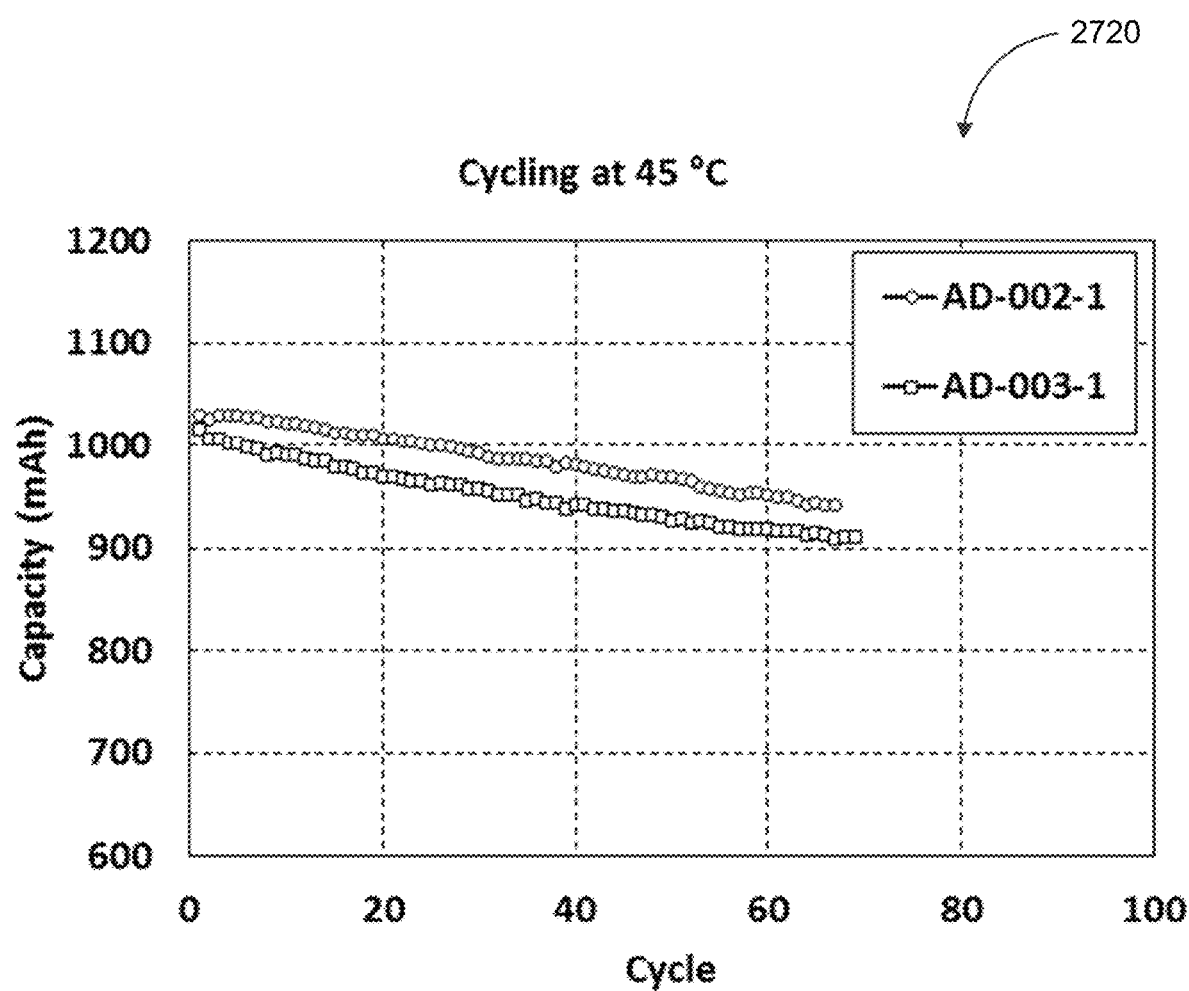
FIG. 27B depicts a graph illustrating a comparison in the cycle life at 45° C. of different battery cells consistent with implementations of the current subject matter.
Figure 27C:
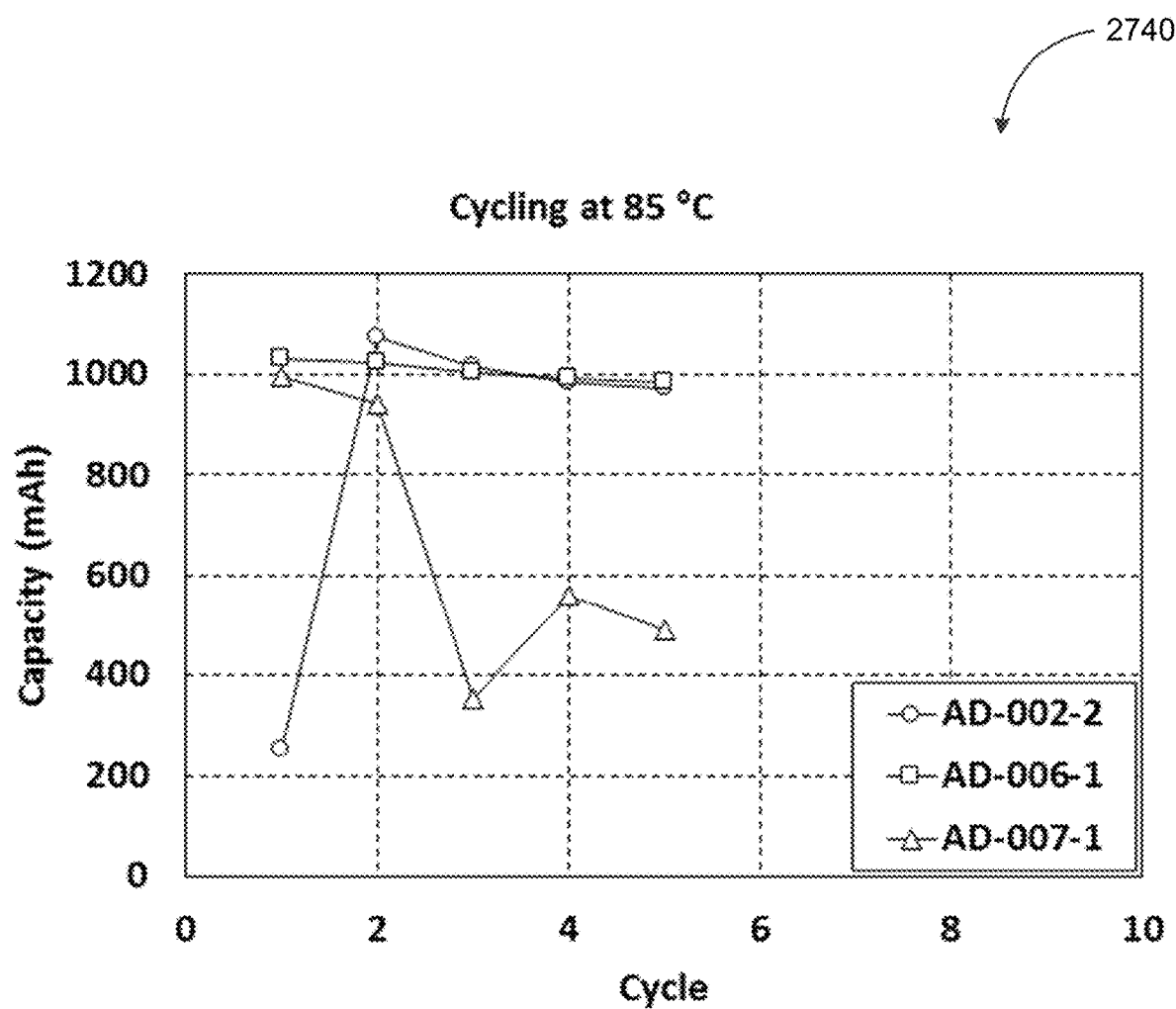
FIG. 27C depicts a graph illustrating a comparison in the cycle life at 85° C. of different battery cells consistent with implementations of the current subject matter.

FIGS. 27A-C further illustrate the effects of anti-corrosion protection. As shown in FIGS. 27A-C, battery cells with anti-corrosion protection and having a hybrid electrolyte demonstrate superior performance relative to other examples of battery cells. For example, FIG. 27A depicts a graph 2700 illustrating the rate capabilities of a battery cell with anti-corrosion protection in a hybrid electrolyte (AD-002-1), a battery cell without anti-corrosion protection in a hybrid electrolyte (AD-003-1), a battery cell with anti-corrosion protection in a non-air stable lithium salt based electrolyte (AD-006-1), and a battery cell without anti-corrosion protection in a non-air stable lithium salt based electrolyte (AD-007-1).

FIG. 27B depicts a graph 2720 illustrating the cycle life of a battery cell with anti-corrosion protection in a hybrid electrolyte (AD-002-1) and a battery cell without anti-corrosion protection in a hybrid electrolyte (AD-003-1), when the battery cells are held in a 45° C. environmental chamber. Meanwhile, FIG. 27C depicts a graph 2740 illustrating the cycle life of a battery cell with anti-corrosion protection in a hybrid electrolyte (AD-002-2), a battery cell with anti-corrosion protection in a non-air stable lithium salt based electrolyte (AD-006-1), and a battery cell without anti-corrosion protection in a non-air stable lithium salt based electrolyte (AD-007-1), when the battery cells are held in a 85° C. environmental chamber. It should be appreciated that battery cells with anti-corrosion protection exhibit higher capacity retention and/or coulombic efficiency due to interfacial stabilization.

Example Battery Cell with Anti-Corrosion Electrodes and Hybrid Electrolyte for Rate Capability and Cycle Life Analysis In some implementations of the current subject matter, a battery cell with anti-corrosion protection may include one or more anti-corrosion layers formed from a polymer like Torlon® 4000TF. To form the anti-corrosion layer, 20 grams of Torlon® 4000TF can be dissolved into 200 grams of N-methylpyrrolidone (NMP). The Torlon® 4000TF solution can be combined with 1 gram of carbon black and mixed for a few minutes at a rate of approximately 1000 rpm followed by 20 minutes at a rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the N-methylpyrrolidone (NMP) has evaporated, the final dried solid can have a loading of approximately 0.5 milligrams per square centimeter (mg/cm$^2$).

The positive electrode of the battery cell can be formed by dissolving 9 grams of polyvinylidene fluoride (PVDF) into 115 grams of N-methylpyrrolidone (NMP). The resulting mixture can be combined with 9 grams of carbon black and mixed for a few minutes at a rate of approximately 1000 rpm followed by 15 minutes at a rate of approximately 6500 rpm. Subsequently, 582 grams of lithium nickel manganese cobalt oxide (LiNi$_{0.6}$Mn$_{0.2}$Co$_{0.2}$O$_2$, NMC622) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 18 milligrams per square centimeter (mg/cm$^2$). The final dried solid can further be compressed to form a layer of positive electrode material having a thickness of approximately 135 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 11 milligrams per square centimeter (mg/cm$^2$). Furthermore, the final dried solid can be compressed to form a layer of negative electrode material having a thickness of approximately 155 microns (μm).

In some implementations of the current subject matter, the hybrid electrolyte of the battery cell can include a non-air stable lithium salt such as, for example, lithium hexafluorophosphate (LiPF$_6$) and/or the like. In addition, the hybrid electrolyte of the battery cell can include an air stable lithium salt or a combination of air stable lithium salts such as, for example, lithium bis(trifluoromethanesulfonyl)imide (LiC$_2$F$_6$NO$_4$S$_2$) (LiTFSI) and/or lithium bis(fluorosulfonyl) imide (F$_2$LiNO$_4$S$_2$) (LiFSI), and/or the like. To form the hybrid electrolyte, 44.00 grams of ethylene carbonate ((CH$_2$O)$_2$CO), 32.50 grams of diethyl carbonate (OC(OCH$_2$CH$_3$)$_2$), and 35.67 grams of dimethyl carbonate (OC(OCH$_3$)$_2$) can be combined to form a solvent solution, which can subsequently be dried with a molecular sieve for 72 hours. Thereafter, 0.72 grams of lithium bis(trifluoromethanesulfonyl)imide (LiC$_2$F$_6$NO$_4$S$_2$) (LiTFSI) salt and 1.40 grams of lithium bis(fluorosulfonyl)imide (F$_2$LiNO$_4$S$_2$) (LiFSI) can be dissolved in 11.22 grams the solvent solution before 0.17 grams of vinylene carbonate (VC) is also added to the solvent solution.

To assemble the battery cell as a prismatic cell, the positive electrode and the negative electrode of the battery cell can be formed by being cut into ribbons before tabs are welded on the electrodes. Subsequently, the positive electrode can be sprayed with a conformal silicone coating to protect any exposed aluminum (Al) from corrosion caused by the lithium salts in the hybrid electrolyte. The positive electrode can be dried at 125° C. for 10 hours while the negative electrode can be dried at 140° C. for 10 hours. A separator can subsequently be laminated between the positive electrode and the negative electrode. Furthermore, the positive electrode and the negative electrode can be rolled with the separator in the center to form a flat jelly-roll, which can subsequently be placed into an aluminum (Al) composite bag and dried in a 70° C. vacuum oven. Thereafter, the aluminum (Al) composite bag can be filled with the hybrid electrolyte, sealed, and aged for 16 hours. The assembled and aged battery cell can be subject to a formation process that includes one or more charge and discharge cycles. For example, the battery cell can be potentiostatically charged to 3.6 volts at 50 milliamps (mA) for 4 hours and to 4.2 volts at 100 milliamps for 8.5 hours before resting for 30 minutes. Thereafter, the charged battery cell can be thermally condition at 60° C. for 24 hours before being galvanostatically discharged to 2.8 volts at 200 milliamps and rested for 30 minutes. Again, the battery cell can subsequently be potentiostatically charged to 4.2 volts at 200 milliamps for 10 hours and rested for 30 minutes before being galvanstatically discharged to 2.8 volts again at 200 milliamps and rested for 30 minutes. Finally, the battery cell can be potentiostatically charged to 3.8 volts at 200 milliamps for 30 minutes and rested for another 30 minutes before being punctured under vacuum to release any gases. The punctured battery cell is resealed before being subject to cycle testing.

In some implementations of the current subject matter, the battery cell can be subject to cycle testing in which the battery cell is subject to multiple charge and discharge cycles. Prior to cycle testing, the battery cell, which may have undergone the aforementioned formation process, may be fully charged to 4.2 volts. Cycle testing the battery cell can include cycling the battery cell between 2.8 volts and 4.2 volts at different discharge rates (e.g., C/5, C/20, 1C, 2C, and/or the like). For instance, the fully charged battery cell may be galvanostatically discharged to 2.8 volts at 220 milliamps (e.g., a C/5 rate), 550 milliamps (e.g., a C/2 rate), 1.1 amp (e.g., a 1C rate), and 2.2 amps (e.g., a 2C rate). After discharging the battery cell, the battery cell can be potentiostatically recharged to 4.2 volts at 220 milliamps.

It should be appreciated the Torlon® 4000TF polymer has been selected due to its poor electrolyte absorption. This is critical in order to form a protective anti-corrosion coating that will prevent the electrolyte from coming in contact with and corroding the current collector.

Example Battery Cell with Anti-Corrosion Electrodes and Hybrid Electrolyte for Rate Capability and Cycle Life Analysis In some implementations of the current subject matter, a battery cell with anti-corrosion protection may include one or more anti-corrosion layers formed from a polymer like poly(ethylene-co-vinyl) acetate (PEVA). To form the anti-corrosion layer, 10 grams of poly(ethylene-co-vinyl) acetate (PEVA) can be dissolved into 200 grams of toluene. The PEVA solution can be combined with 0.5 grams of carbon black and mixed for a few minutes at a rate of approximately 1000 rpm followed by 20 minutes at a rate of approximately 6500 rpm. Using an automatic coating machine, the resulting slurry can be coated onto one side of a 15 microns (μm) thick aluminum (Al) foil serving as the current collector. The first heat zone of the automatic coating machine can be set to approximately 130° C. and the second heat zone of the automatic coating machine can be set to approximately 160° C. Once the toluene has evaporated, the final dried solid can have a loading of approximately 0.5 milligrams per square centimeter (mg/cm$^2$).

The positive electrode of the battery cell can be formed by dissolving 9 grams of polyvinylidene fluoride (PVDF) into 115 grams of N-methylpyrrolidone (NMP). The resulting mixture can be combined with 9 grams of carbon black and mixed for a few minutes at a rate of approximately 1000 rpm followed by 15 minutes at a rate of approximately 6500 rpm. Subsequently, 582 grams of lithium nickel manganese cobalt oxide (LiNi$_{0.6}$Mn$_{0.2}$Co$_{0.2}$O$_2$, NMC622) can be added to the mixture and mixed for a few minutes at a rate of approximately 1000 rpm followed by 30 minutes at a rate of approximately 6500 rpm (rpm). Some additional N-methylpyrrolidone (NMP) may be added to adjust the viscosity of the mixture. The resulting slurry can be coated onto the surface of anti-corrosion layer using an automatic coating machine with the first heat zone set to approximately 85° C. and the second heat zone set to approximately 135° C. Once the N-methylpyrrolidone (NMP) has evaporated, the final dried solid can have a loading of approximately 18 milligrams per square centimeter (mg/cm$^2$). The final dried solid can further be compressed to form a layer of positive electrode material having a thickness of approximately 135 microns (μm).

The negative electrode of the battery cell can be formed by dissolving 5.2 grams of carboxymethyl cellulose (CMC) into approximately 300 grams of deionized water. The mixture can then be combined with 8.5 grams of carbon black before being mixed for a few minutes at a rate of approximately 1000 rpm followed by 15 minutes at a rate of approximately 6500 rpm. Thereafter, the mixture can be combined with 378.4 grams of negative active graphic graphitized mesocarbon microbeads (MCMB) and synthetic graphite (TIMCAL) and mixed for a few minutes at a rate of approximately 1000 rpm followed by 30 minutes at a rate of approximately 6500 rpm. In addition, 16.8 grams of styrene butadiene rubber (SBR) with a 50% solid content suspended in water can be added to the mixture and mixed for a few minutes at a rate of approximately 1000 rpm followed by 5 minutes at approximately 6500 rpm. The viscosity of the resulting slurry can be adjusted for smoothness before the slurry is coated onto a 9 microns (μm) thick copper (Cu) foil using an automatic coating machine with the first heat zone set to about 70° C. and the second heat zone to about 100° C. Once the water has been evaporated from the slurry coated atop the copper (Cu) foil, the final dried solid can have a loading of approximately 11 milligrams per square centimeter (mg/cm$^2$). Furthermore, the final dried solid can be compressed to form a layer of negative electrode material having a thickness of approximately 155 microns (μm).

In some implementations of the current subject matter, the hybrid electrolyte of the battery cell can include a non-air stable lithium salt such as, for example, lithium hexafluorophosphate (LiPF$_6$) and/or the like. In addition, the hybrid electrolyte of the battery cell can include an air stable lithium salt or a combination of air stable lithium salts such as, for example, lithium bis(trifluoromethanesulfonyl)imide (LiC$_2$F$_6$NO$_4$S$_2$) (LiTFSI) and/or lithium bis(fluorosulfonyl) imide (F$_2$LiNO$_4$S$_2$) (LiFSI), and/or the like. To form the hybrid electrolyte, 44.00 grams of ethylene carbonate ((CH$_2$O)$_2$CO), 32.50 grams of diethyl carbonate (OC(OCH$_2$CH$_3$)$_2$), and 35.67 grams of dimethyl carbonate (OC(OCH$_3$)$_2$) can be combined to form a solvent solution, which can subsequently be dried with a molecular sieve for 72 hours. Thereafter, 0.72 grams of lithium bis(trifluoromethanesulfonyl)imide (LiC$_2$F$_6$NO$_4$S$_2$) (LiTFSI) salt and 1.40 grams of lithium bis(fluorosulfonyl)imide (F$_2$LiNO$_4$S$_2$) (LiFSI) can be dissolved in 11.22 grams the solvent solution before 0.17 grams of vinylene carbonate (VC) is also added to the solvent solution.

To assemble the battery cell as a prismatic cell, the positive electrode and the negative electrode of the battery cell can be formed by being cut into ribbons before tabs are welded on the electrodes. Subsequently, the positive electrode can be sprayed with a conformal silicone coating to protect any exposed aluminum (Al) from corrosion caused by the lithium salts in the hybrid electrolyte. The positive electrode can be dried at 125° C. for 10 hours while the negative electrode can be dried at 140° C. for 10 hours. A separator can subsequently be laminated between the positive electrode and the negative electrode. Furthermore, the positive electrode and the negative electrode can be rolled with the separator in the center to form a flat jelly-roll, which can subsequently be placed into an aluminum (Al) composite bag and dried in a 70° C. vacuum oven. Thereafter, the aluminum (Al) composite bag can be filled with the hybrid electrolyte, sealed, and aged for 16 hours. The assembled and aged battery cell can be subject to a formation process that includes one or more charge and discharge cycles. For example, the battery cell can be potentiostatically charged to 3.6 volts at 50 milliamps (mA) for 4 hours and to 4.2 volts at 100 milliamps for 8.5 hours before resting for 30 minutes. Thereafter, the charged battery cell can be thermally condition at 60° C. for 24 hours before being galvanostatically discharged to 2.8 volts at 200 milliamps and rested for 30 minutes. Again, the battery cell can subsequently be potentiostatically charged to 4.2 volts at 200 milliamps for 10 hours and rested for 30 minutes before being galvanstatically discharged to 2.8 volts again at 200 milliamps and rested for 30 minutes. Finally, the battery cell can be potentiostatically charged to 3.8 volts at 200 milliamps for 30 minutes and rested for another 30 minutes before being punctured under vacuum to release any gases. The punctured battery cell is resealed before being subject to cycle testing.

In some implementations of the current subject matter, the battery cell can be subject to cycle testing in which the battery cell is subject to multiple charge and discharge cycles. Prior to cycle testing, the battery cell, which may have undergone the aforementioned formation process, may be fully charged to 4.2 volts. Cycle testing the battery cell can include cycling the battery cell between 2.8 volts and 4.2 volts at different discharge rates (e.g., C/5, C/20, 1C, 2C, and/or the like). For instance, the fully charged battery cell may be galvanostatically discharged to 2.8 volts at 220 milliamps (e.g., a C/5 rate), 550 milliamps (e.g., a C/2 rate), 1.1 amp (e.g., a 1C rate), and 2.2 amps (e.g., a 2C rate). After discharging the battery cell, the battery cell can be potentiostatically recharged to 4.2 volts at 220 milliamps.

It should be appreciated the poly(ethylene-co-vinyl) acetate (PEVA) polymer has been selected due to its poor electrolyte absorption. This is critical in order to form a protective anti-corrosion coating that will prevent the electrolyte from coming in contact with and corroding the current collector.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A battery, comprising:
   an electrolyte;
   a current collector;
   a first anti-corrosion layer and a second anti-corrosion layer, the current collector interposed between the first anti-corrosion layer and the second anti-corrosion layer, the first anti-corrosion layer and/or the second anti-corrosion layer configured to prevent the current collector from being corroded by an exposure to the electrolyte by at least preventing contact between the current collector and the electrolyte, and the first anti-corrosion layer and/or the second anti-corrosion layer further configured to prevent the current collector from being corroded by a byproduct from the electrolyte including by participating in a sacrificial reaction in which the first anti-corrosion layer and/or the second anti-corrosion layer react with the byproduct to prevent the byproduct from reacting with the current collector.

2. The battery of claim 1, wherein the current collector comprises a metal current collector.

3. The battery of claim 2, wherein the metal current collector is formed from aluminum (Al), chromium (Cr), titanium (Ti), and/or stainless steel.

4. The battery of claim 1, wherein the current collector is further interposed between a first safe layer and a second safe layer, and wherein the first safe layer and/or the second safe layer are configured to respond to a temperature trigger, a voltage trigger, and/or a current trigger.

5. The battery of claim 4, wherein the first safe layer and/or the second safe layer are configured to respond to the temperature trigger, the voltage trigger, and/or the current trigger by at least forming a nonconductive gap that electrically decouples the current collector from an electrode of the battery.

6. The battery of claim 5, wherein the first safe layer and/or the second safe layer expands and/or contracts in response to an increase in temperature, and wherein the nonconductive gap is formed at least by the expansion and/or contraction of the first safe layer and/or the second safe layer.

7. The battery of claim 5, wherein the first safe layer and/or the second safe layer generate a gas and/or a liquid that vaporizes to form the gas, and wherein the nonconductive gap is formed by the gas separating the current collector from the electrode.

8. The battery of claim 5, wherein the nonconductive gap is formed by a decomposition and/or a delamination of the first safe layer and/or the second safe layer.

9. The battery of claim 4, wherein the first safe layer and/or the second safe layer are configured to respond to the temperature trigger, the voltage trigger, and/or the current trigger by at least forming a high resistance gap that decreases a current flow between the current collector and an electrode of the battery.

10. The battery of claim 9, wherein the first safe layer and/or the second safe layer are formed from a material associated with a positive thermal coefficient (PTC) such that an electrical resistivity of the first safe layer and/or the second safe layer increases in response to an increase in temperature, and wherein the increase in the electrical resistivity of the first safe layer and/or the second safe layer forms the high resistance gap between the current collector and the electrode of the battery.

11. The battery of claim 1, wherein the byproduct includes a hydrofluoric acid (HF) produced by an oxidation of a non-air stable salt forming the electrolyte.

12. The battery of claim 11, wherein the non-air stable salt includes lithium hexafluorophosphate ($LiFP_6$).

13. The battery of claim 1, wherein the electrolyte further includes an additive comprising vinylene carbonate (VC), lithium bis(oxalato)borate (LiBOB), lithium difluoro(oxalato)borate (LiDFOB), lithium bis(fluorosulfonyl)imide (LiFSI), lithium trifluoromethanesulfonate (LiTf), lithium difluorophosphate (LiDFP), lithium tetrafluoroborate ($LiBF_4$), tetraethyl-ammonium tetrafluoroborate ($TEABF_4$), lithium perchlorate ($LiClO_4$), methylene ethylene carbonate (MEC), fluoroethylene carbonate succinonitrile, 1,3-propanesultone (PS), 1-propene 1,3-sultone, and/or methylene methanedisulfonate (MMDS).

14. The battery of claim 1, wherein the first anti-corrosion layer and/or the second anti-corrosion layer comprise a hybrid anti-corrosion layer configured to respond to a temperature trigger, a voltage trigger, and/or a current trigger by at least forming a nonconductive gap and/or a high resistance gap between the current collector and an electrode of the battery.

15. The battery of claim 1, wherein the electrolyte includes one or more air stable salts, and wherein the first anti-corrosion layer and/or the second anti-corrosion layer are configured to prevent the current collector from being corroded by being exposed to the one or more air stable salts included in the electrolyte.

16. The battery of claim 15, wherein the one or more air stable salts includes lithium trifluoromethanesulfonate ($CF_3SO_3Li$) and/or lithium bis(trifluoromethane sulfone) imide ($LiC_2F_6NO_4S_2$) (LiTFSI).

17. The battery of claim 1, wherein the first anti-corrosion layer and/or the second anti-corrosion layer includes a conductive material.

18. The battery of claim 17, wherein the conductive material comprises carbon black, nano carbon tubes, graphene, a conductive ceramic, and/or a conductive polymer.

19. The battery of claim 1, further comprising:
an electrode coupled with the current collector, the first anti-corrosion layer and/or the second anti-corrosion layer being interposed between the current collector and the electrode.

* * * * *